United States Patent
Chen et al.

(10) Patent No.: US 10,492,094 B2
(45) Date of Patent: Nov. 26, 2019

(54) FEEDBACK TIMING MANAGEMENT FOR LOW LATENCY COMMUNICATIONS

(71) Applicant: QUALCOMM Incorporated, San Diego, CA (US)

(72) Inventors: Wanshi Chen, San Diego, CA (US); Seyedkianoush Hosseini, San Diego, CA (US); Jing Sun, San Diego, CA (US); Peter Gaal, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 92 days.

(21) Appl. No.: 15/706,059

(22) Filed: Sep. 15, 2017

(65) Prior Publication Data

US 2018/0220323 A1  Aug. 2, 2018

Related U.S. Application Data

(60) Provisional application No. 62/453,485, filed on Feb. 1, 2017.

(51) Int. Cl.
*H04W 24/00* (2009.01)
*H04W 28/02* (2009.01)
(Continued)

(52) U.S. Cl.
CPC ......... *H04W 28/0205* (2013.01); *H04L 1/002* (2013.01); *H04L 1/0028* (2013.01);
(Continued)

(58) Field of Classification Search
CPC ... H04L 1/1812; H04L 1/1854; H04L 1/1887; H04L 5/0055; H04W 72/042;
(Continued)

(56) References Cited

U.S. PATENT DOCUMENTS

| 2013/0155878 A1* | 6/2013 | Deng | H04L 1/1854 |
| | | | 370/252 |
| 2016/0088652 A1* | 3/2016 | Patel | H04L 5/0044 |
| | | | 370/329 |

(Continued)

OTHER PUBLICATIONS

Huawei H., et al., "Discussion on Timing Relations for NR", 3GPP DRAFT; R1-1611218, 3rd Generation Partnership Project (3GPP), Mobile Competence Centre; 650, Route Des Lucioles; F-06921 Sophia-Antipolis Cedex . France, vol. RAN WG1, No. Reno, USA; Nov. 14, 2016-Nov. 18, 2016, Nov. 5, 2016 (Nov. 5, 2016), XP051189791, 4 Pages, Retrieved from the Internet: URL:http://www.3gpp.org/ftp/tsg_ran/WG1_RL_1/TSGR1_87/Docs/ [retrieved on Nov. 5, 2016].

(Continued)

*Primary Examiner* — Quan M Hua
(74) *Attorney, Agent, or Firm* — Holland & Hart LLP

(57) ABSTRACT

Low latency transmission time interval (TTI) structures and feedback configurations allow for a downlink transmission, a feedback indication indicating successful or unsuccessful reception of the downlink transmission, and a retransmission of the downlink transmission, within a same subframe or 1 ms time period. A TTI structure may include a number of shortened TTIs (sTTIs) that are transmitted in a subframe, and timing for feedback transmissions may be identified based at least in part on the TTI structure. The TTI structure and configurations for feedback timing may be dynamically or semi-statically determined by a user equipment (UE). In some cases, the TTI structure may include an identified partial sTTI allocated to a UE that may span fewer than all of the resources of a sTTI and allow for faster processing and generation of feedback information, and for faster retransmissions of unsuccessfully received transmissions.

30 Claims, 29 Drawing Sheets

(51) Int. Cl.
*H04L 1/00* (2006.01)
*H04W 72/04* (2009.01)
*H04L 1/18* (2006.01)
*H04L 5/00* (2006.01)
*H04W 56/00* (2009.01)

(52) U.S. Cl.
CPC .............. *H04L 1/18* (2013.01); *H04L 1/1854* (2013.01); *H04L 1/1887* (2013.01); *H04L 5/0037* (2013.01); *H04W 72/042* (2013.01); *H04W 72/0446* (2013.01); *H04L 1/1825* (2013.01); *H04W 56/0045* (2013.01)

(58) Field of Classification Search
CPC ............... H04W 16/14; H04W 72/082; H04W 72/0446; H04W 16/32; H04W 28/0252; H04W 48/08; H04W 72/1215; H04W 88/10; H04W 4/06; H04W 72/005; H04W 72/0453; H04W 24/06; H04W 52/08; H04W 52/325; H04W 72/044; H04W 72/046; H04W 72/12; H04W 72/1289; H04W 72/0493
See application file for complete search history.

(56) References Cited

U.S. PATENT DOCUMENTS

| | | |
|---|---|---|
| 2016/0128091 A1 | 5/2016 | Azarian et al. |
| 2016/0128096 A1 | 5/2016 | Damnjanovic et al. |
| 2016/0150532 A1* | 5/2016 | Bhushan ............... H04L 1/1812 370/336 |
| 2016/0295584 A1 | 10/2016 | Chen et al. |
| 2017/0063516 A1 | 3/2017 | Miao et al. |
| 2017/0064706 A1 | 3/2017 | Patel et al. |

OTHER PUBLICATIONS

International Search Report and Written Opinion—PCT/US2018/014693—ISA/EPO—dated Apr. 6, 2018 (171885WO).
Qualcomm Incorporated: "Processing Time Reduction and Related Procedures for UL", 3GPP DRAFT; R1-1611643 Processing Time Reduction and Related Procedures for UL, 3rd Generation Partnership Project (3GPP), Mobile Competence Centre; 650, Route Des Lucioles; 06921 Sophia-Antipolis vol. RAN WG1, No. Reno, USA; Nov. 14, 2016-Nov. 18, 2016, Nov. 13, 2016 (Nov. 13, 2016), XP051175616, pp. 1-4, Retrieved from the Internet: URL:http://www.3gpp.org/ftp/Meetings_3GPP_SYNC/RAN1/Docs/retrieved on Nov. 13, 2016].

* cited by examiner

FEEDBACK TIMING MANAGEMENT FOR LOW LATENCY COMMUNICATIONS

CROSS REFERENCES

The present Application for Patent claims priority to U.S. Provisional Patent Application No. 62/453,485 entitled "Feedback Timing Management For Low Latency Communications," filed Feb. 1, 2017, assigned to the assignee hereof.

BACKGROUND

The following relates generally to wireless communication, and more specifically to feedback timing management for low latency communications.

Wireless multiple-access technologies have been adopted in various telecommunication standards to provide a common protocol that enables different wireless devices to communicate on a municipal, national, regional, and even global level. An example telecommunication standard is Long Term Evolution (LTE). LTE is designed to improve spectral efficiency, lower costs, improve services, make use of new spectrum, and better integrate with other open standards. LTE may use OFDMA on the downlink (DL), single-carrier frequency division multiple access (SC-FDMA) on the uplink (UL), and multiple-input multiple-output (MIMO) antenna technology.

In some examples, a wireless multiple-access communication system may include a number of base stations, each simultaneously supporting communication for multiple communication devices, otherwise known as user equipment (UEs). In a LTE or LTE-Advanced (LTE-A) network, a set of one or more base stations may define an eNodeB (eNB). In other examples (e.g., in a next generation new radio (NR) or 5G network), a wireless multiple access communication system may include a number of smart radio heads (RHs) in communication with a number of access node controllers (ANCs), where a set of one or more RHs, in communication with an ANC, defines a base station (e.g., an eNB or gNB). A base station may communicate with a set of UEs on downlink (DL) channels (e.g., for transmissions from a base station to a UE) and uplink (UL) channels (e.g., for transmissions from a UE to a base station).

A base station in some LTE or NR deployments may transmit to one or more UEs using different length transmission time intervals (TTIs) that may be reduced in length relative to legacy LTE TTIs. Such a reduced length TTI may be referred to as a shortened TTI (sTTI) and may support some low latency services that provide low latency with high reliability for wireless transmissions of the low latency services. An sTTI may be a subset of one or more subframes that correspond to legacy TTI subframes. A base station may allocate transmission resources for sTTIs to a UE that may include time resources and frequency resources. In some cases, reliability for low latency services may be enhanced through feedback mechanisms that may provide for retransmission of unsuccessfully received transmissions, such as according to hybrid acknowledgment repeat request (HARQ) feedback techniques, for example. Efficient allocation of sTTI resources and efficient HARQ feedback may help to increase the efficiency and reliability of a wireless communications system.

SUMMARY

The described techniques relate to improved methods, systems, devices, or apparatuses that support feedback timing management for low latency communications. Generally, the described techniques provide for low latency transmission time interval (TTI) structures and feedback configurations that allow a downlink transmission, a feedback indication indicating successful or unsuccessful reception of the downlink transmission, and a retransmission of the downlink transmission, within a time period that corresponds to a LTE subframe duration (e.g., the initial transmission and retransmission are both transmitted within 1 ms). In some cases, a TTI structure may include a number of shortened TTIs (sTTIs) that are transmitted in a subframe, and timing for feedback transmissions may be identified based at least in part on the TTI structure.

In some cases, the TTI structure and configurations for feedback timing may be dynamically or semi-statically determined by a user equipment (UE). In some cases, the TTI structure may include an identified partial sTTI allocated to a UE that may span fewer than all of the resources of a sTTI and allow for faster processing and generation of feedback information, and for faster retransmissions of unsuccessfully received transmissions. In some cases, a maximum transport block size (TBS) or timing advance (TA) may be identified based on the TTI configuration and the feedback configuration.

A method of wireless communication is described, which may include identifying a downlink TTI structure and a feedback configuration, based on the downlink TTI structure, for transmitting a feedback indication associated with a first downlink TTI, receiving, unsuccessfully, a first downlink transmission in the first downlink TTI, generating a negative acknowledgment (NACK) as a first feedback indication associated with the first downlink TTI according to the identified feedback configuration, transmitting the first feedback indication in an uplink transmission during a first uplink TTI, and receiving, based at least in part on the first feedback indication, a retransmission of the first downlink transmission in a second downlink TTI, wherein the first downlink TTI and the second downlink TTI are located within a same subframe or within one millisecond.

An apparatus for wireless communication is described. The apparatus may include means for identifying a downlink TTI structure and a feedback configuration, based on the downlink TTI structure, for transmitting a feedback indication associated with a first downlink TTI, means for receiving, unsuccessfully, a first downlink transmission in the first downlink TTI, means for generating a NACK as a first feedback indication associated with the first downlink TTI according to the identified feedback configuration, means for transmitting the first feedback indication in an uplink transmission during a first uplink TTI, and means for receiving, based at least in part on the first feedback indication, a retransmission of the first downlink transmission in a second downlink TTI, wherein the first downlink TTI and the second downlink TTI are located within a same subframe or within one millisecond.

Another apparatus for wireless communication is described. The apparatus may include a processor, memory in electronic communication with the processor, and instructions stored in the memory. The instructions may be operable to cause the processor to identify a downlink TTI structure and a feedback configuration, based on the downlink TTI structure, for transmitting a feedback indication associated with a first downlink TTI, receive, unsuccessfully, a first downlink transmission in the first downlink TTI, generate a NACK as a first feedback indication associated with the first downlink TTI according to the identified feedback configuration, transmit the first feedback indication in an uplink transmission during a first uplink TTI, and receive, based at least in part on the first feedback indication, a retransmission of the first downlink transmission in a second downlink TTI, wherein the first downlink TTI and the second downlink TTI are located within a same subframe or within one millisecond.

A non-transitory computer readable medium for wireless communication is described, which may include instructions operable to cause a processor to identify a downlink TTI structure and a feedback configuration, based on the downlink TTI structure, for transmitting a feedback indication associated with a first downlink TTI, receive, unsuccessfully, a first downlink transmission in the first downlink TTI, generate a NACK as a first feedback indication associated with the first downlink TTI according to the identified feedback configuration, transmit the first feedback indication in an uplink transmission during a first uplink TTI, and receive, based at least in part on the first feedback indication, a retransmission of the first downlink transmission in a second downlink TTI, wherein the first downlink TTI and the second downlink TTI are located within a same subframe or within one millisecond.

Some examples of the method, apparatus, and non-transitory computer-readable medium described above may further include processes, features, means, or instructions for identifying an uplink TTI structure for a plurality of uplink TTIs based at least in part on the downlink TTI structure. In some examples of the method, apparatus, and non-transitory computer-readable medium described above, the identifying the downlink TTI structure comprises dynamically identifying the downlink TTI structure based at least in part on a number of OFDM symbols of the first downlink TTI. In some examples of the method, apparatus, and non-transitory computer-readable medium described above, the downlink TTI structure may be identified based at least in part on a number of control symbols in a control region associated with the subframe. In some examples of the method, apparatus, and non-transitory computer-readable medium described above, the number of control symbols in the control region may be indicated in a PCFICH transmission. In some examples of the method, apparatus, and non-transitory computer-readable medium described above, the identifying the downlink TTI structure comprises semi-statically identifying the downlink TTI structure based at least in part on RRC signaling received from a base station.

In some examples of the method, apparatus, and non-transitory computer-readable medium described above, the identifying the feedback configuration comprises identifying a feedback timing for transmitting the first feedback indication based at least in part on the downlink TTI structure, and identifying a rescheduling timing for receiving a subsequent retransmission of the first downlink transmission following the first feedback indication. In some examples of the method, apparatus, and non-transitory computer-readable medium described above, the feedback timing may be different than the rescheduling timing.

In some examples of the method, apparatus, and non-transitory computer-readable medium described above, the downlink TTI structure comprises a plurality of TTIs that each span two or three OFDM symbols. In some examples of the method, apparatus, and non-transitory computer-readable medium described above, the feedback timing corresponds to a duration of three OFDM symbols, and the rescheduling timing corresponds to a duration of two OFDM symbols. In some examples of the method, apparatus, and non-transitory computer-readable medium described above, the feedback timing corresponds to a duration of one OFDM symbol, and the rescheduling timing corresponds to the duration of one OFDM symbol.

Some examples of the method, apparatus, and non-transitory computer-readable medium described above may further include processes, features, means, or instructions for identifying one or more of a TBS or a maximum TA for the uplink transmission based at least in part on the feedback configuration.

A method of wireless communication is described. The method may include identifying a first portion of a first downlink TTI for receiving a first downlink transmission, identifying a first uplink TTI for transmitting a feedback indication associated with the first downlink transmission, receiving, unsuccessfully, the first downlink transmission in the first portion of the first downlink TTI, generating a NACK as a first feedback indication associated with the first downlink transmission, transmitting the first feedback indication in an uplink transmission during the first uplink TTI, and receiving, based at least in part on the first feedback indication, a retransmission of the first downlink transmission in a second portion of a second downlink TTI, wherein the first downlink TTI and the second downlink TTI are located within a same subframe or within one millisecond.

An apparatus for wireless communication is described. The apparatus may include means for identifying a first portion of a first downlink TTI for receiving a first downlink transmission, means for identifying a first uplink TTI for transmitting a feedback indication associated with the first downlink transmission, means for receiving, unsuccessfully, the first downlink transmission in the first portion of the first downlink TTI, means for generating a NACK as a first feedback indication associated with the first downlink transmission, means for transmitting the first feedback indication in an uplink transmission during the first uplink TTI, and means for receiving, based at least in part on the first feedback indication, a retransmission of the first downlink transmission in a second portion of a second downlink TTI, wherein the first downlink TTI and the second downlink TTI are located within a same subframe or within one millisecond.

Another apparatus for wireless communication is described. The apparatus may include a processor, memory in electronic communication with the processor, and instructions stored in the memory. The instructions may be operable to cause the processor to identify a first portion of a first downlink TTI for receiving a first downlink transmission, identify a first uplink TTI for transmitting a feedback indication associated with the first downlink transmission, receive, unsuccessfully, the first downlink transmission in the first portion of the first downlink TTI, generate a NACK as a first feedback indication associated with the first downlink transmission, transmit the first feedback indication in an uplink transmission during the first uplink TTI, and receive, based at least in part on the first feedback indication, a retransmission of the first downlink transmission in a second portion of a second downlink TTI, wherein the first downlink TTI and the second downlink TTI are located within a same subframe or within one millisecond.

A non-transitory computer readable medium for wireless communication is described. The non-transitory computer-readable medium may include instructions operable to cause a processor to identify a first portion of a first downlink TTI for receiving a first downlink transmission, identify a first uplink TTI for transmitting a feedback indication associated with the first downlink transmission, receive, unsuccessfully, the first downlink transmission in the first portion of the first downlink TTI, generate a NACK as a first feedback indication associated with the first downlink transmission, transmit the first feedback indication in an uplink transmission during the first uplink TTI, and receive, based at least in part on the first feedback indication, a retransmission of the first downlink transmission in a second portion of a second downlink TTI, wherein the first downlink TTI and the second downlink TTI are located within a same subframe or within one millisecond.

In some examples of the method, apparatus, and non-transitory computer-readable medium described above, the identifying the first portion of the first downlink TTI comprises identifying a first OFDM symbol of two or more OFDM symbols of the first downlink TTI for receiving the first downlink transmission. In some examples of the method, apparatus, and non-transitory computer-readable medium described above, the first downlink TTI comprises two or three OFDM symbols.

Some examples of the method, apparatus, and non-transitory computer-readable medium described above may further include processes, features, means, or instructions for determining that the retransmission may be unsuccessfully received. Some examples of the method, apparatus, and non-transitory computer-readable medium described above may further include processes, features, means, or instructions for generating a second NACK as a second feedback indication associated with the retransmission. Some examples of the method, apparatus, and non-transitory computer-readable medium described above may further include processes, features, means, or instructions for transmitting the second feedback indication in a second uplink transmission during a second uplink TTI. Some examples of the method, apparatus, and non-transitory computer-readable medium described above may further include processes, features, means, or instructions for receiving, based at least in part on the second feedback indication, a second retransmission of the first downlink transmission in a third portion of a third downlink TTI, wherein the first downlink TTI, the second downlink TTI and the third downlink TTI may be located within the same subframe or within one millisecond.

In some examples of the method, apparatus, and non-transitory computer-readable medium described above, the identifying the first portion of the first downlink TTI comprises receiving UE specific signaling or cell-specific signaling indicating the first portion of the first downlink TTI. In some examples of the method, apparatus, and non-transitory computer-readable medium described above, the identifying the first portion of the first downlink TTI comprises dynamically identifying the first portion of the first downlink TTI based at least in part on a number of OFDM symbols of the first downlink TTI. In some examples of the method, apparatus, and non-transitory computer-readable medium described above, the first portion of the first downlink TTI may be identified based at least in part on a number of control symbols in a control region associated with the subframe. In some examples of the method, apparatus, and non-transitory computer-readable medium described above, the number of control symbols in the control region may be indicated in a PCFICH transmission. In some examples of the method, apparatus, and non-transitory computer-readable medium described above, the identifying the first portion of the first downlink TTI comprises semi-statically identifying the first portion of the first downlink TTI based at least in part on RRC signaling received from a base station. In some examples of the method, apparatus, and non-transitory computer-readable medium described above, the first portion of the first downlink TTI may be pre-specified.

In some examples of the method, apparatus, and non-transitory computer-readable medium described above, the identifying the first uplink TTI comprises identifying a first feedback timing for transmitting the first feedback indication based at least in part on a location of the first portion within the first downlink TTI. In some examples of the method, apparatus, and non-transitory computer-readable medium described above, the identifying the first uplink TTI comprises identifying a first feedback timing for transmitting the first feedback indication based at least in part on a UE capability.

Some examples of the method, apparatus, and non-transitory computer-readable medium described above may further include processes, features, means, or instructions for identifying one or more of a TBS or a TA for the uplink transmission based at least in part on a timing between the first portion of the first downlink TTI and the first uplink TTI.

A method of wireless communication is described. The method may include identifying a downlink TTI structure and a feedback configuration, based on the downlink TTI structure, for receiving a feedback indication associated with a first downlink transmission in a first downlink TTI and transmitting a retransmission of the first downlink transmission in a second downlink TTI and transmitting configuration information indicating one or more of the downlink TTI structure or the feedback configuration to a UE that is to receive the first downlink transmission in the first downlink TTI, wherein the first downlink TTI and the second downlink TTI are located within a same subframe or within one millisecond.

An apparatus for wireless communication is described. The apparatus may include means for identifying a downlink TTI structure and a feedback configuration, based on the downlink TTI structure, for receiving a feedback indication associated with a first downlink transmission in a first downlink TTI and transmitting a retransmission of the first downlink transmission in a second downlink TTI and means for transmitting configuration information indicating one or more of the downlink TTI structure or the feedback configuration to a UE that is to receive the first downlink transmission in the first downlink TTI, wherein the first downlink TTI and the second downlink TTI are located within a same subframe or within one millisecond.

Another apparatus for wireless communication is described. The apparatus may include a processor, memory in electronic communication with the processor, and instructions stored in the memory. The instructions may be operable to cause the processor to identify a downlink TTI structure and a feedback configuration, based on the downlink TTI structure, for receiving a feedback indication associated with a first downlink transmission in a first downlink TTI and transmitting a retransmission of the first downlink transmission in a second downlink TTI and transmit configuration information indicating one or more of the downlink TTI structure or the feedback configuration to a UE that is to receive the first downlink transmission in the first downlink TTI, wherein the first downlink TTI and the second downlink TTI are located within a same subframe or within one millisecond.

A non-transitory computer readable medium for wireless communication is described. The non-transitory computer-readable medium may include instructions operable to cause a processor to identify a downlink TTI structure and a feedback configuration, based on the downlink TTI structure, for receiving a feedback indication associated with a first downlink transmission in a first downlink TTI and transmitting a retransmission of the first downlink transmission in a second downlink TTI and transmit configuration information indicating one or more of the downlink TTI structure or the feedback configuration to a UE that is to receive the first downlink transmission in the first downlink TTI, wherein the first downlink TTI and the second downlink TTI are located within a same subframe or within one millisecond.

Some examples of the method, apparatus, and non-transitory computer-readable medium described above may further include processes, features, means, or instructions for identifying an uplink TTI structure based at least in part on the downlink TTI structure.

Some examples of the method, apparatus, and non-transitory computer-readable medium described above may further include processes, features, means, or instructions for transmitting the first downlink transmission in the first downlink TTI. Some examples of the method, apparatus, and non-transitory computer-readable medium described above may further include processes, features, means, or instructions for receiving a first feedback indication associated with the first downlink TTI according to the identified feedback configuration. Some examples of the method, apparatus, and non-transitory computer-readable medium described above may further include processes, features, means, or instructions for transmitting, based at least in part on the first feedback indication, the retransmission of the first downlink transmission in the second downlink TTI.

In some examples of the method, apparatus, and non-transitory computer-readable medium described above, the transmitting the configuration information comprises indicating that one or more of the downlink TTI structure or the feedback configuration may be identified by a UE based at least in part on a configuration of the first downlink TTI. In some examples of the method, apparatus, and non-transitory computer-readable medium described above, the transmitting the configuration information comprises transmitting a PCFICH transmission that indicates one or more of the downlink TTI structure or the feedback configuration. In some examples of the method, apparatus, and non-transitory computer-readable medium described above, the transmitting the configuration information comprises transmitting RRC signaling to a UE that semi-statically indicates one or more of the downlink TTI structure or the feedback configuration. In some examples of the method, apparatus, and non-transitory computer-readable medium described above, the identifying the feedback configuration comprises identifying a feedback timing for transmission of the feedback indication based at least in part on the downlink TTI structure, and identifying a retransmission timing for a subsequent retransmission of the first downlink transmission. In some examples of the method, apparatus, and non-transitory computer-readable medium described above, the feedback timing may be different than the retransmission timing.

Some examples of the method, apparatus, and non-transitory computer-readable medium described above may further include processes, features, means, or instructions for identifying one or more of a TBS or a maximum TA for the feedback indication based at least in part on the feedback configuration.

A method of wireless communication is described. The method may include identifying a first portion of a first downlink TTI for transmitting a first downlink transmission, identifying a first uplink TTI for receiving a first feedback indication associated with the first downlink transmission, transmitting the first downlink transmission in the first portion of the first downlink TTI, receiving a NACK as the first feedback indication in an uplink transmission during the first uplink TTI, and transmitting, based at least in part on the first feedback indication, a retransmission of the first downlink transmission in a second portion of a second downlink TTI, wherein the first downlink TTI and the second downlink TTI are located within a same subframe or within one millisecond.

An apparatus for wireless communication is described. The apparatus may include means for identifying a first portion of a first downlink TTI for transmitting a first downlink transmission, means for identifying a first uplink TTI for receiving a first feedback indication associated with the first downlink transmission, means for transmitting the first downlink transmission in the first portion of the first downlink TTI, means for receiving a NACK as the first feedback indication in an uplink transmission during the first uplink TTI, and means for transmitting, based at least in part on the first feedback indication, a retransmission of the first downlink transmission in a second portion of a second downlink TTI, wherein the first downlink TTI and the second downlink TTI are located within a same subframe or within one millisecond.

Another apparatus for wireless communication is described. The apparatus may include a processor, memory in electronic communication with the processor, and instructions stored in the memory. The instructions may be operable to cause the processor to identify a first portion of a first downlink TTI for transmitting a first downlink transmission, identify a first uplink TTI for receiving a first feedback indication associated with the first downlink transmission, transmit the first downlink transmission in the first portion of the first downlink TTI, receive a NACK as the first feedback indication in an uplink transmission during the first uplink TTI, and transmit, based at least in part on the first feedback indication, a retransmission of the first downlink transmission in a second portion of a second downlink TTI, wherein the first downlink TTI and the second downlink TTI are located within a same subframe or within one millisecond.

A non-transitory computer readable medium for wireless communication is described. The non-transitory computer-readable medium may include instructions operable to cause a processor to identify a first portion of a first downlink TTI for transmitting a first downlink transmission, identify a first uplink TTI for receiving a first feedback indication associated with the first downlink transmission, transmit the first downlink transmission in the first portion of the first downlink TTI, receive a NACK as the first feedback indication in an uplink transmission during the first uplink TTI, and transmit, based at least in part on the first feedback indication, a retransmission of the first downlink transmission in a second portion of a second downlink TTI, wherein the first downlink TTI and the second downlink TTI are located within a same subframe or within one millisecond.

Some examples of the method, apparatus, and non-transitory computer-readable medium described above may further include processes, features, means, or instructions for configuring a first UE to receive the first downlink transmission in the first portion of the first downlink TTI and to transmit the first feedback indication in the first uplink TTI. Some examples of the method, apparatus, and non-transitory computer-readable medium described above may further include processes, features, means, or instructions for configuring a second UE to receive a second downlink transmission in a second portion of the first downlink TTI and to transmit a second feedback indication in the first uplink TTI. In some examples of the method, apparatus, and non-transitory computer-readable medium described above, the configuring the first UE and the configuring the second UE comprises transmitting cell-specific configuration information or transmitting UE-specific configuration information to the first UE and the second UE. In some examples of the method, apparatus, and non-transitory computer-readable medium described above, the configuring the first UE and the configuring the second UE comprises configuring the first UE and the second UE to dynamically identify the first portion and the second portion of the first downlink TTI based at least in part on a configuration of the first downlink TTI.

In some examples of the method, apparatus, and non-transitory computer-readable medium described above, the configuration of the first downlink TTI may be indicated in a PCFICH transmission. In some examples of the method, apparatus, and non-transitory computer-readable medium described above, the configuring the first UE and the configuring the second UE comprises semi-statically configuring the first portion of the first downlink TTI and the second portion of the first downlink TTI using RRC signaling.

In some examples of the method, apparatus, and non-transitory computer-readable medium described above, the identifying the first portion of the first downlink TTI comprises identifying a first OFDM symbol of the first downlink TTI for transmitting the first downlink transmission, and wherein the first downlink TTI comprises two or three OFDM symbols.

In some examples of the method, apparatus, and non-transitory computer-readable medium described above, the identifying the first uplink TTI comprises identifying a first feedback timing the first feedback indication based at least in part on a location of the first portion of the first downlink TTI within the first downlink TTI. In some examples of the method, apparatus, and non-transitory computer-readable medium described above, the identifying the first uplink TTI comprises identifying a first feedback timing the first feedback indication based at least in part on a UE capability of a UE that receives the first downlink transmission.

Some examples of the method, apparatus, and non-transitory computer-readable medium described above may further include processes, features, means, or instructions for identifying one or more of a TBS or a maximum TA for the uplink transmission based at least in part on a timing between the first portion of the first downlink TTI and the first uplink TTI. Some examples of the method, apparatus, and non-transitory computer-readable medium described above may further include processes, features, means, or instructions for configuring a UE that receives the first downlink transmission with the TBS or maximum TA for the uplink transmission.

DETAILED DESCRIPTION

Figure 1:
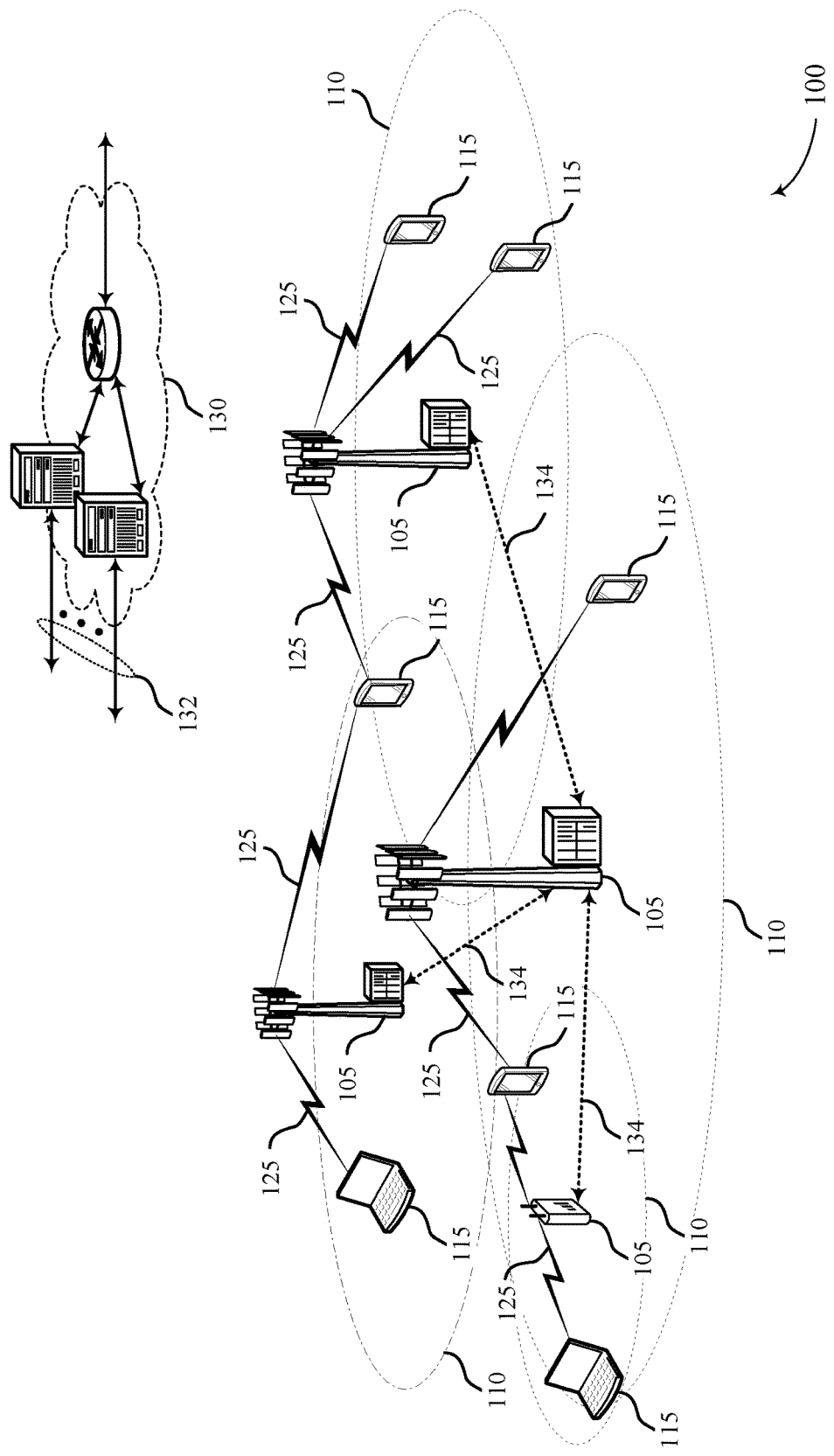
FIG. 1 illustrates an example of a system for wireless communication that supports feedback timing management for low latency communications in accordance with aspects of the present disclosure.

The described techniques relate to improved methods, systems, devices, or apparatuses that support feedback timing management for low latency communications that may provide for a transmission and a retransmission of a communication within a same subframe. Some transmissions may use shortened transmission time intervals (sTTIs) for uplink or downlink transmissions, in which a length of the sTTI may be shorter than a legacy long term evolution (LTE) subframe or a 1 ms TTI. Feedback timing for generating a feedback indication, such as an acknowledgment/negative-acknowledgment (ACK/NACK) in a hybrid automatic repeat request (HARQ) feedback routine, may be configured to provide feedback and allow retransmission within a 1 ms time window, in some examples. In some cases, feedback timing between a transmission and the transmission of feedback, and rescheduling timing between receiving the feedback and retransmitting the transmission, may be selected to provide a reduced round-trip-time (RTT) that may enhance the reliability of low latency communications.

Resources allocated for sTTI transmissions may be used for uplink and/or downlink communications that are relatively latency sensitive, referred to as low latency communications, relative to communications that may be relatively latency insensitive, such as enhanced mobile broadband (eMBB) transmissions that may use a 1 ms (or legacy LTE) TTI duration. In some cases, an sTTI duration may correspond to one slot of a wireless subframe, or to two or three orthogonal frequency division multiplexing (OFDM) symbols, for example, and a 1 ms TTI duration may correspond to a duration of a 1 ms subframe.

Such low latency communications may be used in systems, for example, that may support multiple different services for data communications. Such different services may be selected depending upon the nature of the communications. For example, communications that require low latency and high reliability, sometimes referred to as mission critical (MiCr) communications, may be served through a lower-latency service (e.g., an ultra-reliable low-latency communication (URLLC) service) that uses sTTIs. Correspondingly, communications that are more delay-tolerant may be served through a service that provides relatively higher throughput with somewhat higher latency, such as a mobile broadband service (e.g., an eMBB service) that uses 1 ms TTIs. In other examples, communications may be with UEs that are incorporated into other devices (e.g., meters, vehicles, appliances, machinery, etc.), and a machine-type communication (MTC) service (e.g., massive MTC (mMTC)) may be used for such communications. In some cases, different services (e.g., eMBB, URLLC, mMTC) may have different TTIs, different sub-carrier (or tone) spacing and different cyclic prefixes.

The present disclosure describes various techniques with reference to 4G networks (e.g., LTE networks) and next generation networks (e.g., 5G or NR networks) that are being designed to support features such as high bandwidth operations, more dynamic subframe/slot types, and self-contained subframe/slot types (in which HARQ feedback for a subframe/slot may be transmitted before the end of the subframe/slot). However, such techniques may be used for any system in which TTIs of different lengths may be transmitted in a wireless communications system.

The described techniques provided in various examples provide for identifying a downlink TTI structure, and identifying a feedback configuration based on the downlink TTI structure for transmitting a feedback indication associated with a first downlink TTI. In some cases, a first downlink transmission may be unsuccessfully received at a UE, and a NACK may be generated as a first feedback indication associated with the first downlink TTI according to the identified feedback configuration. The first feedback indication may be transmitted in an uplink transmission during a first uplink TTI. A base station may receive the first feedback indication and format a retransmission of the first downlink transmission in a second downlink TTI that is located in a same subframe as the first downlink TTI. The UE may receive the retransmission in the second downlink TTI, and again generate ACK/NACK feedback. Such retransmissions within a same subframe, or within a 1 ms time period, in some examples, may provide relatively high reliability, such as reliability with error rates of $10^{-5}$ within a 1 ms time period for 32 byte packets as is being targeted in some 4G and 5G systems.

Aspects of the disclosure are initially described in the context of a wireless communications system. Various sTTI structures and feedback timings are then described. Aspects of the disclosure are further illustrated by and described with reference to apparatus diagrams, system diagrams, and flowcharts that relate to feedback timing management for low latency communications.

FIG. 1 illustrates an example of a wireless communications system 100 in accordance with various aspects of the present disclosure. The wireless communications system 100 includes base stations 105, UEs 115, and a core network 130. In some examples, the wireless communications system 100 may be a LTE (or LTE-Advanced) network, or a New Radio (NR) network. In some cases, wireless communications system 100 may support enhanced broadband communications, ultra-reliable (i.e., mission critical or URLLC) communications, low latency communications, and communications with low-cost and low-complexity devices. Wireless communications system 100 may provide for wireless transmissions in which sTTI structures and feedback timings allow for a transmission and retransmission within a same subframe.

Base stations 105 may wirelessly communicate with UEs 115 via one or more base station antennas. Each base station 105 may provide communication coverage for a respective geographic coverage area 110. Communication links 125 shown in wireless communications system 100 may include uplink (UL) transmissions from a UE 115 to a base station 105, or downlink (DL) transmissions, from a base station 105 to a UE 115. Control information and data may be multiplexed on an uplink channel or downlink according to various techniques. Control information and data may be multiplexed on a downlink channel, for example, using time division multiplexing (TDM) techniques, frequency division multiplexing (FDM) techniques, or hybrid TDM-FDM techniques. In some examples, the control information transmitted during a TTI of a downlink channel may be distributed between different control regions in a cascaded manner (e.g., between a common control region and one or more UE-specific control regions).

UEs 115 may be dispersed throughout the wireless communications system 100, and each UE 115 may be stationary or mobile. A UE 115 may also be referred to as a mobile station, a subscriber station, a mobile unit, a subscriber unit, a wireless unit, a remote unit, a mobile device, a wireless device, a wireless communications device, a remote device, a mobile subscriber station, an access terminal, a mobile terminal, a wireless terminal, a remote terminal, a handset, a user agent, a mobile client, a client, or some other suitable terminology. A UE 115 may also be a cellular phone, a personal digital assistant (PDA), a wireless modem, a wireless communication device, a handheld device, a tablet computer, a laptop computer, a cordless phone, a personal electronic device, a handheld device, a personal computer, a wireless local loop (WLL) station, an Internet of things (IoT) device, an Internet of Everything (IoE) device, a machine type communication (MTC) device, an appliance, an automobile, or the like.

In some cases, a UE 115 may also be able to communicate directly with other UEs (e.g., using a peer-to-peer (P2P) or device-to-device (D2D) protocol). One or more of a group of UEs 115 utilizing D2D communications may be within the coverage area 110 of a cell. Other UEs 115 in such a group may be outside the coverage area 110 of a cell, or otherwise unable to receive transmissions from a base station 105. In some cases, groups of UEs 115 communicating via D2D communications may utilize a one-to-many (1:M) system in which each UE 115 transmits to every other UE 115 in the group. In some cases, a base station 105 facilitates the scheduling of resources for D2D communications. In other cases, D2D communications are carried out independent of a base station 105.

Some UEs 115, such as MTC or IoT devices, may be low cost or low complexity devices, and may provide for automated communication between machines, i.e., Machine-to-Machine (M2M) communication. M2M or MTC may refer to data communication technologies that allow devices to communicate with one another or a base station without human intervention. For example, M2M or MTC may refer to communications from devices that integrate sensors or meters to measure or capture information and relay that information to a central server or application program that can make use of the information or present the information to humans interacting with the program or application. Some UEs 115 may be designed to collect information or enable automated behavior of machines. Examples of applications for MTC devices include smart metering, inventory monitoring, water level monitoring, equipment monitoring, healthcare monitoring, wildlife monitoring, weather and geological event monitoring, fleet management and tracking, remote security sensing, physical access control, and transaction-based business charging.

In some cases, an MTC device may operate using half-duplex (one-way) communications at a reduced peak rate. MTC devices may also be configured to enter a power saving "deep sleep" mode when not engaging in active communications. In some cases, MTC or IoT devices may be designed to support mission critical functions and wireless communications system may be configured to provide ultra-reliable communications for these functions.

Base stations 105 may communicate with the core network 130 and with one another. For example, base stations 105 may interface with the core network 130 through backhaul links 132 (e.g., S1, etc.). Base stations 105 may communicate with one another over backhaul links 134 (e.g., X2, etc.) either directly or indirectly (e.g., through core network 130). Base stations 105 may perform radio configuration and scheduling for communication with UEs 115, or may operate under the control of a base station controller (not shown). In some examples, base stations 105 may be macro cells, small cells, hot spots, or the like. Base stations 105 may also be referred to as eNodeBs (eNBs) 105.

A base station 105 may be connected by an S1 interface to the core network 130. The core network may be an evolved packet core (EPC), which may include at least one MME, at least one S-GW, and at least one P-GW. The MME may be the control node that processes the signaling between the UE 115 and the EPC. All user IP packets may be transferred through the S-GW, which itself may be connected to the P-GW. The P-GW may provide IP address allocation as well as other functions. The P-GW may be connected to the network operators IP services. The operators IP services may include the Internet, the Intranet, an IP Multimedia Subsystem (IMS), and a Packet-Switched (PS) Streaming Service (PSS).

The core network 130 may provide user authentication, access authorization, tracking, Internet Protocol (IP) connectivity, and other access, routing, or mobility functions. At least some of the network devices, such as a base station 105 may include subcomponents such as an access network entity, which may be an example of an access node controller (ANC). Each access network entity may communicate with a number of UEs 115 through one or more access network transmission entities, each of which may be an example of a smart radio head, or a transmission/reception point (TRP). In some configurations, various functions of each access network entity or base station 105 may be distributed across various network devices (e.g., radio heads and access network controllers) or consolidated into a single network device (e.g., a base station 105).

Wireless communications system 100 may operate in an ultra-high frequency (UHF) frequency region using frequency bands from 700 MHz to 2600 MHz (2.6 GHz), although in some cases WLAN networks may use frequencies as high as 4 GHz. This region may also be known as the decimeter band, since the wavelengths range from approximately one decimeter to one meter in length. UHF waves may propagate mainly by line of sight, and may be blocked by buildings and environmental features. However, the waves may penetrate walls sufficiently to provide service to UEs 115 located indoors. Transmission of UHF waves is characterized by smaller antennas and shorter range (e.g., less than 100 km) compared to transmission using the smaller frequencies (and longer waves) of the high frequency (HF) or very high frequency (VHF) portion of the spectrum. In some cases, wireless communications system 100 may also utilize extremely high frequency (EHF) portions of the spectrum (e.g., from 30 GHz to 300 GHz). This region may also be known as the millimeter band, since the wavelengths range from approximately one millimeter to one centimeter in length. Thus, EHF antennas may be even smaller and more closely spaced than UHF antennas. In some cases, this may facilitate use of antenna arrays within a UE 115 (e.g., for directional beamforming).

In some cases, wireless communications system 100 may be a packet-based network that operate according to a layered protocol stack. In the user plane, communications at the bearer or Packet Data Convergence Protocol (PDCP) layer may be IP-based. A Radio Link Control (RLC) layer may in some cases perform packet segmentation and reassembly to communicate over logical channels. A Medium Access Control (MAC) layer may perform priority handling and multiplexing of logical channels into transport channels. The MAC layer may also use Hybrid ARQ (HARD) to provide retransmission at the MAC layer to improve link efficiency. In the control plane, the Radio Resource Control (RRC) protocol layer may provide establishment, configuration, and maintenance of an RRC connection between a UE 115 and a network device or core network 130 supporting radio bearers for user plane data. At the Physical (PHY) layer, transport channels may be mapped to physical channels.

Time intervals in LTE or NR may be expressed in multiples of a basic time unit (which may be a sampling period of $T_s=1/30,720,000$ seconds). Time resources may be organized according to radio frames of length of 10 ms ($T_f=307200T_s$), which may be identified by a system frame number (SFN) ranging from 0 to 1023. Each frame may include ten 1 ms subframes numbered from 0 to 9. A subframe may be further divided into two 0.5 ms slots, each of which contains 6 or 7 modulation symbol periods (depending on the length of the cyclic prefix prepended to each symbol). Excluding the cyclic prefix, each symbol contains 2048 sample periods. In some cases the subframe may be the smallest scheduling unit, also known as a TTI. In other cases, a TTI may be shorter than a subframe (e.g., a sTTI) or may be dynamically selected (e.g., in short TTI bursts or in selected component carriers using short TTIs).

A resource element may consist of one symbol period and one subcarrier (e.g., a 15 KHz frequency range). A resource block may contain 12 consecutive subcarriers in the frequency domain and, for a normal cyclic prefix in each OFDM symbol, 7 consecutive OFDM symbols in the time domain (1 slot), or 84 resource elements. The number of bits carried by each resource element may depend on the modulation scheme (the configuration of symbols that may be selected during each symbol period, which may be referred to as a modulation and coding scheme (MCS)). Thus, the more resource blocks that a UE receives and the higher the modulation scheme, the higher the data rate may be.

Wireless communications system 100 may support operation on multiple cells or carriers, a feature which may be referred to as carrier aggregation (CA) or multi-carrier operation. A carrier may also be referred to as a component carrier (CC), a layer, a channel, etc. The terms "carrier," "component carrier," "cell," and "channel" may be used interchangeably herein. A UE 115 may be configured with multiple downlink CCs and one or more uplink CCs for carrier aggregation. Carrier aggregation may be used with both FDD and TDD component carriers.

In some cases, wireless communications system 100 may utilize enhanced component carriers (eCCs). An eCC may be characterized by one or more features including: wider bandwidth, shorter symbol duration, shorter transmission time interval (TTIs), and modified control channel configuration. In some cases, an eCC may be associated with a carrier aggregation configuration or a dual connectivity configuration (e.g., when multiple serving cells have a suboptimal or non-ideal backhaul link). An eCC may also be configured for use in unlicensed spectrum or shared spectrum (where more than one operator is allowed to use the spectrum). An eCC characterized by wide bandwidth may include one or more segments that may be utilized by UEs 115 that are not capable of monitoring the whole bandwidth or prefer to use a limited bandwidth (e.g., to conserve power). In some cases, an eCC may utilize a different symbol duration than other CCs, which may include use of a reduced symbol duration as compared with symbol durations of the other CCs. A shorter symbol duration may be associated with increased subcarrier spacing. A TTI in an eCC may consist of one or multiple symbols. In some cases, the TTI duration (that is, the number of symbols in a TTI) may be variable.

In some cases, wireless system 100 may utilize both licensed and unlicensed radio frequency spectrum bands. For example, wireless system 100 may employ LTE License Assisted Access (LTE-LAA) or LTE Unlicensed (LTE U) radio access technology or NR technology (NR-SS) in an unlicensed band such as the 5 Ghz Industrial, Scientific, and Medical (ISM) band. When operating in unlicensed radio frequency spectrum bands, wireless devices such as base stations 105 and UEs 115 may employ listen-before-talk (LBT) procedures to ensure the channel is clear before transmitting data. In some cases, operations in unlicensed bands may be based on a carrier aggregation (CA) configuration in conjunction with component carriers (CCs) operating in a licensed band. Operations in unlicensed spectrum may include downlink transmissions, uplink transmissions, or both. Duplexing in unlicensed spectrum may be based on frequency division duplexing (FDD), time division duplexing (TDD) or a combination of both.

As indicated above, in some cases base stations 105 and UEs 115 may use a HARQ process to provide feedback (e.g., ACK/NACK feedback) of successful receipt of transmissions and to provide retransmissions in the event that a transmission is not successfully received. Timings for generating and transmitting HARQ feedback and for generating and retransmitting unsuccessfully received transmissions may be based on pre-established rules for such timing between a reception TTI and a subsequent transmission. For example, an n+4 rule may be established in which the subsequent transmission is to be made four TTIs, or a first available TTI thereafter, following the reception TTI. In such cases, if a reception TTI is TTI-0, the subsequent transmission (e.g., an ACK/NACK transmission or a retransmission following a NACK transmission) would be made at TTI-4. In cases, where sTTIs are used for uplink and downlink transmissions, various aspects of the present disclosure provide for techniques for determining timing and/or other parameters to provide for one or more HARQ retransmissions within a 1 ms time period.

Furthermore, when transmitting uplink transmissions, a UE 115 may use a transport block size (TBS) that may impact an amount of data transmitted in a TTI or sTTI, and a timing advance (TA) value that may compensate for propagation delay between when the UE 115 starts a transmission and when a base station 105 receives the transmission. The TA value is a negative offset, at the UE 115, between the start of a received downlink TTI and a transmitted uplink TTI. This offset at the UE 115 may help to ensure that the downlink and uplink TTI transmissions are synchronized at the base station 105. A UE 115 that is located relatively far from a serving base station 105 may encounter a larger propagation delay, so its uplink transmission is started earlier than another UE 115 that is closer to the same serving base station 105. In some examples, maximum TBS/TA threshold values may be set to provide a UE 115 with sufficient processing time prior to the start of an uplink transmission. In some cases, a TBS/TA values and maximum TBS/TA threshold values may be determined based in a TTI length of uplink or downlink transmissions, and one or more other parameters, such as a number of spatial layers, number of CCs, or CQI reporting type may be identified based at least in part on such values.

Figure 2:
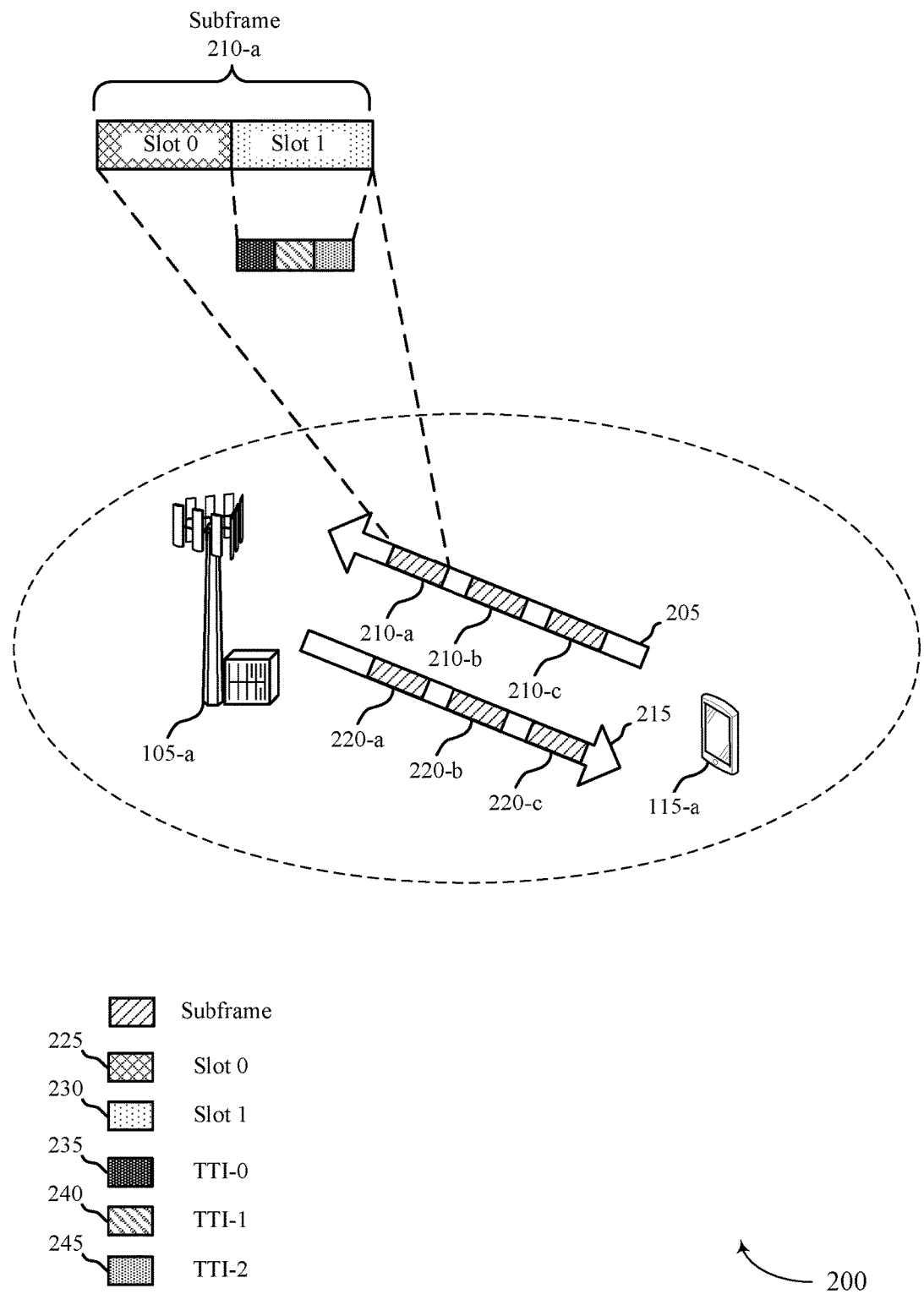
FIG. 2 illustrates an example of a wireless communications system that supports feedback timing management for low latency communications in accordance with aspects of the present disclosure.

FIG. 2 illustrates an example of a wireless communications system 200 that supports feedback timing management for low latency communications in accordance with various aspects of the present disclosure. Wireless communications system 200 includes base station 105-*a* and UE 115-*a*, which may be examples of aspects of a UE 115 as described above with reference to FIG. 1. In the example of FIG. 2, the wireless communications system 200 may operate according to a radio access technology (RAT) such as a LTE, 5G, or NR RAT, although techniques described herein may be applied to any RAT and to systems that may concurrently use two or more different RATs.

Base station 105-*a* may communicate with UE 115-*a* over an uplink carrier 205 and a downlink carrier 215. In some examples, base station 105-*a* may allocate resources for communication with UEs over uplink carrier 205 and downlink carrier 215. For example, base station 105-*a* may allocate uplink subframes 210 in uplink carrier 205 for uplink transmissions from UE 115-*a*, and one or more uplink subframes 210 may correspond to a legacy LTE TTI of 1 ms. In this example, uplink subframes 210 may include a first uplink subframe 210-*a*, a second uplink subframe 210-*b*, and a third uplink subframe 210-*c*. Each of the uplink subframes 210 may include two slots, in which each slot may have seven OFDM symbols for a normal cyclic prefix. In this example, a first slot (slot 0) 225 and a second slot (slot 1) 230 may be included in the first uplink subframe 210-*a*.

As indicated above, in the uplink of a low latency system, different sTTI lengths may be used for transmissions over uplink carrier 205. For example, two-symbol sTTI and 1-slot sTTI durations may be supported for physical uplink control channel (PUCCH) and physical uplink shared channel (PUSCH) transmissions (or shortened PUCCH (sPUCCH) and shortened PUSCH (sPUSCH) transmissions). Thus, within first slot 225 or second slot 230, there may be multiple sTTIs, such as a first sTTI (TTI-0) 235, a second sTTI (TTI-1) 240, and a third sTTI (TTI-2) 245, that may each have a two or three OFDM symbol duration. Such TTI durations may also apply to downlink subframes 220 transmitted on downlink carrier 215.

When two-symbol sTTI is used, in some cases it may be desirable to have a fixed sTTI structure in which sTTI boundaries lie within slot boundaries or are aligned with slot boundaries, such as the boundaries of the first slot 225 or second slot 230, which may be referred to as slot-aligned sTTIs. As discussed above, when using a normal CP, seven symbols are included in each slot 225-230, and thus each slot may include three sTTIs for slot-aligned sTTIs. In some cases, one of the sTTIs may be configured as a three-symbol TTI, so as to efficiently utilize each symbol of each slot. In such cases, different patterns can be considered, such as having the three-symbol TTI located at the end of a slot 225-230, or at the beginning of a slot 225-230. When using two-symbol sTTIs or a combination of two-symbol and three-symbol sTTIs, such sTTIs may be referred to as 2-symbol sTTIs. When using sTTIs having a duration corresponding to one slot, such sTTIs may be referred to as slot sTTIs or slot-aligned sTTIs. When using TTIs having a duration corresponding to a subframe, such TTIs may be referred to as 1 ms TTIs or legacy TTIs.

In some examples, 2-symbol downlink sTTIs may use a first pattern of symbols {3,2,2,2,2,3} for the two slots within a subframe boundary, or may use a second pattern of symbols {2,3,2,2,2,3} for such transmissions. In some cases, the pattern to be used may be indicated in a legacy control channel such as a physical control format indicator channel (PCFICH), in which the legacy control region of 1 or 3 symbols indicates the first pattern, and a legacy control region of 2 symbols indicates the second pattern. One of the following two patterns will also be specified for the uplink transmissions for 2-symbol sTTI transmissions: {3,2,2,2,2, 3} or {2,2,3,2,2,3}.

As indicated above, in some cases sTTI configurations and HARQ timing may be configured that may provide for an initial transmission and a retransmission of the initial transmission within a same subframe or within 1 ms. Thus, two transmission opportunities may be present in a 1 ms window. In some examples, as will be discussed in more detail below, three transmission opportunities may be provided within a subframe. In some cases, a partial sTTI may be configured in which all of the control and data for a sTTI for a particular UE may be included in a single symbol, which may also provide two or more transmission opportunities within a subframe or a 1 ms time window. In some cases, downlink and uplink transmissions may have different partial sTTI durations, and different sTTIs or partial sTTIs may have different HARQ timings.

In cases where partial sTTIs are configured, different UEs may monitor different partial sTTI opportunities in a time division multiplexing (TDM) manner, and different feedback timings may be used for different partial sTTI opportunities, as will be discussed in more detail below. In some cases, feedback timings may be tied with a UE capability, a TBS limitation, and/or maximum TA limitations. Furthermore, TBS limitation and/or TA limitation can also be correspondingly defined. For example, one-symbol partial sTTI transmissions may have a 2-symbol gap response/ scheduling, while a 2-symbol transmission may have 3-symbols as the gap, and each is associated with a respective max TBS and/or max UL TA. Furthermore, in some cases even for a same response/transmit duration, the TBS/TA limitations may be defined for different UE categories. Additional parameters may also be selected to provide relatively short feedback timing, such as modulation order (e.g., QPSK only), or a number of layers (e.g., only rank 1 operation), for example.

Figure 3:
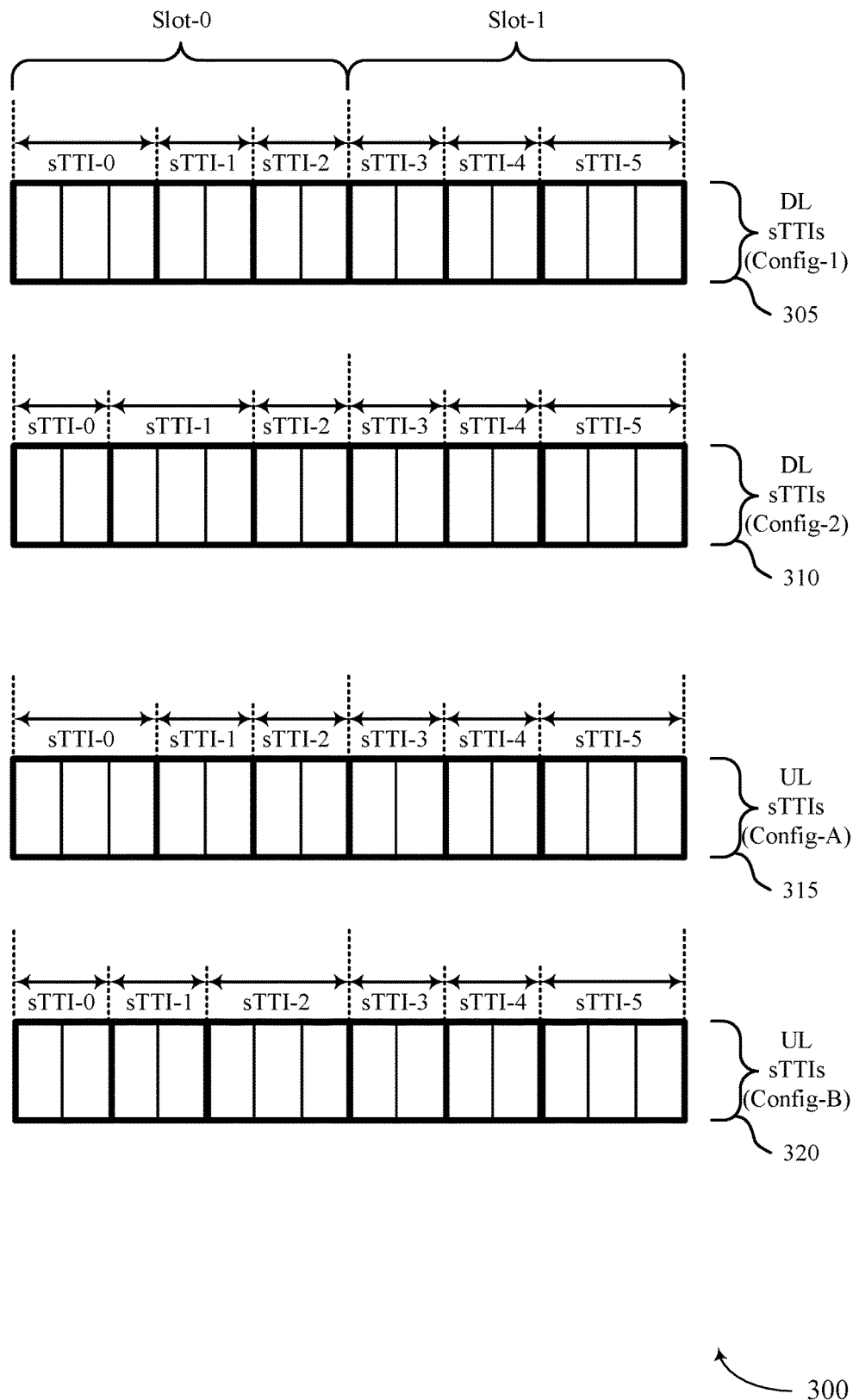
FIG. 3 illustrates an example of shortened transmission time interval (sTTI) structures that support feedback timing management for low latency communications in accordance with aspects of the present disclosure.

FIG. 3 illustrates an example of sTTI structures 300 for uplink and downlink transmissions for low latency operation, in accordance with various aspects of the disclosure. The sTTI structures 300 may be used for communications between a UE and a base station such as discussed above with respect to FIGS. 1 and 2. Various different configurations of sTTIs may be implemented, in which sTTIs may be arranged to be aligned with subframes or slots.

In this example, two downlink sTTI configurations and two uplink sTTI configurations may be available for low latency downlink transmissions, although the techniques described herein apply to other sTTI configurations that may be implemented. A first downlink sTTI configuration is illustrated in downlink sTTIs 305, which may be used for downlink transmissions from a base station to a UE, and be transmitted using the pattern {3,2,2,2,2,3} as discussed above. In this example, for downlink sTTIs 305, sTTI-0 may be a three-symbol sTTI, sTTI-1 through sTTI-4 may be two-symbol sTTIs, and sTTI-5 may be a three-symbol sTTI in accordance with a first downlink sTTI configuration. A second downlink sTTI configuration is illustrated in downlink sTTIs 310, which may have the pattern {2,3,2,2,2,3} as discussed above. In this example, for downlink sTTIs 310 having the second downlink configuration, sTTI-0 may be a two-symbol sTTI, sTTI-1 may be a three-symbol sTTI, sTTI-2 through sTTI-4 may be two-symbol sTTIs, and sTTI-5 may be a three-symbol sTTI.

Also in this example, different configurations for uplink sTTIs are illustrated. In this example, uplink sTTIs 315 with a first configuration (configuration-A) may be used for uplink transmissions from the UE to the base station. In this example, uplink sTTIs 315 may have the pattern {3,2,2,2, 2,3} as discussed above. In this example, for uplink sTTIs 315 having the uplink configuration-A, sTTI-0 may be a three-symbol sTTI, sTTI-1 through sTTI-4 may be two-symbol sTTIs, and sTTI-5 may be a three-symbol sTTI. A second configuration of uplink sTTIs 320 (configuration-B) in this example, may have the pattern {2,2,3,2,2,3} as discussed above. In this example, for uplink sTTIs 320 having the uplink configuration-B, sTTI-0 and sTTI-1 may be a two-symbol sTTIs, sTTI-2 may be a three-symbol sTTI, sTTI-3 and sTTI-4 may be a two-symbol sTTIs, sTTI-5 may be a three-symbol sTTI.

As discussed above, for HARQ ACK/NACK feedback, in some cases, such as legacy LTE, the ACK/NACK transmission may be transmitted during a TTI that with the relationship n+4 following the TTI in which a transmission is received. That is, for a downlink reception in TTI n, ACK/NACK feedback is to be transmitted at or after TTI n+4. However, when using some combination of sTTIs for uplink and downlink low latency transmissions, it may be desirable to provide one or more retransmissions, if necessary, within a same subframe or within 1 ms, and an n+4 timing may not provide for a retransmission within such a timeframe.

Figure 4:
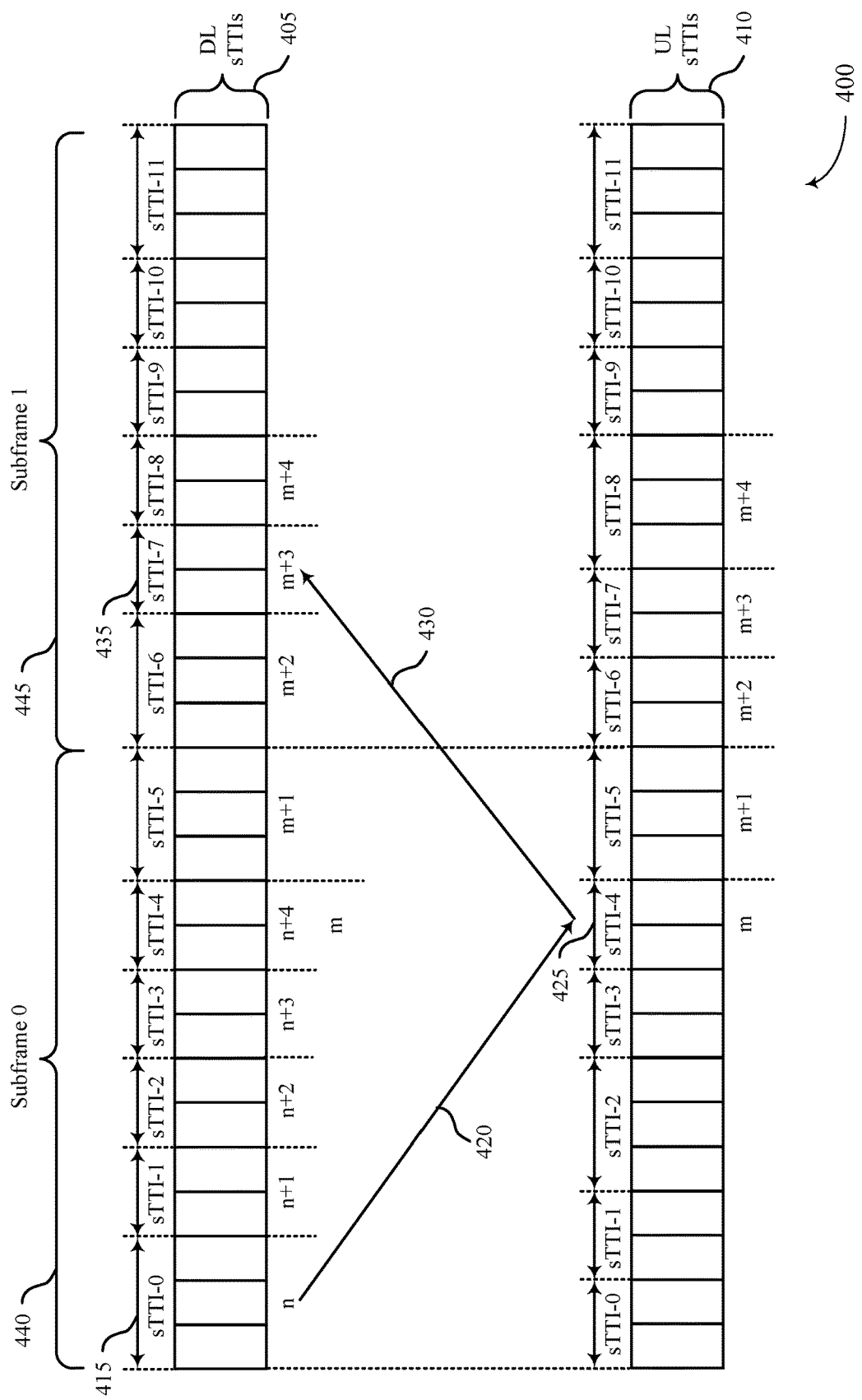
FIG. 4 illustrates an example of a n+4 feedback timing that supports feedback timing management for low latency communications in accordance with aspects of the present disclosure.

FIG. 4 illustrates an example of n+4 timing uplink and downlink sTTIs 400 in accordance with various aspects of the present disclosure. Uplink and downlink sTTIs 400 may be used for communications between a UE and a base station such as discussed above with respect to FIGS. 1 and 2. In this example, downlink sTTIs 405 may be used for downlink transmissions from a base station to a UE, and be transmitted using the pattern {3,2,2,2,2,3} as discussed above, which repeats for a first subframe (subframe 0) 440 and a second subframe (subframe 1) 445. Similarly, uplink sTTIs 410 may be used for uplink transmissions from a UE to a base station, and be transmitted using the pattern {2,2,3,2,2,3} as discussed above, which repeats for a first subframe (subframe 0) 440 and a second subframe (subframe 1) 445.

In this example, a first downlink sTTI 415 may be transmitted to a UE, and the UE may attempt to demodulate and decode the transmission and generate an ACK/NACK indication 420 that may be transmitted in uplink sTTI 425, which may be a first uplink sTTI that starts at or after n+4 sTTIs after the first downlink sTTI 415, or in a first sTTI that starts at or after a corresponding 6 symbol gap. In the event that the ACK/NACK indication is a NACK, the base station may format a rescheduling and retransmission 430 to the UE, which may be transmitted in a first downlink sTTI that starts at or after a 6-symbol gap in uplink sTTIs, which in this example is downlink sTTI-7 435.

Similarly, ACK/NACK feedback for downlink sTTI-1 may be transmitted in uplink sTTI-5, ACK/NACK feedback for downlink sTTI-2 may be transmitted in uplink sTTI-6, and so on. Likewise, rescheduling and retransmission of a transmission that has a NACK may follow the same n+4 rule. Thus, overall HARQ feedback timing may be reduced when using sTTIs relative to 1 ms TTIs. For example, under the n+4 timing rule, the minimum DL and UL HARQ delay is 6 symbols and minimum RTT is 16 symbols (6 for UE and base station processing, 2 for downlink transmission, and 2 for uplink transmission), and thus a retransmission will occur in a different subframe, or more than 1 ms, than an initial transmission. The same conclusion holds for other UL/DL sTTI combinations. For low latency services with high reliability requirements, such as some proposed URLLC requirements, HARQ feedback using an n+4 timing may not provide targeted reliability in an efficient manner.

Figure 5:
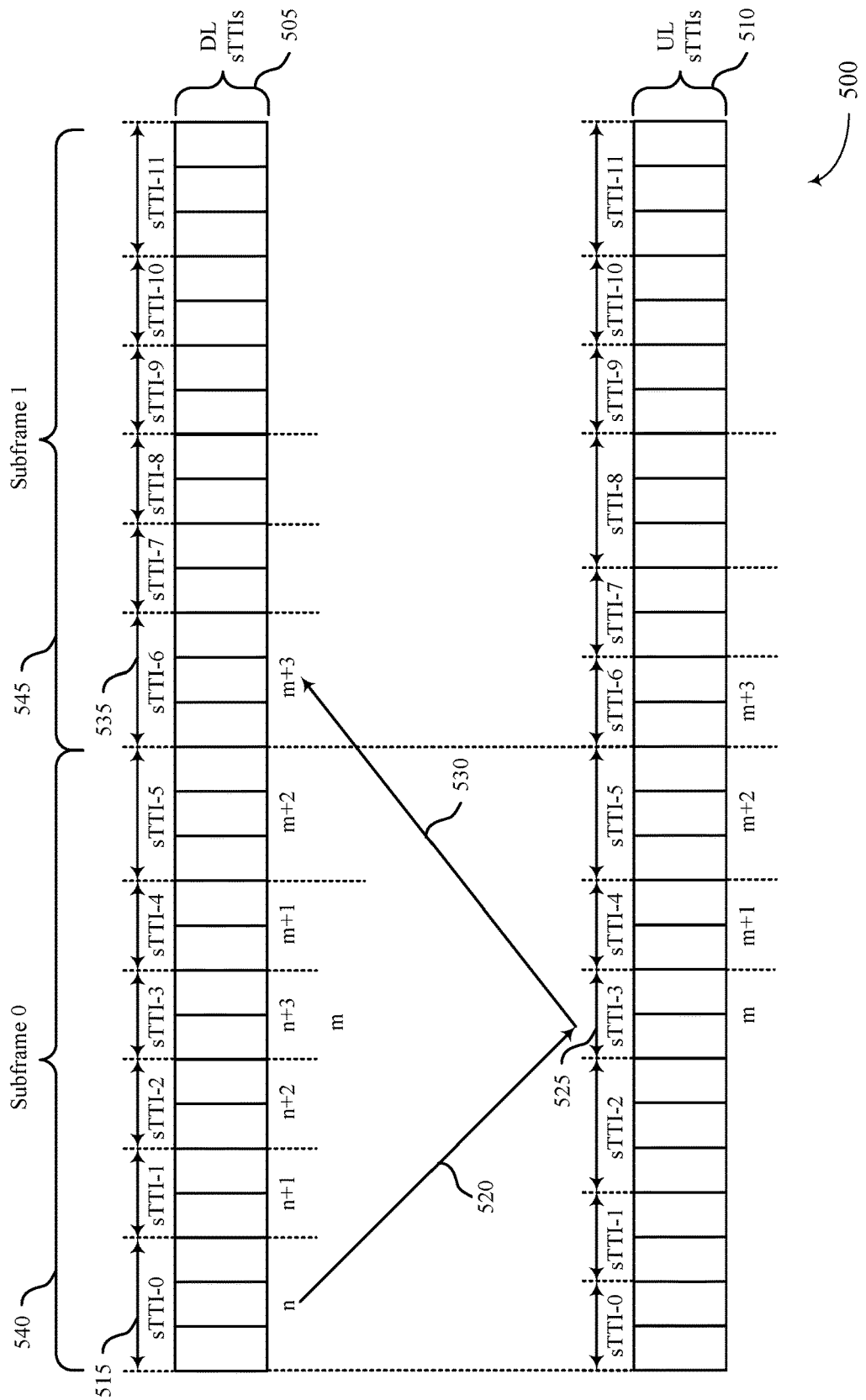
FIG. 5 illustrates an example of a n+3 feedback timing that supports feedback timing management for low latency communications in accordance with aspects of the present disclosure.

FIG. 5 illustrates an example of a n+3 feedback timing for uplink and downlink sTTIs 500 that supports feedback timing management for low latency communications in accordance with various aspects of the present disclosure. Uplink and downlink sTTIs 500 may be used for communications between a UE and a base station such as discussed above with respect to FIGS. 1 and 2. In this example, downlink sTTIs 505 may be used for downlink transmissions from a base station to a UE, and be transmitted using the pattern {3,2,2,2,2,3} as discussed above, which repeats for a first subframe (subframe 0) 540 and a second subframe (subframe 1) 545. Similarly, uplink sTTIs 510 may be used for uplink transmissions from a UE to a base station, and be transmitted using the pattern {2,2,3,2,2,3} as discussed above, which repeats for a first subframe (subframe 0) 540 and a second subframe (subframe 1) 545.

In this example, a first downlink sTTI 515 may be transmitted to a UE, and the UE may attempt to demodulate and decode the transmission and generate an ACK/NACK indication 520 that may be transmitted in uplink sTTI 525, which may be a first uplink sTTI that starts at or after n+3 sTTIs after the first downlink sTTI 515. In the event that the ACK/NACK indication is a NACK, the base station may format a rescheduling and retransmission 530 to the UE, which may be transmitted in a first downlink sTTI that starts at or after m+3 uplink sTTIs, which in this example is downlink sTTI 535 corresponding to sTTI-6, which is the first sTTI of the second subframe 545.

Similarly, ACK/NACK feedback for downlink sTTI-1 may be transmitted in uplink sTTI-4, ACK/NACK feedback for downlink sTTI-2 may be transmitted in uplink sTTI-5, and so on. Likewise, rescheduling and retransmission of a transmission that has a NACK may follow the same n+3 rule. Thus, overall HARQ feedback timing using an n+3 rule may be reduced relative to HARQ timing using an n+4 rule. However, similarly as with the n+4 rule a retransmission will occur in a different subframe than, or more than 1 ms after, an initial transmission. The same conclusion holds for other UL/DL sTTI combinations as well.

Figure 6:
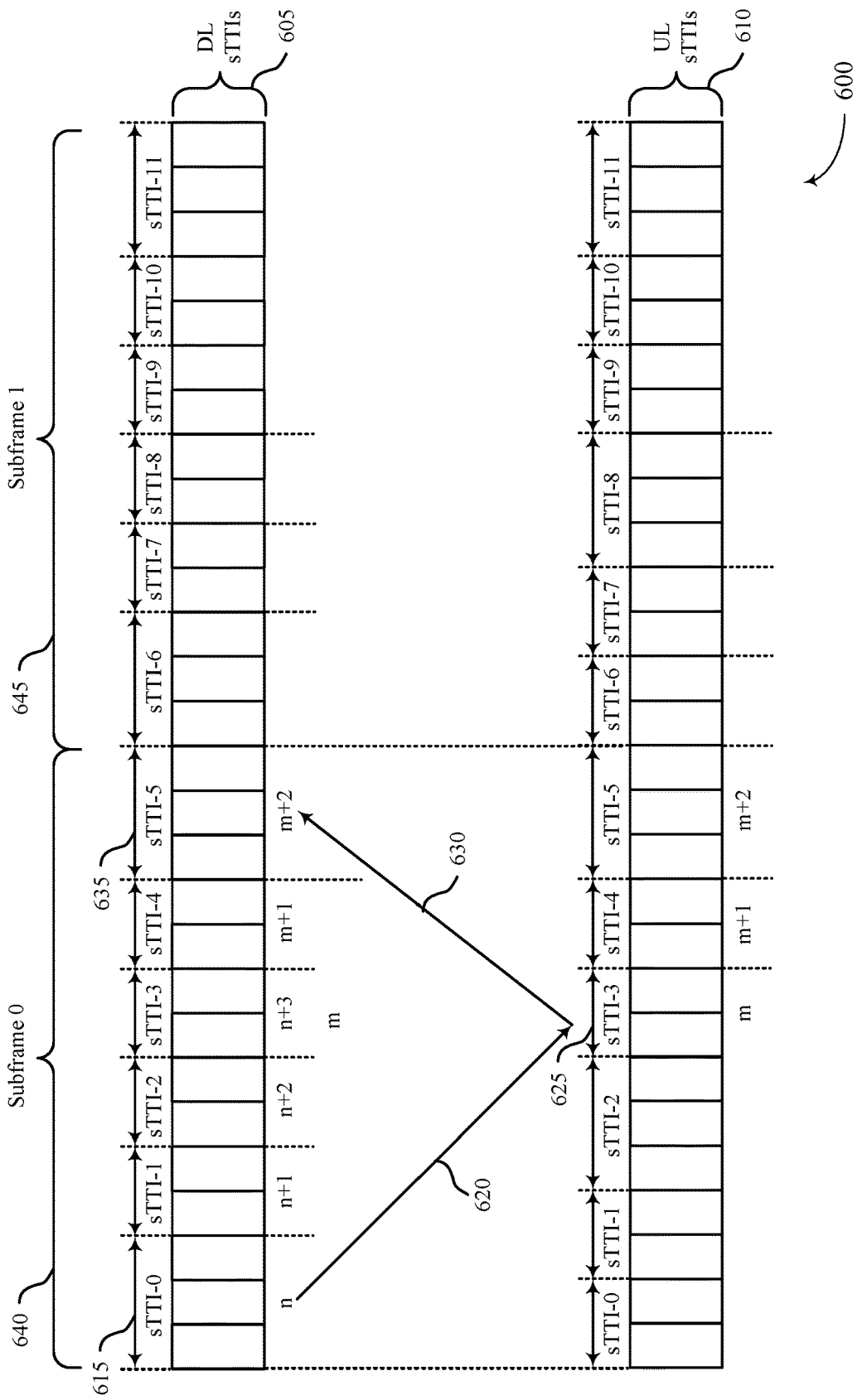
FIG. 6 illustrates an example of a mixed uplink/downlink feedback timing that supports feedback timing management for low latency communications in accordance with aspects of the present disclosure.

FIG. 6 illustrates an example of a mixed uplink/downlink feedback timing for uplink and downlink sTTIs 600 that supports feedback timing management for low latency communications in accordance with various aspects of the present disclosure. Uplink and downlink sTTIs 600 may be used for communications between a UE and a base station such as discussed above with respect to FIGS. 1 and 2. In this example, downlink sTTIs 605 may be used for downlink transmissions from a base station to a UE, and be transmitted using the pattern {3,2,2,2,2,3} as discussed above, which repeats for a first subframe (subframe 0) 640 and a second subframe (subframe 1) 645. Similarly, uplink sTTIs 610 may be used for uplink transmissions from a UE to a base station, and be transmitted using the pattern {2,2,3,2,2,3} as discussed above, which repeats for a first subframe (subframe 0) 640 and a second subframe (subframe 1) 645.

In this example, an n+3 timing may be used as a feedback timing for transmitting an uplink ACK/NACK transmission, and an n+2 timing may be used as a rescheduling timing for rescheduling and retransmitting a downlink transmission. In this example, a first downlink sTTI 615 may be transmitted to a UE, and the UE may attempt to demodulate and decode the transmission and generate an ACK/NACK indication 620 that may be transmitted in uplink sTTI 625, which may be a first uplink sTTI that starts at or after n+3 sTTIs after the first downlink sTTI 615, corresponding to sTTI-3 in this example. In the event that the ACK/NACK indication is a NACK, the base station may format a rescheduling and retransmission 630 to the UE, which may be transmitted in a first downlink sTTI that starts at or after m+2 uplink sTTIs, which in this example is downlink sTTI 635 corresponding to sTTI-5, which is the last sTTI of the first subframe 640. Thus, such a HARQ timing may provide a retransmission within a same subframe as an initial transmission, or within 1 ms of an initial transmission.

Similarly, ACK/NACK feedback for downlink sTTI-1 may be transmitted in uplink sTTI-3, ACK/NACK feedback for downlink sTTI-2 may be transmitted in uplink sTTI-5, and so on. Likewise, rescheduling and retransmission of a transmission that has a NACK may follow the same n+2 rule. Thus, overall HARQ feedback timing using such a mixed feedback timing may be further reduced and also provide for rescheduling and retransmission of a transmission within a same subframe as the initial transmission, or within one millisecond of the initial transmission.

Figure 7:
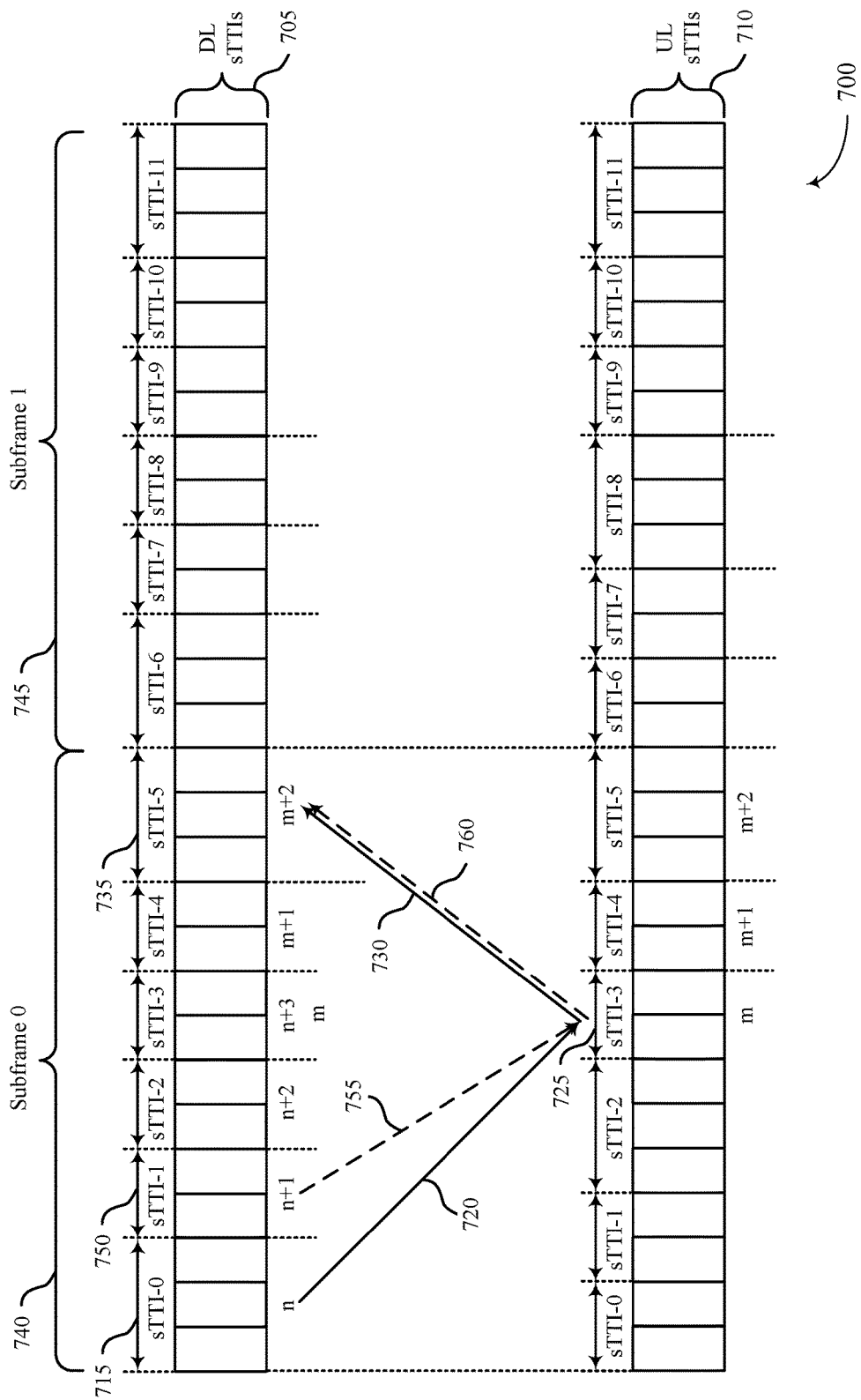
FIG. 7 illustrates an example of a n+2 feedback timing that supports feedback timing management for low latency communications in accordance with aspects of the present disclosure.

FIG. 7 illustrates an example of a n+2 feedback timing for uplink and downlink sTTIs 700 that supports feedback timing management for low latency communications in accordance with various aspects of the present disclosure. Uplink and downlink sTTIs 700 may be used for communications between a UE and a base station such as discussed above with respect to FIGS. 1 and 2. In this example, downlink sTTIs 705 may be used for downlink transmissions from a base station to a UE, and be transmitted using the pattern {3,2,2,2,2,3} as discussed above, which repeats for a first subframe (subframe 0) 740 and a second subframe (subframe 1) 745. Similarly, uplink sTTIs 710 may be used for uplink transmissions from a UE to a base station, and be transmitted using the pattern {2,2,3,2,2,3} as discussed above, which repeats for a first subframe (subframe 0) 740 and a second subframe (subframe 1) 745.

In this example, an n+2 timing may be used as a feedback timing for transmitting an uplink ACK/NACK transmission, and the n+2 timing may be used as a rescheduling timing for rescheduling and retransmitting a downlink transmission. In this example, a first downlink sTTI 715 may be transmitted to a UE, and the UE may attempt to demodulate and decode the transmission and generate an ACK/NACK indication 720 that may be transmitted in uplink sTTI 725, which may be a first uplink sTTI that starts at or after n+2 sTTIs after the first downlink sTTI 715, corresponding to sTTI-3 in this example, due to uplink sTTI-2 starting before downlink sTTI-2. In the event that the ACK/NACK indication is a NACK, the base station may format a rescheduling and retransmission 730 to the UE, which may be transmitted in a first downlink sTTI that starts at or after m+2 uplink sTTIs, which in this example is downlink sTTI 735 corresponding to downlink sTTI-5, which is the last sTTI of the first subframe 740.

In this example, a second sTTI 750 following the first downlink sTTI 715 may have a second downlink transmission, and the UE may attempt to demodulate and decode the transmission and generate an ACK/NACK indication 755 that may be transmitted in the uplink sTTI 725, which may be a first uplink sTTI that starts at or after n+2 sTTIs after the second downlink sTTI 750, corresponding to sTTI-3 in this example. Thus, in this example, due to the configuration combination of the downlink sTTIs 705 and the uplink sTTIs 710, uplink sTTI 725 may include HARQ feedback for two downlink sTTIs. In some cases, coding may be applied to the multiple HARQ transmissions, such as RM coding or Turbo coding, or HARQ feedback may be bundles across sTTIs. Following a NACK associated with the second downlink transmission, the base station may format a rescheduling and retransmission 760 to the UE, which may be transmitted in a first downlink sTTI that starts at or after m+2 uplink sTTIs, which in this example is downlink sTTI 735 corresponding to downlink sTTI-5, which is the last sTTI of the first subframe 740. In some cases, a base station may schedule one or both retransmissions to occur in a subsequent downlink sTTI in the event that two retransmissions may be transmitted in a same downlink sTTI. Thus, using a n+2 rule on the uplink and downlink may, for certain combinations or uplink and downlink sTTI configurations, result in multiple transmissions that may be eligible for transmission in a same uplink or downlink sTTI. In some examples, specific combinations of sTTI configurations may be selected so as to provide that such multiple transmissions within one sTTI may be avoided. For example, as illustrated in FIG. 8, a downlink configuration of {3, 2, 2, 2, 2, 3} in conjunction with an uplink sTTI pattern of {3, 2, 2, 2, 2, 3} can be arranged with efficient HARQ timings.

Figure 8:
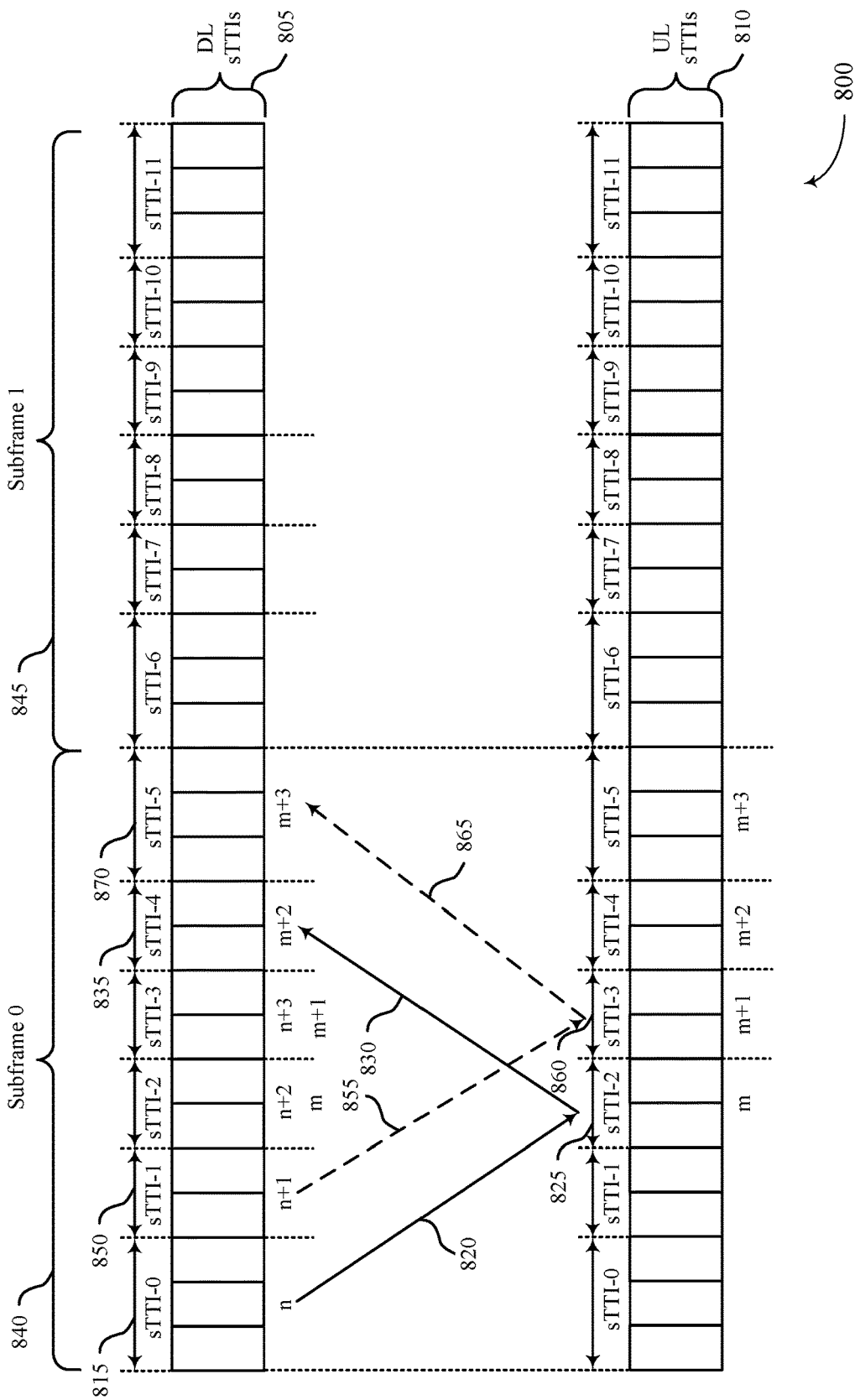
FIG. 8 illustrates an example of a n+2 feedback timing and configured sTTI structure that supports feedback timing management for low latency communications in accordance with aspects of the present disclosure.

FIG. 8 illustrates an example of a n+2 feedback timing and configured sTTI structure 800 that supports feedback timing management for low latency communications in accordance with various aspects of the present disclosure. Downlink and uplink sTTIs 805 and 810 may be used for communications between a UE and a base station such as discussed above with respect to FIGS. 1 and 2. In this example, downlink sTTIs 805 may be used for downlink transmissions from a base station to a UE, and be transmitted using the pattern {3,2,2,2,2,3} as discussed above, which repeats for a first subframe (subframe 0) 840 and a second subframe (subframe 1) 845. Similarly, uplink sTTIs 810 may be used for uplink transmissions from a UE to a base station, and be transmitted using the pattern {3,2,2,2,2,3} as discussed above, which repeats for a first subframe (subframe 0) 840 and a second subframe (subframe 1) 845.

In this example, an n+2 timing may be used as a feedback timing for transmitting an uplink ACK/NACK transmission, and the n+2 timing may be used as a rescheduling timing for rescheduling and retransmitting a downlink transmission. In this example, a first downlink sTTI 815 may be transmitted to a UE, and the UE may attempt to demodulate and decode the transmission and generate an ACK/NACK indication 820 that may be transmitted in uplink sTTI 825, which may be a first uplink sTTI that starts at or after n+2 sTTIs after the first downlink sTTI 815, corresponding to uplink sTTI-2 in this example. In the event that the ACK/NACK indication is a NACK, the base station may format a rescheduling and retransmission 830 to the UE, which may be transmitted in a first downlink sTTI that starts at or after m+2 uplink sTTIs, which in this example is downlink sTTI 835 corresponding to downlink sTTI-4.

In this example, a second sTTI 850 following the first downlink sTTI 815 may have a second downlink transmission, and the UE may attempt to demodulate and decode the transmission and generate an ACK/NACK indication 855 that may be transmitted in the uplink sTTI 860, which may be a first uplink sTTI that starts at or after n+2 sTTIs after the second downlink sTTI 850, corresponding to sTTI-3 in this example. Following a NACK associated with the second downlink transmission, the base station may format a rescheduling and retransmission 865 to the UE, which may be transmitted in a downlink sTTI that starts at or after m+2 uplink sTTIs, which in this example is downlink sTTI 870 corresponding to downlink sTTI-5. Thus, using a n+2 rule on the uplink and downlink and such a combination of uplink and downlink sTTI configurations, multiple transmissions for transmission in a same uplink or downlink sTTI may be avoided.

Figure 9:
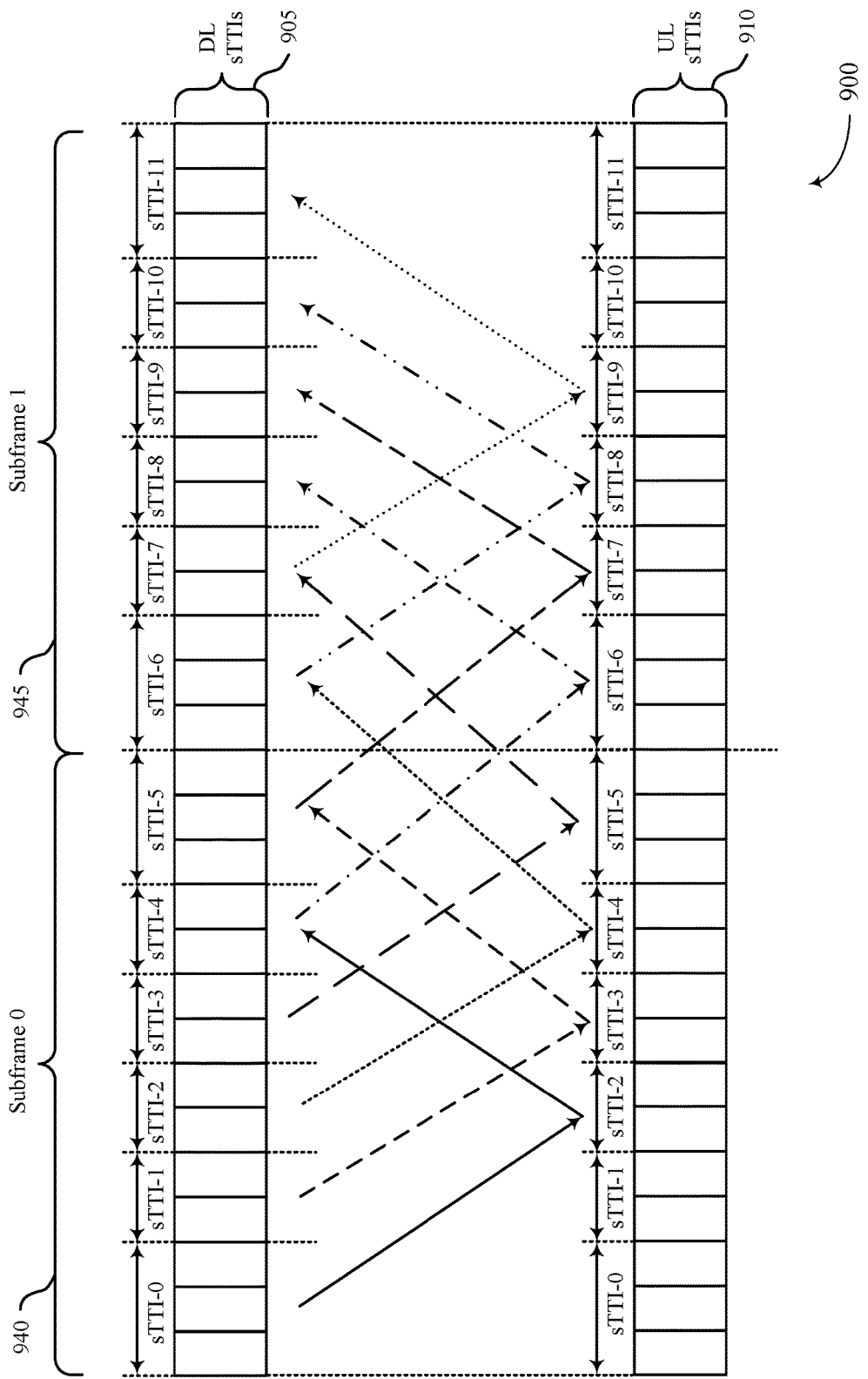
FIG. 9 illustrates an example of a corresponding uplink and downlink sTTI structure that supports feedback timing management for low latency communications in accordance with aspects of the present disclosure.

FIG. 9 illustrates an example of a corresponding uplink and downlink sTTI structure 900 that supports feedback timing management for low latency communications in accordance with various aspects of the present disclosure. Uplink and downlink sTTI structure 900 may be used for communications between a UE and a base station such as discussed above with respect to FIGS. 1 and 2. In this example, downlink sTTIs 905 may be used for downlink transmissions from a base station to a UE, and may be transmitted using the pattern {3,2,2,2,2,3} as discussed above, which repeats for a first subframe (subframe 0) 940 and a second subframe (subframe 1) 945. Similarly, uplink sTTIs 910 may be used for uplink transmissions from a UE to a base station, and may be transmitted using the pattern {3,2,2,2,2,3} as discussed above, which repeats for a first subframe (subframe 0) 940 and a second subframe (subframe 1) 945.

As discussed above with respect to FIG. 8, there can be a connection between a downlink two-symbol sTTI structure and an uplink two-symbol sTTI structure that may allow n+2 HARQ timing without multiple HARQ ACK/NACK or retransmissions in one sTTI. In some deployments, one particular uplink structure may be configured for a system which may be down-selected as part of a system configuration. In some cases, instead of down-selecting from one of the two uplink structures, given that there are two downlink structures, each of the two uplink sTTI structures may be supported. Such support of multiple uplink and downlink sTTI structures may result in four possible combinations between DL/UL structures, and in some cases, the number of combinations may be restricted based on some explicit or implicit signaling, such as dynamic or semi-static signaling. In one example, the UL structure may be determined based on a PCFICH transmission. For example, if PCFICH indicates one or three control symbols, DL structure may be {3, 2, 2, 2, 2, 3}, and the corresponding uplink structure may be set to {3, 2, 2, 2, 2, 3}. In another example, if PCFICH indicates two control symbols, the downlink structure may be set to {2, 3, 2, 2, 2, 3}, and the corresponding uplink structure may be set to {2, 2, 3, 2, 2, 3}. In such a manner, HARQ management may be simplified by avoiding multiple possible ACK/NACK or retransmissions in a same sTTI, as indicated by the down arrows in FIG. 9 that represent ACK/NACK transmissions and the up arrows in FIG. 9 that represent retransmissions.

Figure 10:
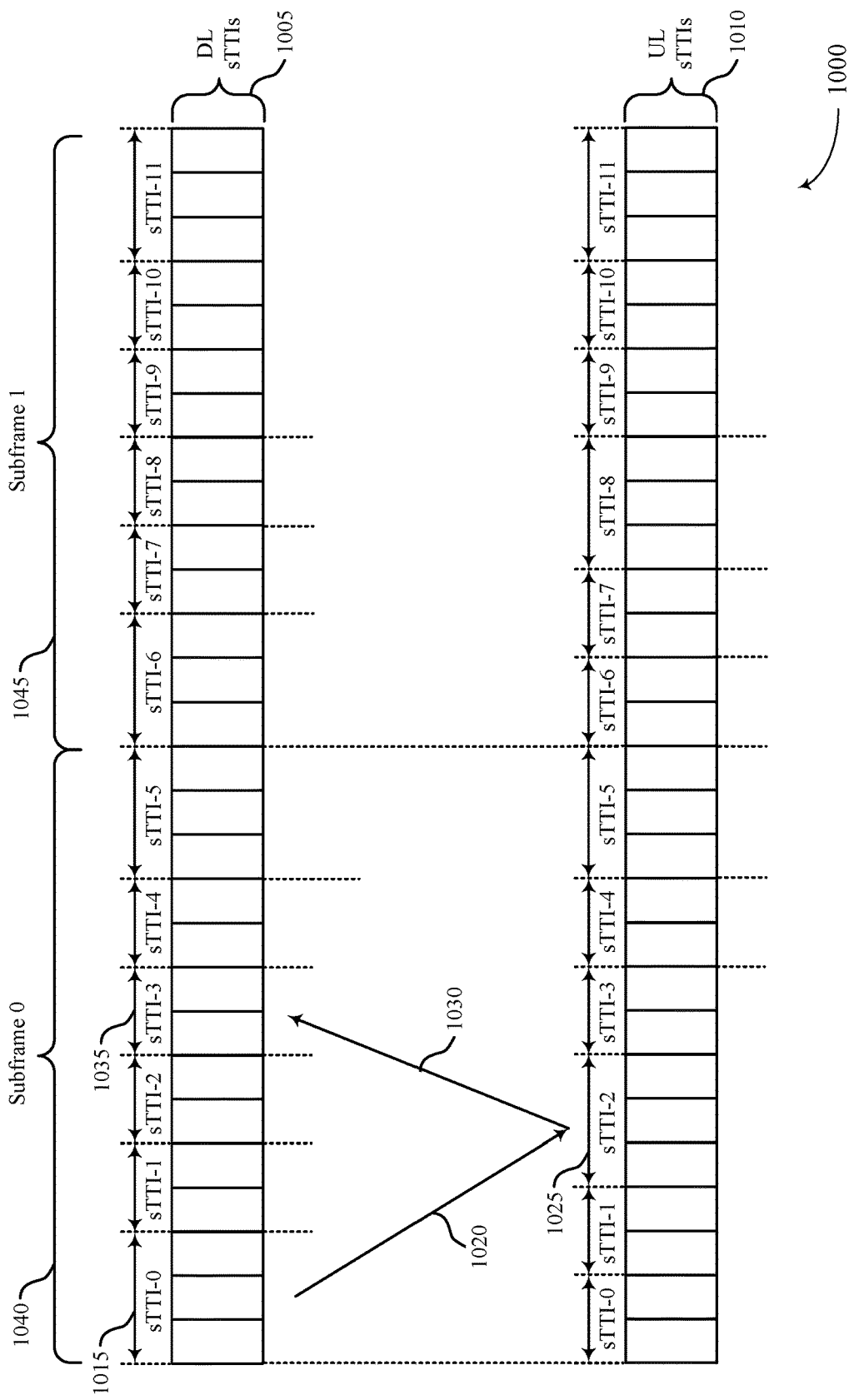
FIG. 10 illustrates an example of a n+1 feedback timing that supports feedback timing management for low latency communications in accordance with aspects of the present disclosure.

FIG. 10 illustrates an example of a n+1 feedback timing for uplink and downlink sTTIs 1000 that supports feedback timing management for low latency communications in accordance with various aspects of the present disclosure. Uplink and downlink sTTIs 1000 may be used for communications between a UE and a base station such as discussed above with respect to FIGS. 1 and 2. In this example, downlink sTTIs 1005 may be used for downlink transmissions from a base station to a UE, and be transmitted using the pattern {3,2,2,2,2,3} as discussed above, which repeats for a first subframe (subframe 0) 1040 and a second subframe (subframe 1) 1045. Similarly, uplink sTTIs 1010 may be used for uplink transmissions from a UE to a base station, and be transmitted using the pattern {2,2,3,2,2,3} as discussed above, which repeats for a first subframe (subframe 0) 1040 and a second subframe (subframe 1) 1045.

In this example, an n+1 timing may be used as a feedback timing for transmitting an uplink ACK/NACK transmission, and an n+1 timing may be used as a rescheduling timing for rescheduling and retransmitting a downlink transmission. In this example, a first downlink sTTI 1015 may be transmitted to a UE, and the UE may attempt to demodulate and decode the transmission and generate an ACK/NACK indication 1020 that may be transmitted in uplink sTTI 1025, which may be a first uplink sTTI that starts at or after n+1 sTTIs after the first downlink sTTI 1015, corresponding to sTTI-2 in this example. In the event that the ACK/NACK indication is a NACK, the base station may format a rescheduling and retransmission 1030 to the UE, which may be transmitted in a first downlink sTTI that starts at or after n+1 uplink sTTIs, which in this example is downlink sTTI 1035 corresponding to sTTI-3. Thus, such a HARQ timing may provide a retransmission within a same subframe as an initial transmission, or within 1 ms of an initial transmission. Such a HARQ timing may provide equal HARQ payload, but meeting such timelines may be challenging for some UEs.

Figure 11:
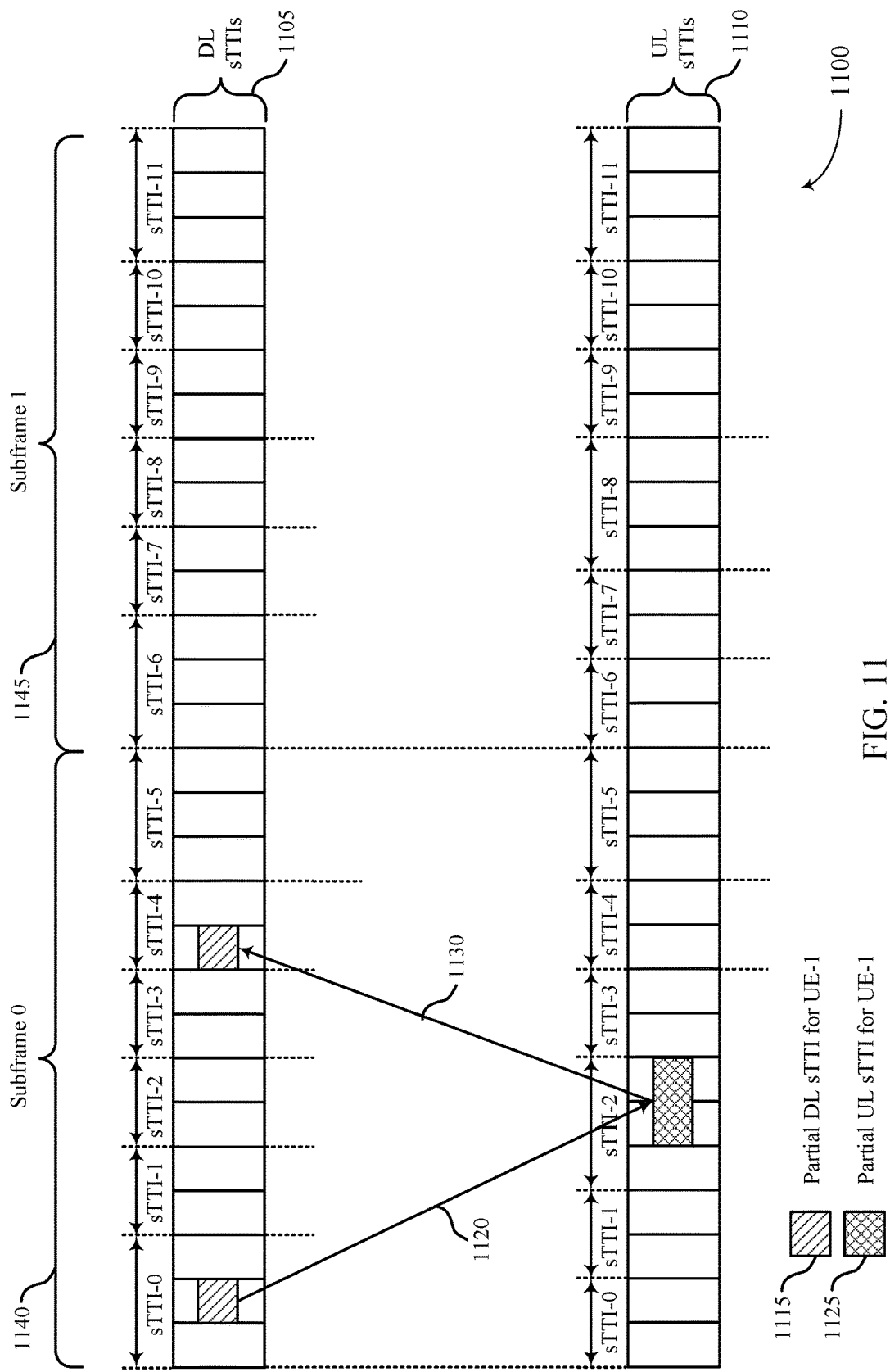
FIG. 11 illustrates an example of a partial sTTI configuration that supports feedback timing management for low latency communications in accordance with aspects of the present disclosure.

FIG. 11 illustrates an example of a partial sTTI configuration in uplink and downlink sTTIs 1100 that supports feedback timing management for low latency communications in accordance with various aspects of the present disclosure. Uplink and downlink sTTIs 1100 may be used for communications between a UE and a base station such as discussed above with respect to FIGS. 1 and 2. In this example, downlink sTTIs 1105 may be used for downlink transmissions from a base station to a UE, and may be transmitted using the pattern {3,2,2,2,2,3} as discussed above, which repeats for a first subframe (subframe 0) 1140 and a second subframe (subframe 1) 1145. Similarly, uplink sTTIs 1110 may be used for uplink transmissions from a UE to a base station, and transmitted using the pattern {2,2,3, 2,2,3} as discussed above, which repeats for a first subframe (subframe 0) 1140 and a second subframe (subframe 1) 1145.

In this example, a partial sTTI may be configured for a first downlink transmission 1115 to a UE in a downlink sTTI-0. In this example, the partial sTTI may occupy one symbol of a sTTI (e.g., a second symbol of a two-symbol sTTI), and a UE may be configured, (e.g., dynamically via DCI or semi-statically in RRC configurations) to attempt to demodulate and decode only the partial sTTI containing the first downlink transmission 1115. The UE may thus have to perform less processing to generate HARQ feedback relative to processing all sTTI symbols, which may provide reliable processing for the UE feedback timing, which in this example is a three-symbol gap for providing HARQ feedback in an uplink transmission. The rescheduling timing may be the same or different than the feedback timing, and in some examples rescheduling timing may be a two-symbol gap after the feedback indication is transmitted. In other examples, other HARQ timing may be used, such as n+1 timing, n+2 timing, n+3 timing, or combinations thereof.

In the example of FIG. 11, ACK/NACK transmission 1120 may be provided in a partial uplink sTTI 1125. Thus, in this example, both the uplink and downlink transmissions may use partial sTTIs, although any combination of uplink partial sTTIs downlink sTTIs may be used in various examples. In this example, the ACK/NACK transmission 1120 may occupy partial uplink sTTI 1125 and span two-symbols of a three-symbol uplink sTTI transmission, which may provide for enhanced coverage relative to an uplink transmission within a single symbol of the uplink sTTI. In other examples, the partial uplink sTTI may span portions of two symbols of a two-symbol sTTI, or may be contained within a single symbol of a sTTI.

In response to a NACK in the ACK/NACK transmission 1120, the base station may format a rescheduling and retransmission 1130 to the UE, which may be transmitted in a partial downlink sTTI that starts after a two-symbol gap, which in this example is downlink sTTI-4. Thus, such a HARQ timing may provide a retransmission within a same subframe as an initial transmission, or within 1 ms of an initial transmission.

Figure 12:
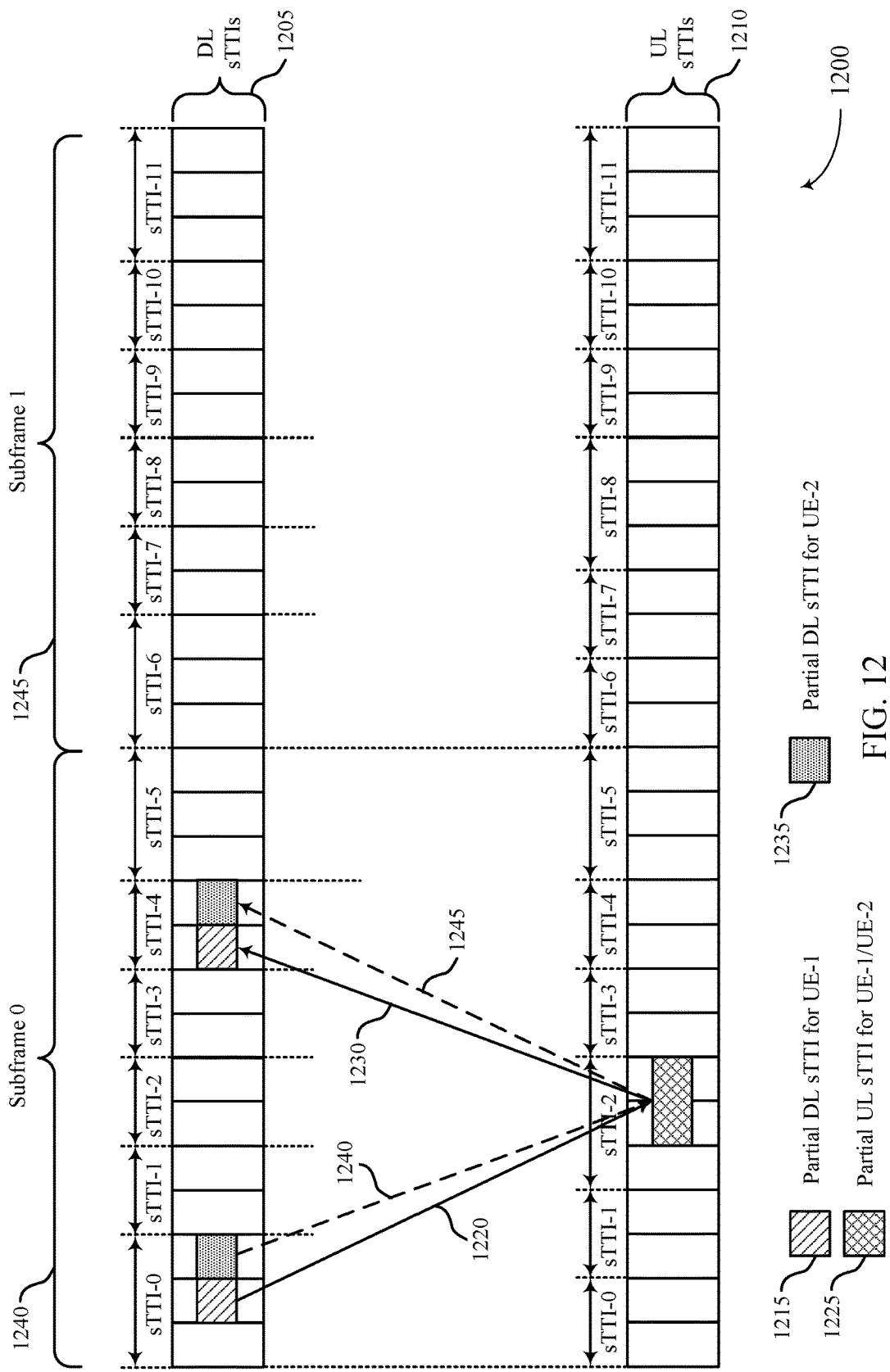
FIG. 12 illustrates an example of a partial sTTI configuration with time division multiplexing that supports feedback timing management for low latency communications in accordance with aspects of the present disclosure.

FIG. 12 illustrates an example of a partial sTTI configuration with time division multiplexing in uplink and downlink sTTIs 1200 that support feedback timing management for low latency communications in accordance with various aspects of the present disclosure. Uplink and downlink sTTIs 1200 may be used for communications between a first UE, a second UE, and a base station such as discussed above with respect to FIGS. 1 and 2. In this example, downlink sTTIs 1205 may be used for downlink transmissions from a base station to a UE, and be transmitted using the pattern {3,2,2,2,2,3} as discussed above, which repeats for a first subframe (subframe 0) 1240 and a second subframe (subframe 1) 1245. Similarly, uplink sTTIs 1210 may be used for uplink transmissions from a UE to a base station, and be transmitted using the pattern {2,2,3,2,2,3} as discussed above, which repeats for a first subframe (subframe 0) 1240 and a second subframe (subframe 1) 1245.

In this example, a first partial sTTI may be configured for a first downlink transmission 1215 to a first UE in a downlink sTTI-0. A second partial sTTI may be configured for a second downlink transmission 1235 to a second UE in the same downlink sTTI-0. In this example, the first partial sTTI may occupy one symbol of a sTTI (e.g., a second symbol of a three-symbol sTTI), and the second partial sTTI may occupy another symbol of the sTTI (e.g., a third symbol of a three-symbol sTTI), the first downlink transmission 1215 and the second downlink transmission 1235 may use time division multiplexing (TDM) to transmit to the first UE and the second UE. In other cases, multiple downlink transmissions to a same UE may use TDM in a similar manner. Each UE may be configured, (e.g., dynamically via DCI or semi-statically in RRC configurations) to attempt to demodulate and decode only the partial sTTI containing the downlink transmission associated with the particular UE. Similarly as discussed with reference to FIG. 11, each UE may thus have to perform less processing to generate HARQ feedback relative to processing all sTTI symbols, which may provide reliable processing for the UE feedback timing. In this example, different UEs may have different feedback timing, although in other examples UEs may have the same feedback timing. In this example, the first UE may have a three-symbol gap for providing HARQ feedback in an uplink transmission the second UE may have a two-symbol gap for providing HARQ feedback in the uplink transmission. The rescheduling timing may be the same or different than the feedback timing, and in some examples rescheduling timing may be a two-symbol gap for the first UE and a three symbol gap for the second UE. Of course, other combinations or rescheduling timing may be used in other examples.

In the example of FIG. 12, a first ACK/NACK transmission 1220 for the first downlink transmission 1215 of the first UE and a second ACK/NACK transmission 1240 for the second downlink transmission 1235 of the second UE may be provided in a partial uplink sTTI 1225 that may be shared by both the first UE and the second UE. In this example, the first ACK/NACK transmission 1220 and second ACK/NACK transmission 1240 may occupy partial uplink sTTI 1225 and span two-symbols of a three-symbol uplink sTTI transmission, which may provide for enhanced coverage relative to an uplink transmission within a single symbol of the uplink sTTI. In other examples, the partial uplink sTTI may span portions of two symbols of a two-symbol sTTI, or may be contained within a single symbol of a sTTI.

In response to a NACK in the first ACK/NACK transmission 1220 and the second ACK/NACK transmission 1240, the base station may format a first rescheduling and retransmission 1230 to the first UE and a second rescheduling and retransmission 1245 to the second UE, which may be transmitted in separate partial downlink sTTIs to the different UEs. In some cases, the partial sTTI locations for each UE may be UE-specific or cell-specific. For example, a UE may have a predetermined partial sTTI location, or the UE may be UE-specifically configured, or a UE-specific dynamic configuration may be provided. In some cases, due to different HARQ timings for the first UE and the second UE, each partial sTTI of the first UE may be associated with larger TBS and/or UL max TA than a partial sTTI of the second UE. In some cases, feedback timing for a UE may be a function of UE capability (e.g., higher capable UEs can be associated with a shorter feedback transmission timing).

Figure 13:
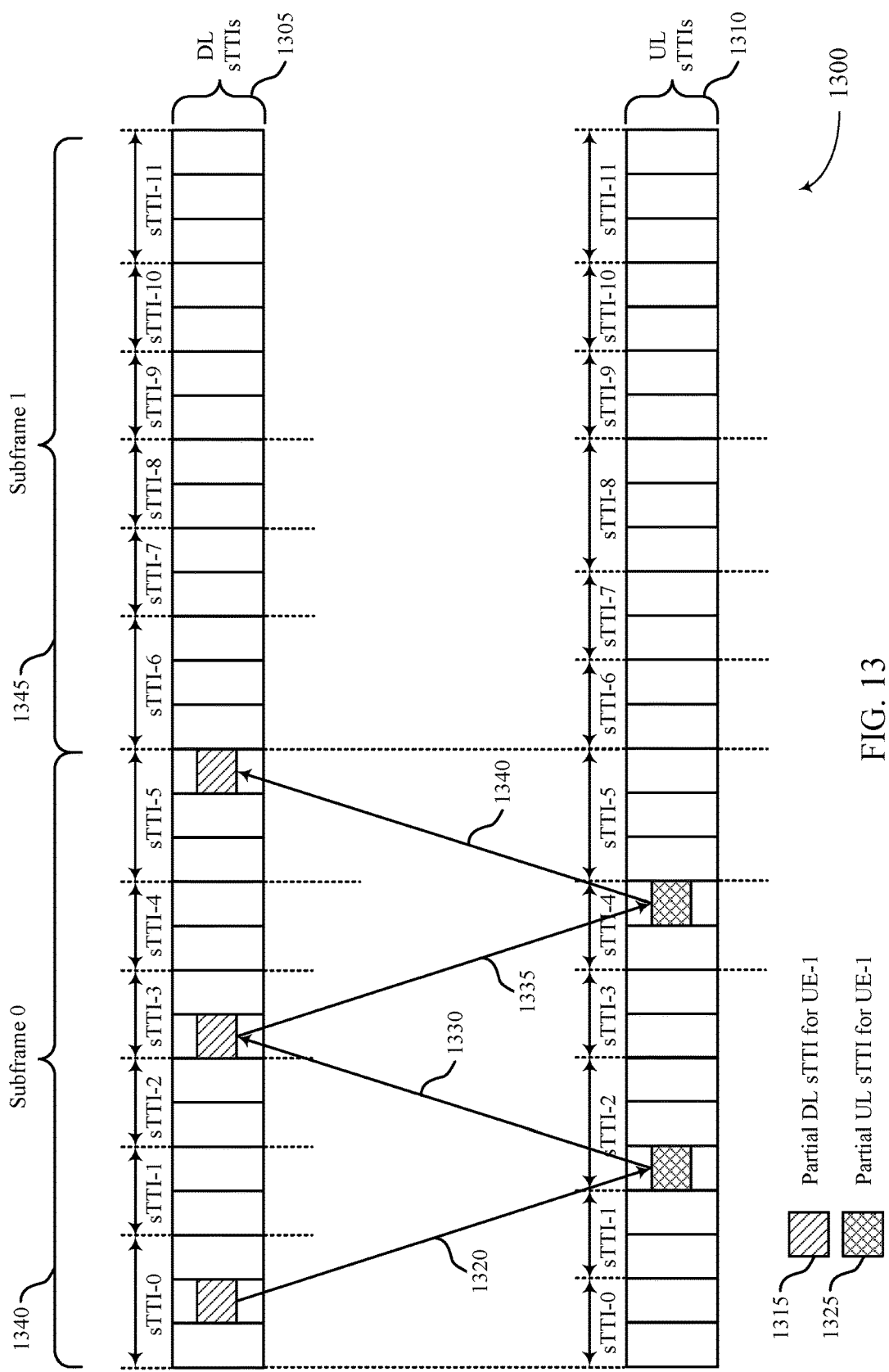
FIG. 13 illustrates an example of a partial sTTI configuration that supports three transmissions in a subframe that supports feedback timing management for low latency communications in accordance with aspects of the present disclosure.

FIG. 13 illustrates an example of a partial sTTI configuration that supports three transmissions in a subframe of uplink and downlink sTTIs 1300 that supports feedback timing management for low latency communications in accordance with various aspects of the present disclosure. Uplink and downlink sTTIs 1300 may be used for communications between a UE and a base station such as discussed above with respect to FIGS. 1 and 2. In this example, downlink sTTIs 1305 may be used for downlink transmissions from a base station to a UE, and transmitted using the pattern {3,2,2,2,2,3} as discussed above, which repeats for a first subframe (subframe 0) 1340 and a second subframe (subframe 1) 1345. Similarly, uplink sTTIs 1310 may be used for uplink transmissions from a UE to a base station, and transmitted using the pattern {2,2,3,2,2,3} as discussed above, which repeats for a first subframe (subframe 0) 1340 and a second subframe (subframe 1) 1345.

In this example, a first partial sTTI may be configured for a first downlink transmission 1315 to a first UE in downlink sTTI-0. In this example, the first partial sTTI may occupy one symbol of a sTTI (e.g., a second symbol of a three-symbol sTTI). While downlink and uplink transmissions for one UE are illustrated in this example, TDM techniques may be used for multiple UEs similarly as discussed with reference to FIG. 12. The UE may be configured, (e.g., dynamically via DCI or semi-statically in RRC configurations) to attempt to demodulate and decode only the partial sTTI containing the downlink transmission associated with the UE. In this example, the UE may have a two-symbol gap for providing HARQ feedback 1320 in an uplink transmission. The rescheduling timing may be the same or different than the feedback timing, and in some examples rescheduling timing may be a two-symbol gap. In some examples, other combinations or rescheduling timing may be used.

In the example of FIG. 13, the first ACK/NACK transmission or HARQ feedback 1320 for the first downlink transmission 1315 of the first UE may be provided in a partial uplink sTTI 1325. In this example, partial uplink sTTI 1325 spans one symbol of a three-symbol uplink sTTI transmission. In response to a NACK in the first ACK/NACK transmission 1320, the base station may format a first rescheduling and retransmission 1330 to the first UE, which may be transmitted in a partial downlink sTTI of sTTI-3. The first UE may again try to demodulate and decode the first rescheduling and retransmission 1330. The first UE may again have a two-symbol gap for providing a second ACK/NACK transmission 1335 in a partial uplink sTTI transmission in uplink sTTI-4. Furthermore, in this example, in response to a NACK in the second ACK/NACK transmission 1335, the base station may format a second rescheduling and retransmission 1340 to the first UE, which may be transmitted in a partial downlink sTTI of sTTI-5. Thus, in this example, three downlink transmissions may be transmitted to the UE, namely the initial downlink transmission and two retransmissions. Thus, in examples such as in FIG. 13, three transmission opportunities may be provided within a subframe or within a 1 ms time period. In some cases, such techniques may allow for other sTTI structures other than the 2-symbol sTTI structures as discussed above. In some cases, the feedback timing gap and the rescheduling timing gap may be a one-symbol gap, which may allow four opportunities for transmitting a downlink transmission (an initial transmission and three retransmissions).

Figure 14:
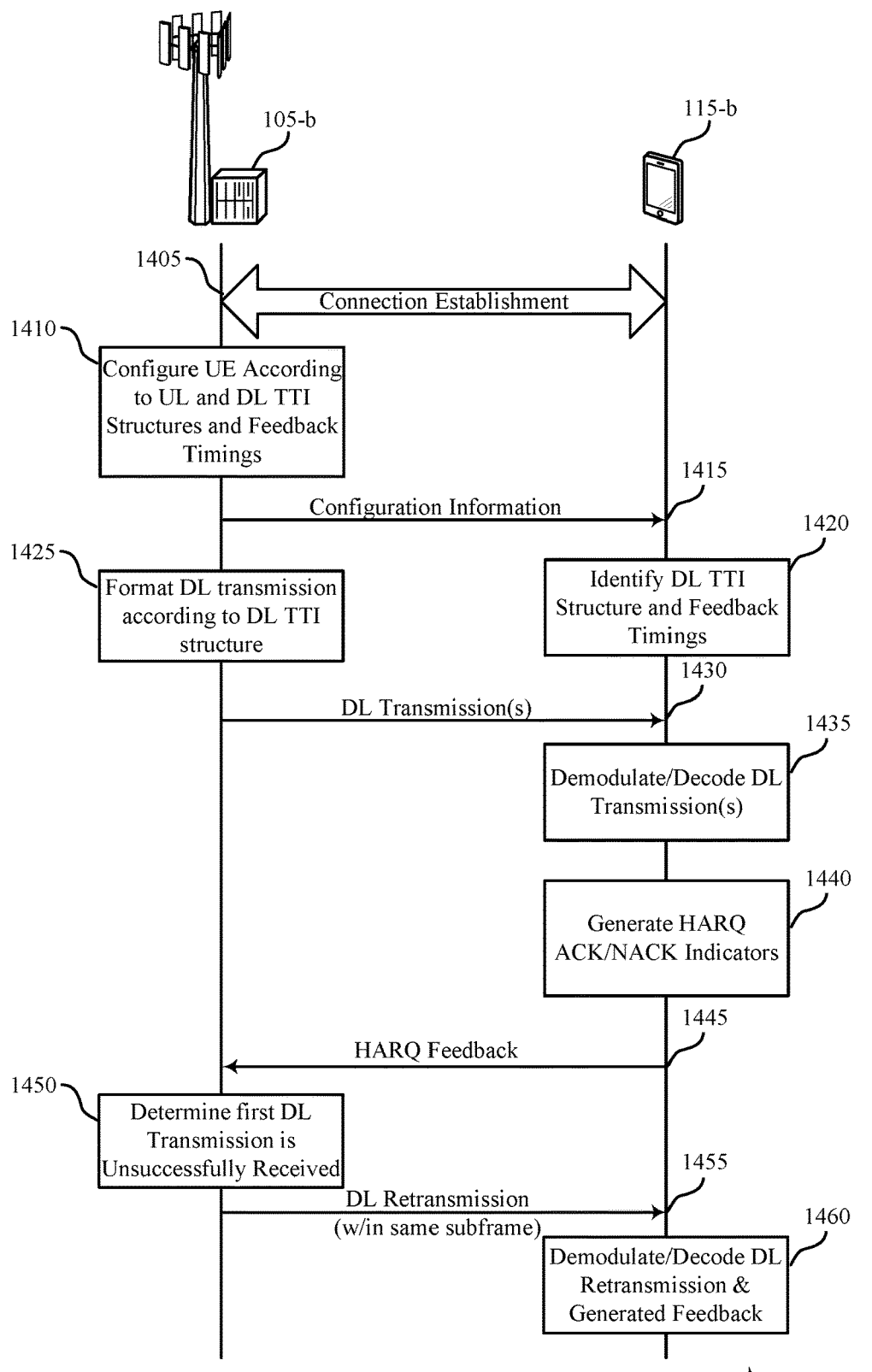
FIG. 14 illustrates an example of a process flow that supports feedback timing management for low latency communications in accordance with aspects of the present disclosure.

FIG. 14 illustrates an example of a process flow 1400 that supports feedback timing management for low latency communications in accordance with various aspects of the present disclosure. Process flow 1400 may include a base station 105-*b*, and a UE 115-*b*, which may be examples of the corresponding devices described with reference to FIG. 1-2. The base station 105-*b* and the UE 115-*b* may establish a connection 1405 according to connection establishment techniques for the wireless communications system.

At block 1410, base station 105-*b* may configure the UE 115-*b* according to uplink and downlink TTI lengths and with sTTI configurations and HARQ timing. For example, the base station 105-*b* may determine that the UE 115-*b* may operate using low latency communications and may configure the UE 115-*b* to use sTTIs when low-latency data (e.g., URLLC data or MiCr data) is to be transmitted. The base station 105-*b* may transmit the configuration information 1415 to the UE 115-*b*.

At block 1420, the UE 115-*b* may identify a downlink sTTI structure and HARQ feedback timings based on the configuration information. In some cases, the sTTI structure and HARQ timings may be configured semi-statically via RRC signaling. In other cases, the sTTI structure and HARQ timings may be configured dynamically via DCI for a downlink transmission, for example.

At block 1425, the base station 105-*b* may format the downlink transmission according to the configured downlink sTTI structures. The base station 105-*b* may then transmit the downlink transmission(s) 1430 to the UE 115-*b*.

At block 1435, the UE 115-*b* may attempt to demodulate and decode the downlink transmission(s). Demodulation and decoding may be performed for one or more sTTIs where the UE 115-*b* has allocated resources. In some cases, the demodulation and decoding is performed in a partial sTTI based on the UE 115-*b* being configured to receive a partial sTTI in which downlink control and data are included in a single symbol of a downlink sTTI.

At block 1440, the UE 115-*b* may generate HARQ ACK/NACK feedback for the downlink transmission(s) 1430. HARQ ACK/NACK feedback may be determined based on successful or unsuccessful demodulation and decoding of the downlink transmission(s). The UE 115-*b* may transmit the HARQ feedback 1445 to the base station 105-*b*.

At block 1450, the base station may determine that a first downlink transmission was not successfully received at the UE 115-*b*. In some cases, such a determination may be made based on receiving a NACK from the UE 115-*b* associated with the first downlink transmission. The base station 105-*b* may format a retransmission of the first downlink transmission and may transmit the retransmission 1455 to the UE 115-*b*. At block 1460, the UE 115-*b*, may perform received signal processing to demodulate/decode the retransmission and generate HARQ feedback. In some cases, where the retransmission is not successfully received, the operations of blocks 1440 through 1460 may be repeated. In some examples, the downlink transmission(s) 1430 and the downlink retransmission 1455 may both be transmitted within a same subframe or within 1 ms of each other, thus helping to enhance low latency operation.

Figure 15:
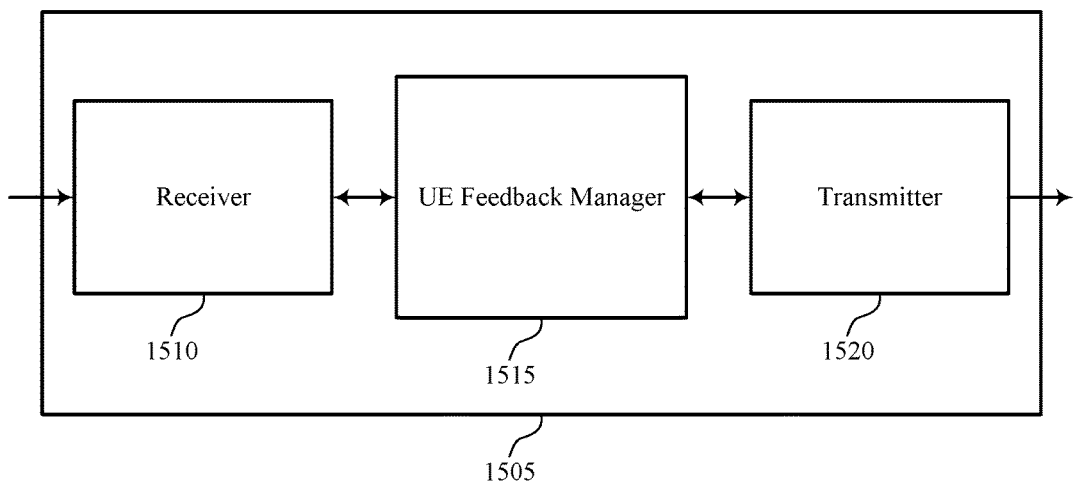
FIGS. 15 through 17 show block diagrams of a device that supports feedback timing management for low latency communications in accordance with aspects of the present disclosure.

FIG. 15 shows a block diagram 1500 of a wireless device 1505 that supports feedback timing management for low latency communications in accordance with various aspects of the present disclosure. Wireless device 1505 may be an example of aspects of a user equipment (UE) 115 as described with reference to FIG. 1. Wireless device 1505 may include receiver 1510, UE feedback manager 1515, and transmitter 1520. Wireless device 1505 may also include a processor. Each of these components may be in communication with one another (e.g., via one or more buses).

Receiver 1510 may receive information such as packets, user data, or control information associated with various information channels (e.g., control channels, data channels, and information related to feedback timing management for low latency communications, etc.). Information may be passed on to other components of the device. The receiver 1510 may be an example of aspects of the transceiver 1835 described with reference to FIG. 18.

UE feedback manager 1515 may be an example of aspects of the UE feedback manager 1815 described with reference to FIG. 18.

UE feedback manager 1515 and/or at least some of its various sub-components may be implemented in hardware, software executed by a processor, firmware, or any combination thereof. If implemented in software executed by a processor, the functions of the UE feedback manager 1515 and/or at least some of its various sub-components may be executed by a general-purpose processor, a digital signal processor (DSP), an application-specific integrated circuit (ASIC), an field-programmable gate array (FPGA) or other programmable logic device, discrete gate or transistor logic, discrete hardware components, or any combination thereof designed to perform the functions described in the present disclosure. The UE feedback manager 1515 and/or at least some of its various sub-components may be physically located at various positions, including being distributed such that portions of functions are implemented at different physical locations by one or more physical devices. In some examples, UE feedback manager 1515 and/or at least some of its various sub-components may be a separate and distinct component in accordance with various aspects of the present disclosure. In other examples, UE feedback manager 1515 and/or at least some of its various sub-components may be combined with one or more other hardware components, including but not limited to an I/O component, a transceiver, a network server, another computing device, one or more other components described in the present disclosure, or a combination thereof, in accordance with various aspects of the present disclosure.

UE feedback manager 1515 may identify a downlink transmission time interval (TTI) structure and a feedback configuration, based on the downlink TTI structure, for transmitting a feedback indication associated with a first downlink TTI, receive, unsuccessfully, a first downlink transmission in the first downlink TTI, generate a NACK as a first feedback indication associated with the first downlink TTI according to the identified feedback configuration, transmit the first feedback indication in an uplink transmission during a first uplink TTI, and receive, based on the first feedback indication, a retransmission of the first downlink transmission in a second downlink TTI, where the first downlink TTI and the second downlink TTI are located within a same subframe.

The UE feedback manager 1515 may also identify a first portion of a first downlink TTI for receiving a first downlink transmission, identify a first uplink TTI for transmitting a feedback indication associated with the first downlink transmission, receive, unsuccessfully, the first downlink transmission in the first portion of the first downlink TTI, generate a NACK as a first feedback indication associated with the first downlink transmission, transmit the first feedback indication in an uplink transmission during the first uplink TTI, and receive, based on the first feedback indication, a retransmission of the first downlink transmission in a second portion of a second downlink TTI, where the first downlink TTI and the second downlink TTI are located within a same subframe.

Transmitter 1520 may transmit signals generated by other components of the device. In some examples, the transmitter 1520 may be collocated with a receiver 1510 in a transceiver module. For example, the transmitter 1520 may be an example of aspects of the transceiver 1835 described with reference to FIG. 18. The transmitter 1520 may include a single antenna, or it may include a set of antennas.

Figure 16:
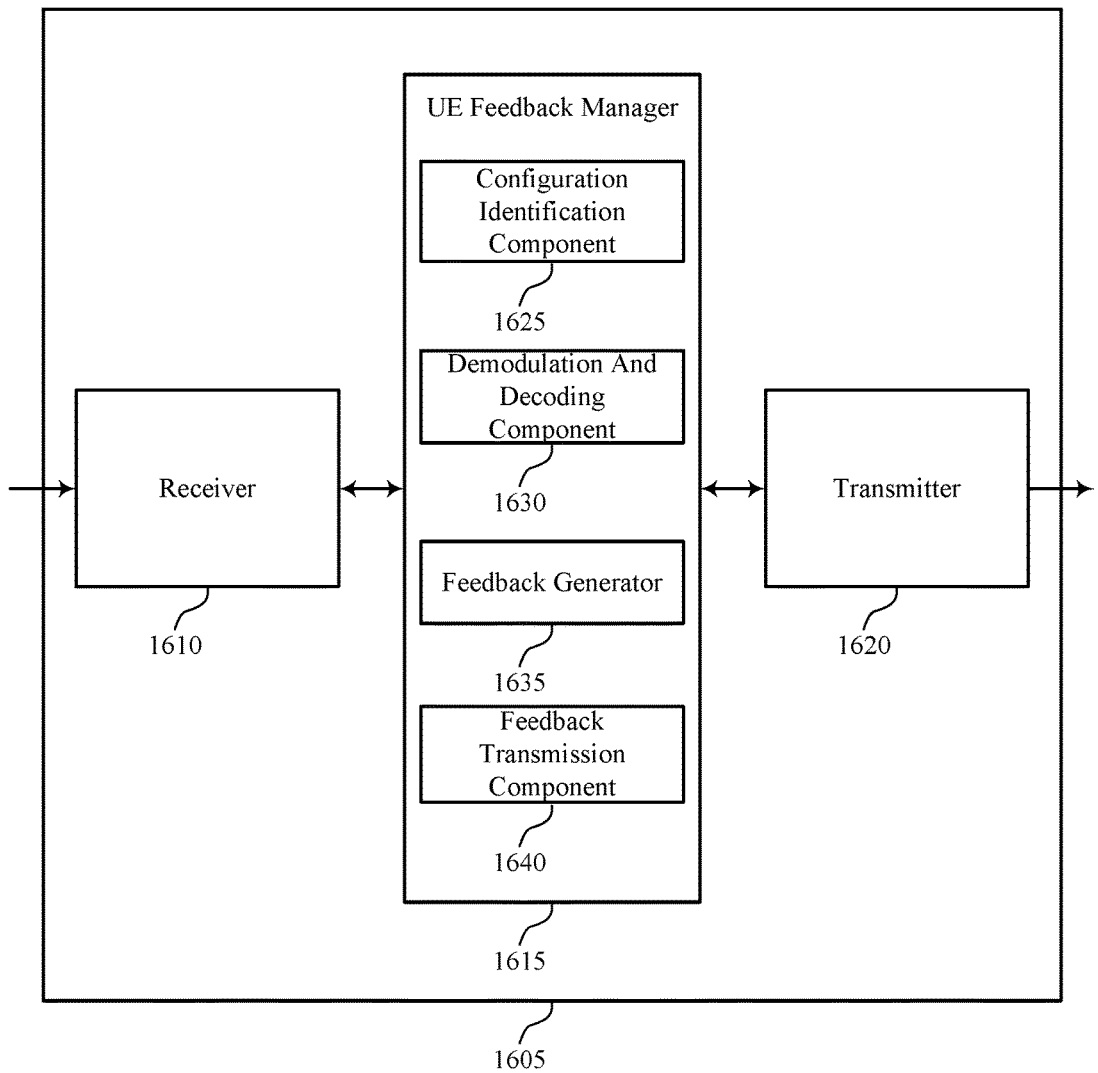

FIG. 16 shows a block diagram 1600 of a wireless device 1605 that supports feedback timing management for low latency communications in accordance with various aspects of the present disclosure. Wireless device 1605 may be an example of aspects of a wireless device 1505 or a UE 115 as described with reference to FIGS. 1 and 15. Wireless device 1605 may include receiver 1610, UE feedback manager 1615, and transmitter 1620. Wireless device 1605 may also include a processor. Each of these components may be in communication with one another (e.g., via one or more buses).

Receiver 1610 may receive information such as packets, user data, or control information associated with various information channels (e.g., control channels, data channels, and information related to feedback timing management for low latency communications, etc.). Information may be passed on to other components of the device. The receiver 1610 may be an example of aspects of the transceiver 1835 described with reference to FIG. 18.

UE feedback manager 1615 may be an example of aspects of the UE feedback manager 1815 described with reference to FIG. 18. UE feedback manager 1615 may also include configuration identification component 1625, demodulation and decoding component 1630, feedback generator 1635, and feedback transmission component 1640.

Configuration identification component 1625 may identify a downlink TTI structure and a feedback configuration, based on the downlink TTI structure, for transmitting a feedback indication associated with a first downlink TTI, identify a first portion of a first downlink TTI for receiving a first downlink transmission, and identify a first uplink TTI for transmitting a feedback indication associated with the first downlink transmission.

Demodulation and decoding component 1630 may receive a first downlink transmission in the first downlink TTI, and receive, based on the first feedback indication being a NACK, a retransmission of the first downlink transmission in a second downlink TTI, where the first downlink TTI and the second downlink TTI are located within a same subframe. In some cases, demodulation and decoding component 1630 may receive the first downlink transmission in the first portion of the first downlink TTI, and receive, based on the first feedback indication being a NACK, a retransmission of the first downlink transmission in a second portion of a second downlink TTI, where the first downlink TTI and the second downlink TTI are located within a same subframe. In some cases, demodulation and decoding component 1630 may receive, based on a second feedback indication, a second retransmission of the first downlink transmission in a third portion of a third downlink TTI, where the first downlink TTI, the second downlink TTI and the third downlink TTI are located within the same subframe.

Feedback generator 1635 may generate a NACK as a first feedback indication associated with the first downlink TTI according to the identified feedback configuration, determine that the retransmission is unsuccessfully received, and generate a second NACK as a second feedback indication associated with the retransmission.

Feedback transmission component 1640 may transmit the first feedback indication in an uplink transmission during a first uplink TTI, and transmit the second feedback indication in a second uplink transmission during a second uplink TTI.

Transmitter 1620 may transmit signals generated by other components of the device. In some examples, the transmitter 1620 may be collocated with a receiver 1610 in a transceiver module. For example, the transmitter 1620 may be an example of aspects of the transceiver 1835 described with reference to FIG. 18. The transmitter 1620 may include a single antenna, or it may include a set of antennas.

Figure 17:
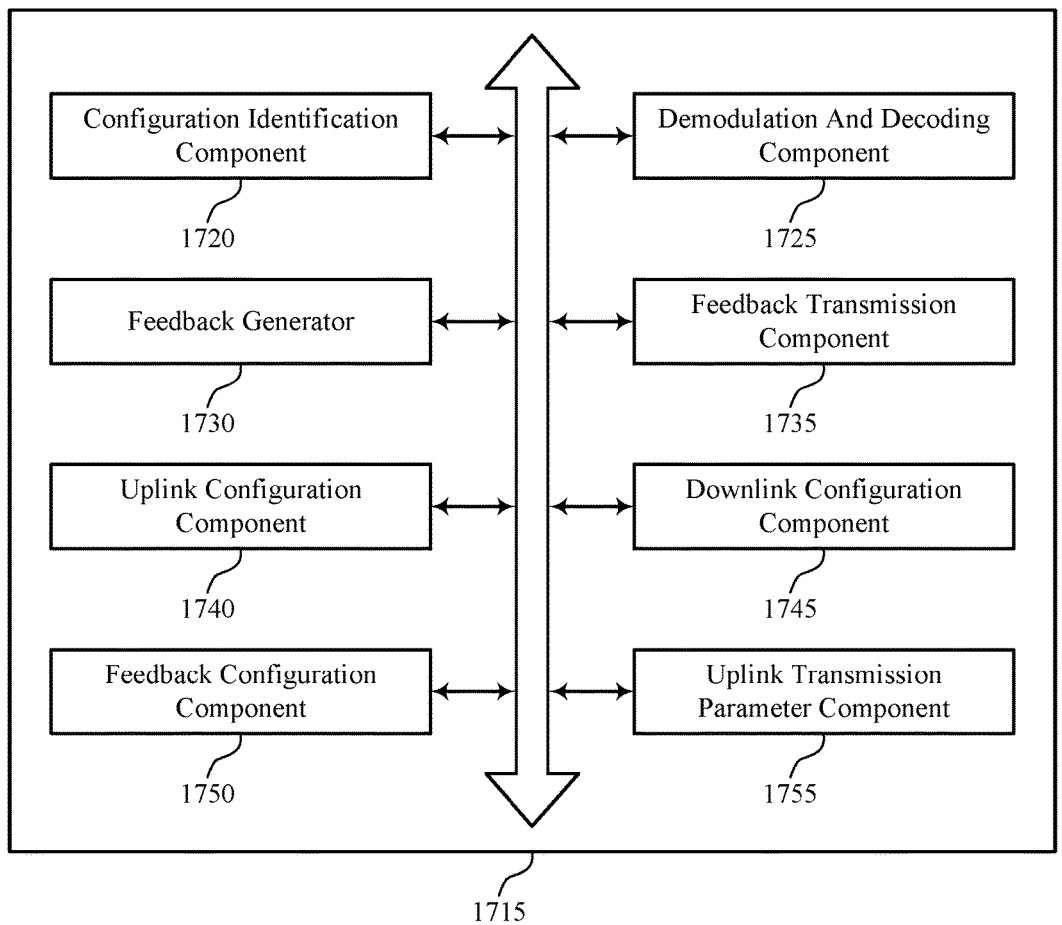

FIG. 17 shows a block diagram 1700 of a UE feedback manager 1715 that supports feedback timing management for low latency communications in accordance with various aspects of the present disclosure. The UE feedback manager 1715 may be an example of aspects of a UE feedback manager 1515, a UE feedback manager 1615, or a UE feedback manager 1815 described with reference to FIGS. 15, 16, and 18. The UE feedback manager 1715 may include configuration identification component 1720, demodulation and decoding component 1725, feedback generator 1730, feedback transmission component 1735, uplink configuration component 1740, downlink configuration component 1745, feedback configuration component 1750, and uplink transmission parameter component 1755. Each of these modules may communicate, directly or indirectly, with one another (e.g., via one or more buses).

Configuration identification component 1720 may identify a downlink TTI structure and a feedback configuration, based on the downlink TTI structure, for transmitting a feedback indication associated with a first downlink TTI, and may identify a first portion of a first downlink TTI for receiving a first downlink transmission, and identify a first uplink TTI for transmitting a feedback indication associated with the first downlink transmission.

Demodulation and decoding component 1725 may receive a first downlink transmission in the first downlink TTI, and receive, based on the first feedback indication being a NACK, a retransmission of the first downlink transmission in a second downlink TTI, where the first downlink TTI and the second downlink TTI are located within the same subframe. In some cases, demodulation and decoding component 1725 may receive the first downlink transmission in a first portion of the first downlink TTI, and receive, based on the first feedback indication, a retransmission of the first downlink transmission in a second portion of a second downlink TTI, where the first downlink TTI and the second downlink TTI are located within the same subframe. In some cases, demodulation and decoding component 1725 may receive, based on a second feedback indication, a second retransmission of the first downlink transmission in a third portion of a third downlink TTI, where the first downlink TTI, the second downlink TTI and the third downlink TTI are located within the same subframe.

Feedback generator 1730 may generate a NACK as a first feedback indication associated with the first downlink TTI according to the identified feedback configuration, determine that the retransmission is unsuccessful, and generate a second NACK as a second feedback indication associated with the retransmission.

Feedback transmission component 1735 may transmit the first feedback indication in an uplink transmission during a first uplink TTI, and transmit the second feedback indication in a second uplink transmission during a second uplink TTI.

Uplink configuration component 1740 may identify an uplink TTI structure for a set of uplink TTIs based on the downlink TTI structure. Downlink configuration component 1745 may identify the downlink TTI structure. In some cases, the identifying the downlink TTI structure includes dynamically identifying the downlink TTI structure based on a number of OFDM symbols of the first downlink TTI. In some cases, the first portion of the first downlink TTI is pre-specified. In some cases, the number of control symbols in the control region is indicated in a PCFICH transmission. In some cases, the identifying the downlink TTI structure includes semi-statically identifying the downlink TTI structure based on radio resource control (RRC) signaling received from a base station. In some cases, the downlink TTI structure includes a set of TTIs that each span two or three OFDM symbols. In some cases, the identifying the first portion of the first downlink TTI includes identifying a first OFDM symbol of two or more OFDM symbols of the first downlink TTI for receiving the first downlink transmission. In some cases, the downlink TTI structure is identified based on a number of control symbols in a control region associated with the subframe. In some cases, the identifying the first portion of the first downlink TTI includes receiving UE specific signaling or cell-specific signaling indicating the first portion of the first downlink TTI.

Feedback configuration component 1750 may identify the feedback configuration. In some cases, the identifying the feedback configuration includes identifying a feedback timing for transmitting the first feedback indication based on the downlink TTI structure, and identifying a rescheduling timing for receiving a subsequent retransmission of the first downlink transmission following the first feedback indication. In some cases, the feedback timing is different than the rescheduling timing. In some cases, the feedback timing corresponds to a duration of three OFDM symbols, and the rescheduling timing corresponds to a duration of two OFDM symbols. In some cases, the feedback timing corresponds to a duration of one OFDM symbol, and the rescheduling timing corresponds to the duration of one OFDM symbol. In some cases, the identifying the first uplink TTI includes identifying a first feedback timing for transmitting the first feedback indication based on a location of the first portion within the first downlink TTI. In some cases, the identifying the first uplink TTI includes identifying a first feedback timing for transmitting the first feedback indication based on a UE capability.

Uplink transmission parameter component 1755 may identify one or more uplink transmission parameters, such as a TBS or a maximum TA for the uplink transmission, based on the feedback configuration. For example, one or more of a TBS or a TA for the uplink transmission may be identified based on a timing between the first portion of the first downlink TTI and the first uplink TTI.

Figure 18:
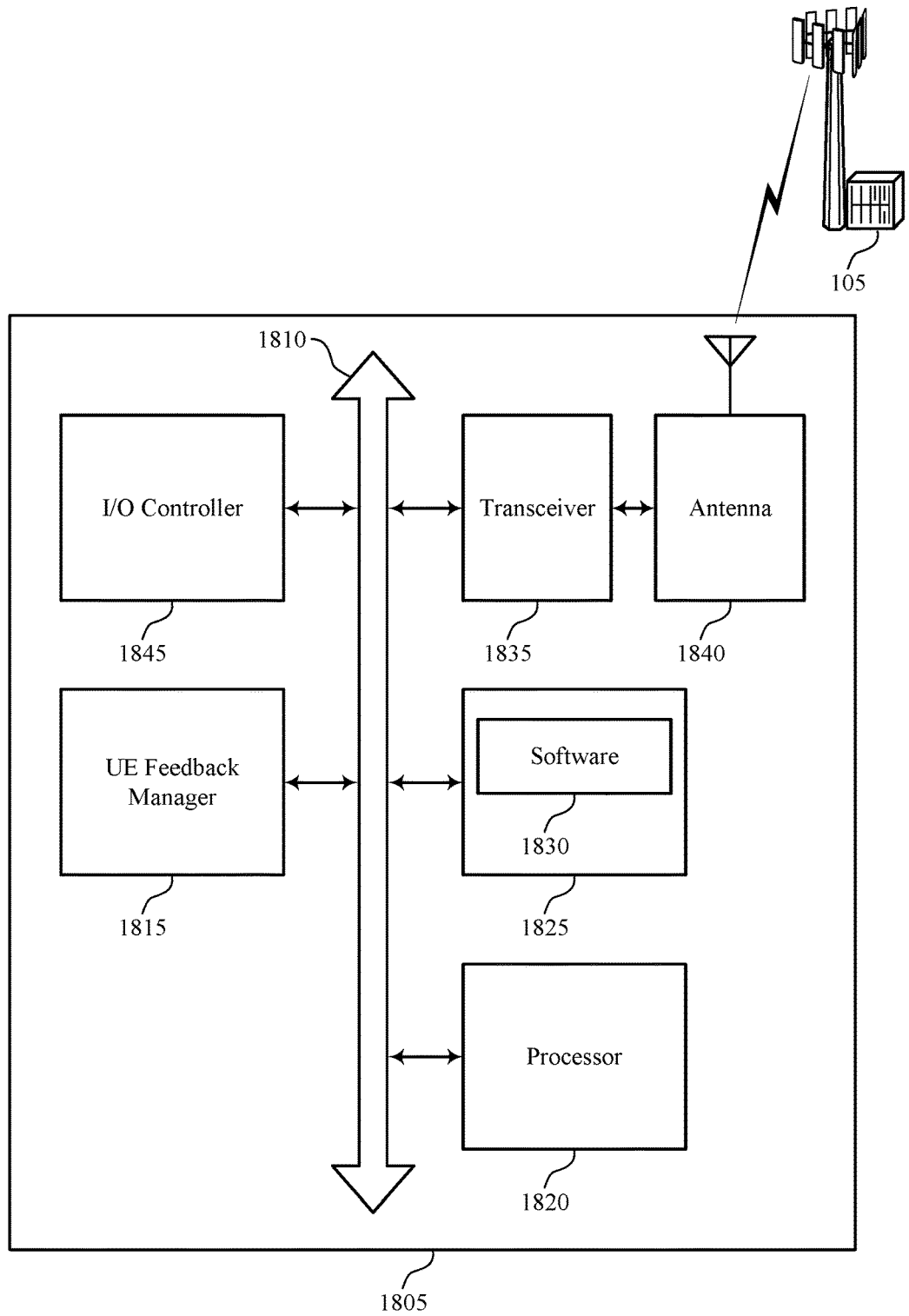
FIG. 18 illustrates a block diagram of a system including a user equipment (UE) that supports feedback timing management for low latency communications in accordance with aspects of the present disclosure.

FIG. 18 shows a diagram of a system 1800 including a device 1805 that supports feedback timing management for low latency communications in accordance with various aspects of the present disclosure. Device 1805 may be an example of or include the components of wireless device 1505, wireless device 1605, or a UE 115 as described above, e.g., with reference to FIGS. 1, 15 and 16. Device 1805 may include components for bi-directional voice and data communications including components for transmitting and receiving communications, including UE feedback manager 1815, processor 1820, memory 1825, software 1830, transceiver 1835, antenna 1840, and I/O controller 1845. These components may be in electronic communication via one or more busses (e.g., bus 1810). Device 1805 may communicate wirelessly with one or more base stations 105.

Processor 1820 may include an intelligent hardware device, (e.g., a general-purpose processor, a DSP, a central processing unit (CPU), a microcontroller, an ASIC, an FPGA, a programmable logic device, a discrete gate or transistor logic component, a discrete hardware component, or any combination thereof). In some cases, processor 1820 may be configured to operate a memory array using a memory controller. In other cases, a memory controller may be integrated into processor 1820. Processor 1820 may be configured to execute computer-readable instructions stored in a memory to perform various functions (e.g., functions or tasks supporting feedback timing management for low latency communications).

Memory 1825 may include random access memory (RAM) and read only memory (ROM). The memory 1825 may store computer-readable, computer-executable software 1830 including instructions that, when executed, cause the processor to perform various functions described herein. In some cases, the memory 1825 may contain, among other things, a basic input/output system (BIOS) which may control basic hardware and/or software operation such as the interaction with peripheral components or devices.

Software 1830 may include code to implement aspects of the present disclosure, including code to support feedback timing management for low latency communications. Software 1830 may be stored in a non-transitory computer-readable medium such as system memory or other memory. In some cases, the software 1830 may not be directly executable by the processor but may cause a computer (e.g., when compiled and executed) to perform functions described herein.

Transceiver 1835 may communicate bi-directionally, via one or more antennas, wired, or wireless links as described above. For example, the transceiver 1835 may represent a wireless transceiver and may communicate bi-directionally with another wireless transceiver. The transceiver 1835 may also include a modem to modulate the packets and provide the modulated packets to the antennas for transmission, and to demodulate packets received from the antennas.

In some cases, the wireless device may include a single antenna 1840. However, in some cases the device may have more than one antenna 1840, which may be capable of concurrently transmitting or receiving multiple wireless transmissions.

I/O controller 1845 may manage input and output signals for device 1805. I/O controller 1845 may also manage peripherals not integrated into device 1805. In some cases, I/O controller 1845 may represent a physical connection or port to an external peripheral. In some cases, I/O controller 1845 may utilize an operating system such as iOS®, ANDROID®, MS-DOS®, MS-WINDOWS®, OS/2®, UNIX®, LINUX®, or another known operating system. In other cases, I/O controller 1845 may represent or interact with a modem, a keyboard, a mouse, a touchscreen, or a similar device. In some cases, I/O controller 1845 may be implemented as part of a processor. In some cases, a user may interact with device 1805 via I/O controller 1845 or via hardware components controlled by I/O controller 1845.

Figure 19:
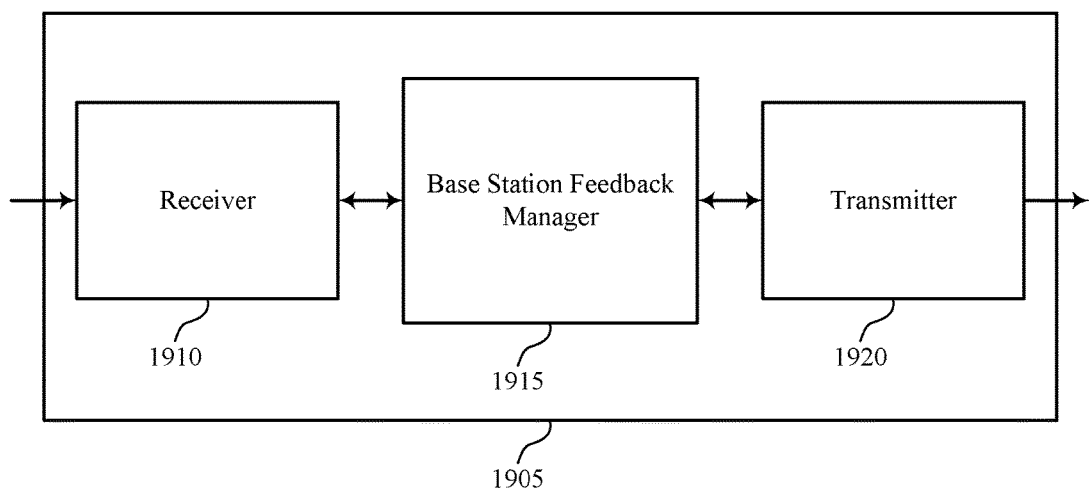
FIGS. 19 through 21 show block diagrams of a device that supports feedback timing management for low latency communications in accordance with aspects of the present disclosure.

FIG. 19 shows a block diagram 1900 of a wireless device 1905 that supports feedback timing management for low latency communications in accordance with various aspects of the present disclosure. Wireless device 1905 may be an example of aspects of a base station 105 as described with reference to FIG. 1. Wireless device 1905 may include receiver 1910, base station feedback manager 1915, and transmitter 1920. Wireless device 1905 may also include a processor. Each of these components may be in communication with one another (e.g., via one or more buses).

Receiver 1910 may receive information such as packets, user data, or control information associated with various information channels (e.g., control channels, data channels, and information related to feedback timing management for low latency communications, etc.). Information may be passed on to other components of the device. The receiver 1910 may be an example of aspects of the transceiver 2235 described with reference to FIG. 22.

Base station feedback manager 1915 may be an example of aspects of the base station feedback manager 2215 described with reference to FIG. 22.

Base station feedback manager 1915 and/or at least some of its various sub-components may be implemented in hardware, software executed by a processor, firmware, or any combination thereof. If implemented in software executed by a processor, the functions of the base station feedback manager 1915 and/or at least some of its various sub-components may be executed by a general-purpose processor, a DSP, an ASIC, an FPGA or other programmable logic device, discrete gate or transistor logic, discrete hardware components, or any combination thereof designed to perform the functions described in the present disclosure. The base station feedback manager 1915 and/or at least some of its various sub-components may be physically located at various positions, including being distributed such that portions of functions are implemented at different physical locations by one or more physical devices. In some examples, base station feedback manager 1915 and/or at least some of its various sub-components may be a separate and distinct component in accordance with various aspects of the present disclosure. In other examples, base station feedback manager 1915 and/or at least some of its various sub-components may be combined with one or more other hardware components, including but not limited to an I/O component, a transceiver, a network server, another computing device, one or more other components described in the present disclosure, or a combination thereof in accordance with various aspects of the present disclosure.

Base station feedback manager 1915 may identify a downlink TTI structure and a feedback configuration, based on the downlink TTI structure, for receiving a feedback indication associated with a first downlink transmission in a first downlink TTI and transmitting a retransmission of the first downlink transmission in a second downlink TTI, and transmit configuration information indicating one or more of the downlink TTI structure or the feedback configuration to a UE that is to receive the first downlink transmission in the first downlink TTI, where the first downlink TTI and the second downlink TTI are located within the same subframe.

The base station feedback manager 1915 may also identify a first portion of a first downlink TTI for transmitting a first downlink transmission, identify a first uplink TTI for receiving a first feedback indication associated with the first downlink transmission, receive a NACK as the first feedback indication in an uplink transmission during the first uplink TTI, and transmit, based on the first feedback indication, a retransmission of the first downlink transmission in a second portion of a second downlink TTI, where the first downlink TTI and the second downlink TTI are located within the same subframe.

Transmitter 1920 may transmit signals generated by other components of the device. In some examples, the transmitter 1920 may be collocated with a receiver 1910 in a transceiver module. For example, the transmitter 1920 may be an example of aspects of the transceiver 2235 described with reference to FIG. 22. The transmitter 1920 may include a single antenna, or it may include a set of antennas. Transmitter 1920 may transmit the first downlink transmission in the first downlink TTI or transmit the first downlink transmission in the first portion of the first downlink TTI, for example.

Figure 20:
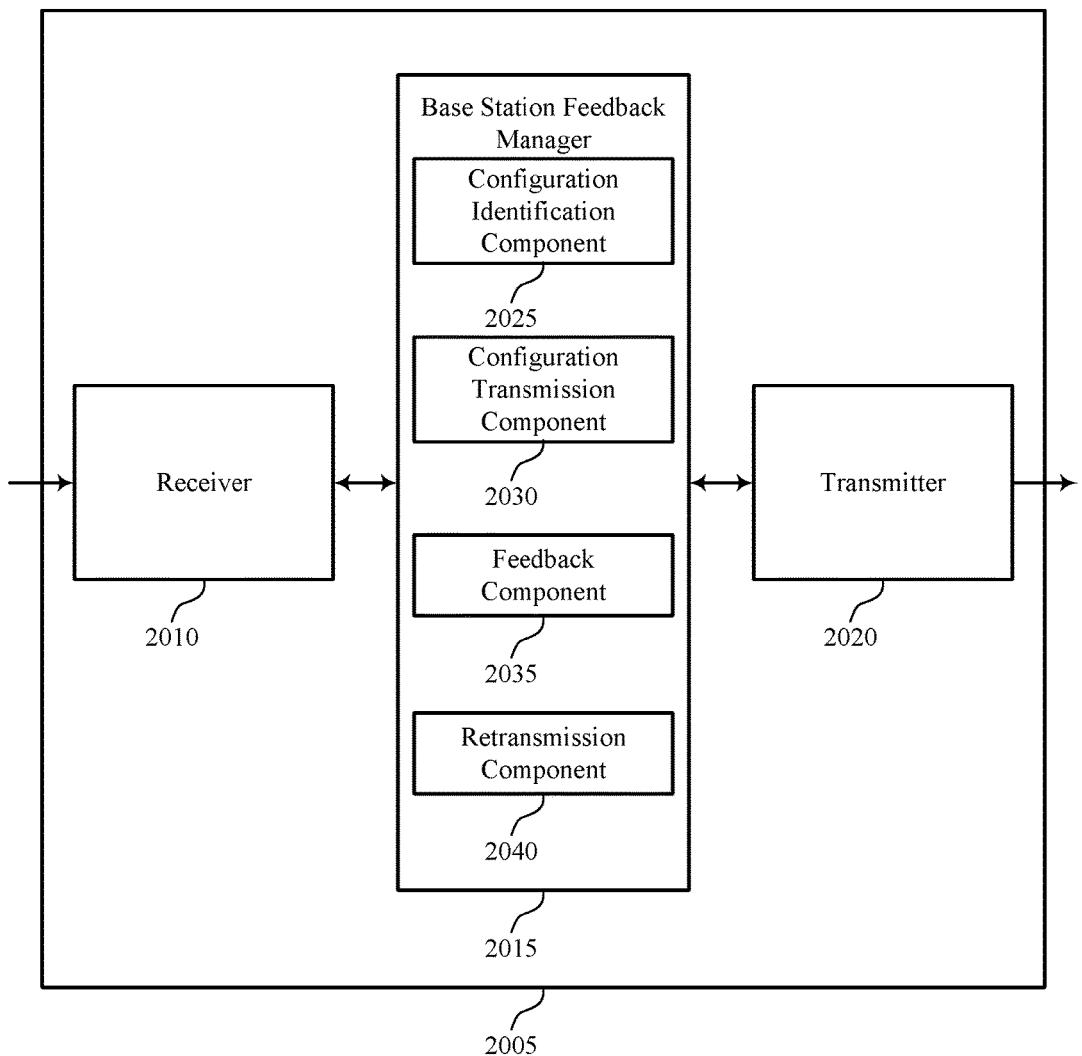

FIG. 20 shows a block diagram 2000 of a wireless device 2005 that supports feedback timing management for low latency communications in accordance with various aspects of the present disclosure. Wireless device 2005 may be an example of aspects of a wireless device 1905 or a base station 105 as described with reference to FIGS. 1 and 19. Wireless device 2005 may include receiver 2010, base station feedback manager 2015, and transmitter 2020. Wireless device 2005 may also include a processor. Each of these components may be in communication with one another (e.g., via one or more buses).

Receiver 2010 may receive information such as packets, user data, or control information associated with various information channels (e.g., control channels, data channels, and information related to feedback timing management for low latency communications, etc.). Information may be passed on to other components of the device. The receiver 2010 may be an example of aspects of the transceiver 2235 described with reference to FIG. 22.

Base station feedback manager 2015 may be an example of aspects of the base station feedback manager 2215 described with reference to FIG. 22. Base station feedback manager 2015 may also include configuration identification component 2025, configuration transmission component 2030, feedback component 2035, and retransmission component 2040.

Configuration identification component 2025 may identify a downlink TTI structure and a feedback configuration, based on the downlink TTI structure, for receiving a feedback indication associated with a first downlink transmission in a first downlink TTI and transmitting a retransmission of the first downlink transmission in a second downlink TTI. In some cases, configuration identification component 2025 may identify a first portion of a first downlink TTI for transmitting a first downlink transmission, and identify a portion of a first uplink TTI for receiving a first feedback indication associated with the first downlink transmission.

Configuration transmission component 2030 may transmit configuration information indicating one or more of the downlink TTI structure or the feedback configuration to a UE that is to receive the first downlink transmission in the first downlink TTI, where the first downlink TTI and the second downlink TTI are located within a same subframe. In some cases, configuration transmission component 2030 may configure a first UE to receive the first downlink transmission in the first portion of the first downlink TTI and to transmit the first feedback indication in the first uplink TTI, and configure a second UE to receive a second downlink transmission in a second portion of the first downlink TTI and to transmit a second feedback indication in the first uplink TTI. In some cases, the transmitting the configuration information includes indicating that one or more of the downlink TTI structure or the feedback configuration is to be identified by a UE based on a configuration of the first downlink TTI. In some cases, the transmitting the configuration information includes transmitting a PCFICH transmission that indicates one or more of the downlink TTI structure or the feedback configuration. In some cases, the transmitting the configuration information includes transmitting RRC signaling to a UE that semi-statically indicates one or more of the downlink TTI structure or the feedback configuration. In some cases, the configuring the first UE and the configuring the second UE includes transmitting cell-specific configuration information or transmitting UE-specific configuration information to the first UE and the second UE.

Feedback component 2035 may receive a first feedback indication associated with the first downlink TTI according to the identified feedback configuration and receive a NACK as the first feedback indication in an uplink transmission during the first uplink TTI.

Retransmission component 2040 may transmit, based on the first feedback indication, the retransmission of the first downlink transmission in the second downlink TTI. In cases where the first downlink transmission is transmitted in a portion of the first downlink TTI, retransmission component 2040 may transmit, based on the first feedback indication, a retransmission of the first downlink transmission in a second portion of a second downlink TTI, where the first downlink TTI and the second downlink TTI are located within a same subframe.

Transmitter 2020 may transmit signals generated by other components of the device. In some examples, the transmitter 2020 may be collocated with a receiver 2010 in a transceiver module. For example, the transmitter 2020 may be an example of aspects of the transceiver 2235 described with reference to FIG. 22. The transmitter 2020 may include a single antenna, or it may include a set of antennas.

Figure 21:
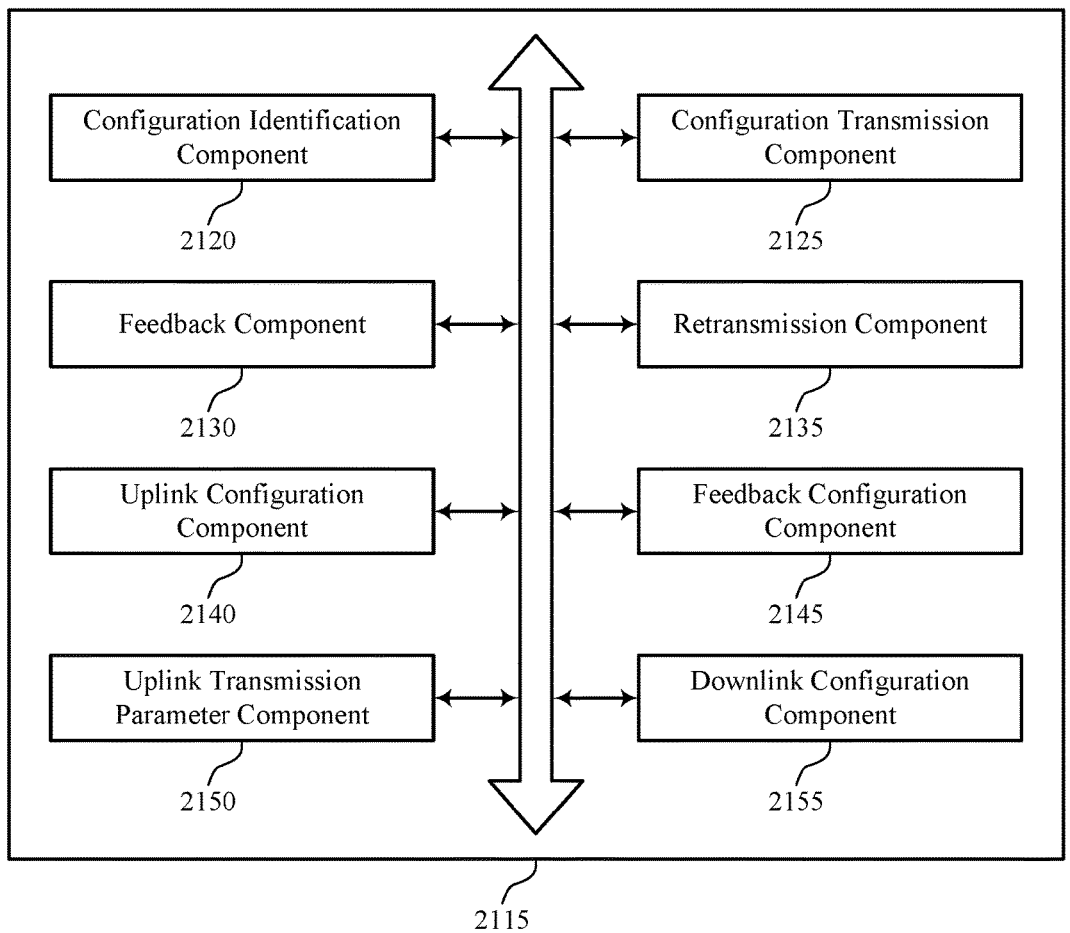

FIG. 21 shows a block diagram 2100 of a base station feedback manager 2115 that supports feedback timing management for low latency communications in accordance with various aspects of the present disclosure. The base station feedback manager 2115 may be an example of aspects of a base station feedback manager 2215 described with reference to FIGS. 19, 20, and 22. The base station feedback manager 2115 may include configuration identification component 2120, configuration transmission component 2125, feedback component 2130, retransmission component 2135, uplink configuration component 2140, feedback configuration component 2145, uplink transmission parameter component 2150, and downlink configuration component 2155. Each of these modules may communicate, directly or indirectly, with one another (e.g., via one or more buses).

Configuration identification component 2120 may identify a downlink TTI structure and a feedback configuration, based on the downlink TTI structure, for receiving a feedback indication associated with a first downlink transmission in a first downlink TTI and transmitting a retransmission of the first downlink transmission in a second downlink TTI, identify a first portion of a first downlink TTI for transmitting a first downlink transmission, and identify a first uplink TTI for receiving a first feedback indication associated with the first downlink transmission.

Configuration transmission component 2125 may transmit configuration information indicating one or more of the downlink TTI structure or the feedback configuration to a UE that is to receive the first downlink transmission in the first downlink TTI, where the first downlink TTI and the second downlink TTI are located within a same subframe. In some cases, configuration transmission component 2125 may configure a first UE to receive the first downlink transmission in the first portion of the first downlink TTI and to transmit the first feedback indication in the first uplink TTI, and configure a second UE to receive a second downlink transmission in a second portion of the first downlink TTI and to transmit a second feedback indication in the first uplink TTI. In some cases, the transmitting the configuration information includes indicating that one or more of the downlink TTI structure or the feedback configuration is to be identified by a UE based on a configuration of the first downlink TTI. In some cases, the transmitting the configuration information includes transmitting a PCFICH transmission that indicates one or more of the downlink TTI structure or the feedback configuration. In some cases, the transmitting the configuration information includes transmitting RRC signaling to a UE that semi-statically indicates one or more of the downlink TTI structure or the feedback configuration. In some cases, the configuring the first UE and the configuring the second UE includes transmitting cell-specific configuration information or transmitting UE-specific configuration information to the first UE and the second UE.

Feedback component 2130 may receive a first feedback indication associated with the first downlink TTI according to the identified feedback configuration and receive a NACK as the first feedback indication in an uplink transmission during the first uplink TTI.

Retransmission component 2135 may transmit, based on the first feedback indication, the retransmission of the first downlink transmission in the second downlink TTI and in cases where the first downlink transmission is transmitted in a portion of the first downlink TTI, transmit a retransmission of the first downlink transmission in a second portion of a second downlink TTI, where the first downlink TTI and the second downlink TTI are located within a same subframe. Uplink configuration component 2140 may identify an uplink TTI structure based on the downlink TTI structure.

Feedback configuration component 2145 may identify a feedback configuration and timing. In some cases, the identifying the feedback configuration includes identifying a feedback timing for transmission of the feedback indication based on the downlink TTI structure, and identifying a retransmission timing for a subsequent retransmission of the first downlink transmission. In some cases, the feedback timing is different than the retransmission timing. In some cases, the identifying the first uplink TTI includes identifying a first feedback timing the first feedback indication based on a location of the first portion of the first downlink TTI within the first downlink TTI. In some cases, the identifying the first uplink TTI includes identifying a first feedback timing the first feedback indication based on a UE capability of a UE that receives the first downlink transmission.

Uplink transmission parameter component 2150 may identify one or more uplink transmission parameters such as a TBS or a maximum TA for the feedback indication based on the feedback configuration. In some cases, one or more of a TBS or a maximum TA for the uplink transmission may be identified based on a timing between the first portion of the first downlink TTI and the first uplink TTI. In some cases, uplink transmission parameter component 2150 may configure a UE that receives the first downlink transmission with the TBS or maximum TA for the uplink transmission.

Downlink configuration component 2155 may configure downlink transmissions for one or more UEs. In some cases, downlink configuration component 2155 may configure a first UE and a second UE to dynamically identify a first portion and a second portion of the first downlink TTI based on a configuration of the first downlink TTI. In some cases, the configuration of the first downlink TTI is indicated in a PCFICH transmission. In some cases, the configuring the first UE and the configuring the second UE includes semi-statically configuring the first portion of the first downlink TTI and the second portion of the first downlink TTI using RRC signaling. In some cases, the identifying the first portion of the first downlink TTI includes identifying a first OFDM symbol of the first downlink TTI for transmitting the first downlink transmission, and where the first downlink TTI includes two or three OFDM symbols.

Figure 22:
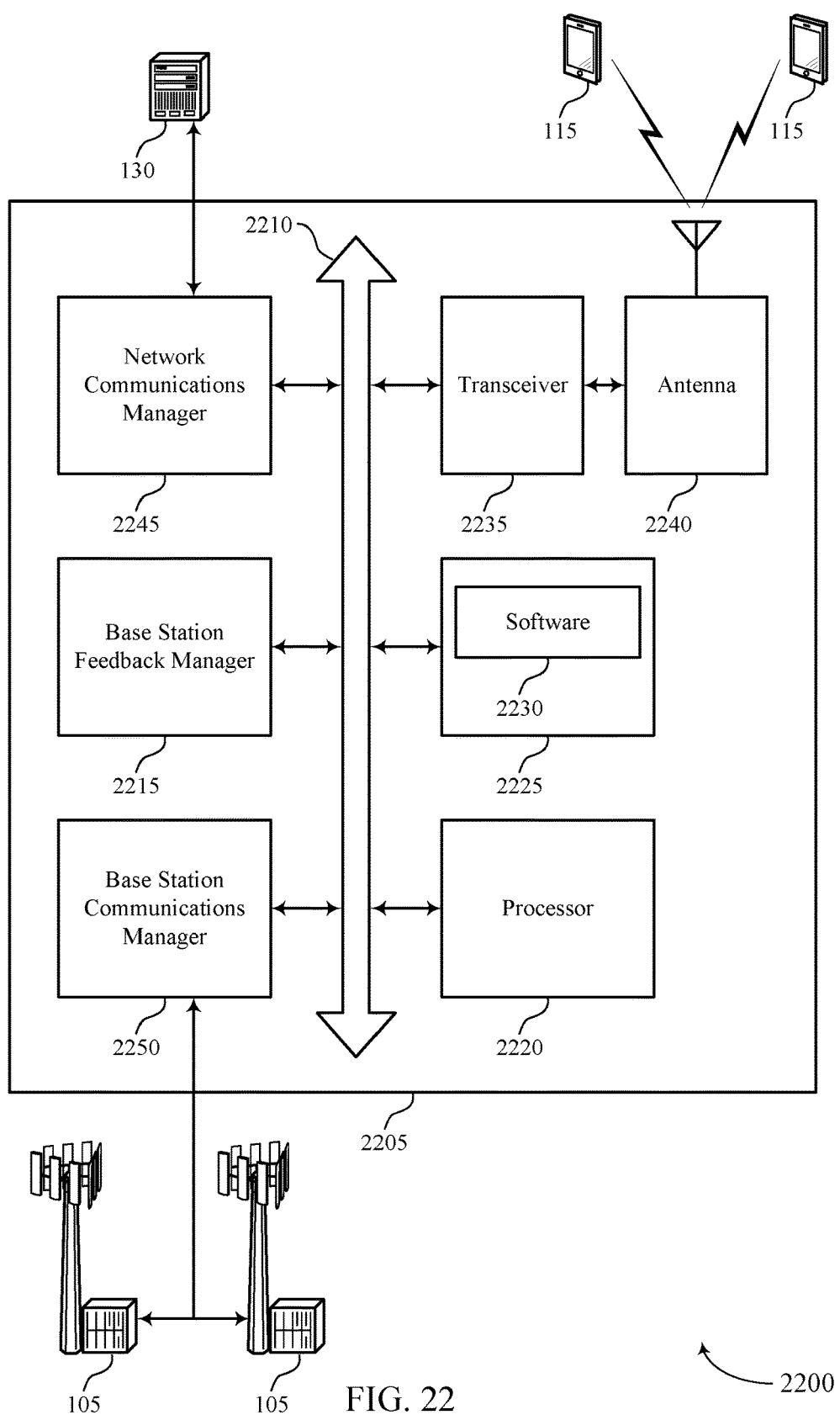
FIG. 22 illustrates a block diagram of a system including a base station that supports feedback timing management for low latency communications in accordance with aspects of the present disclosure.

FIG. 22 shows a diagram of a system 2200 including a device 2205 that supports feedback timing management for low latency communications in accordance with various aspects of the present disclosure. Device 2205 may be an example of or include the components of base station 105 as described above, e.g., with reference to FIG. 1. Device 2205 may include components for bi-directional voice and data communications including components for transmitting and receiving communications, including base station feedback manager 2215, processor 2220, memory 2225, software 2230, transceiver 2235, antenna 2240, network communications manager 2245, and base station communications manager 2250. These components may be in electronic communication via one or more busses (e.g., bus 2210). Device 2205 may communicate wirelessly with one or more UEs 115.

Processor 2220 may include an intelligent hardware device, (e.g., a general-purpose processor, a DSP, a CPU, a microcontroller, an ASIC, an FPGA, a programmable logic device, a discrete gate or transistor logic component, a discrete hardware component, or any combination thereof). In some cases, processor 2220 may be configured to operate a memory array using a memory controller. In other cases, a memory controller may be integrated into processor 2220. Processor 2220 may be configured to execute computer-readable instructions stored in a memory to perform various functions (e.g., functions or tasks supporting feedback timing management for low latency communications).

Memory 2225 may include RAM and ROM. The memory 2225 may store computer-readable, computer-executable software 2230 including instructions that, when executed, cause the processor to perform various functions described herein. In some cases, the memory 2225 may contain, among other things, a BIOS which may control basic hardware and/or software operation such as the interaction with peripheral components or devices.

Software 2230 may include code to implement aspects of the present disclosure, including code to support feedback timing management for low latency communications. Software 2230 may be stored in a non-transitory computer-readable medium such as system memory or other memory. In some cases, the software 2230 may not be directly executable by the processor but may cause a computer (e.g., when compiled and executed) to perform functions described herein.

Transceiver 2235 may communicate bi-directionally, via one or more antennas, wired, or wireless links as described above. For example, the transceiver 2235 may represent a wireless transceiver and may communicate bi-directionally with another wireless transceiver. The transceiver 2235 may also include a modem to modulate the packets and provide the modulated packets to the antennas for transmission, and to demodulate packets received from the antennas.

In some cases, the wireless device may include a single antenna 2240. However, in some cases the device may have more than one antenna 2240, which may be capable of concurrently transmitting or receiving multiple wireless transmissions.

Network communications manager 2245 may manage communications with the core network (e.g., via one or more wired backhaul links). For example, the network communications manager 2245 may manage the transfer of data communications for client devices, such as one or more UEs 115.

Base station communications manager 2250 may manage communications with other base station 105, and may include a controller or scheduler for controlling communications with UEs 115 in cooperation with other base stations 105. For example, the base station communications manager 2250 may coordinate scheduling for transmissions to UEs 115 for various interference mitigation techniques such as beamforming or joint transmission. In some examples, base station communications manager 2250 may provide an X2 interface within an Long Term Evolution (LTE)/LTE-A wireless communication network technology to provide communication between base stations 105.

Figure 23:
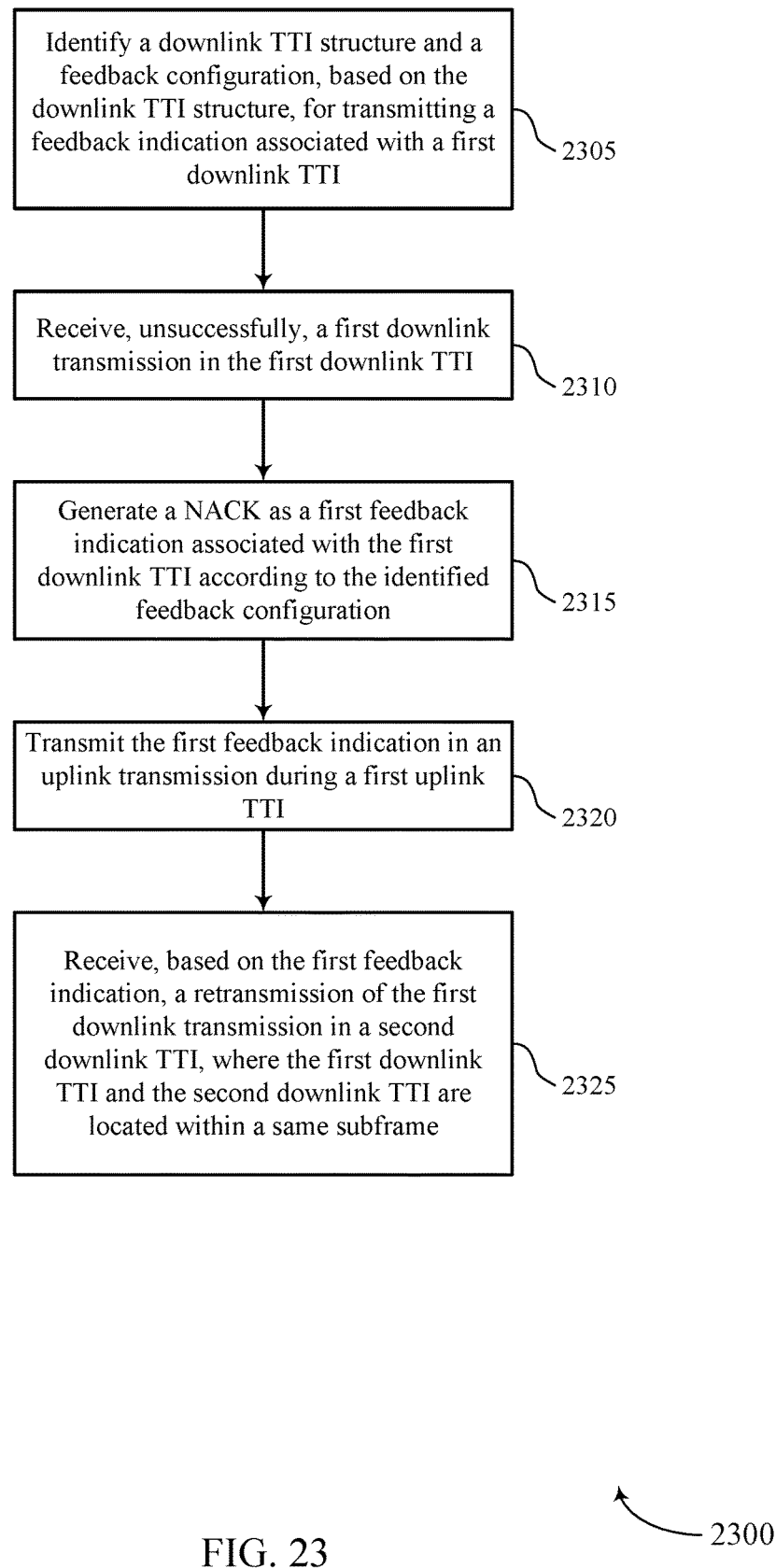
FIGS. 23 through 29 illustrate methods for feedback timing management for low latency communications in accordance with aspects of the present disclosure.

FIG. 23 shows a flowchart illustrating a method 2300 for feedback timing management for low latency communications in accordance with various aspects of the present disclosure. The operations of method 2300 may be implemented by a UE 115 or its components as described herein. For example, the operations of method 2300 may be performed by a UE feedback manager as described with reference to FIGS. 15 through 18. In some examples, a UE 115 may execute a set of codes to control the functional elements of the device to perform the functions described below. Additionally or alternatively, the UE 115 may perform aspects of the functions described below using special-purpose hardware.

At block 2305 the UE 115 may identify a downlink TTI structure and a feedback configuration, based on the downlink TTI structure, for transmitting a feedback indication associated with a first downlink TTI. The operations of block 2305 may be performed according to the methods described with reference to FIGS. 1 through 14. In certain examples, aspects of the operations of block 2305 may be performed by a configuration identification component as described with reference to FIGS. 15 through 18.

At block 2310 the UE 115 may receive, unsuccessfully, a first downlink transmission in the first downlink TTI. The operations of block 2310 may be performed according to the methods described with reference to FIGS. 1 through 14. In certain examples, aspects of the operations of block 2310 may be performed by a demodulation and decoding component as described with reference to FIGS. 15 through 18.

At block 2315 the UE 115 may generate a NACK as a first feedback indication associated with the first downlink TTI according to the identified feedback configuration. The operations of block 2315 may be performed according to the methods described with reference to FIGS. 1 through 14. In certain examples, aspects of the operations of block 2315 may be performed by a feedback generator as described with reference to FIGS. 15 through 18.

At block 2320 the UE 115 may transmit the first feedback indication in an uplink transmission during a first uplink TTI. The operations of block 2320 may be performed according to the methods described with reference to FIGS. 1 through 14. In certain examples, aspects of the operations of block 2320 may be performed by a feedback transmission component as described with reference to FIGS. 15 through 18.

At block 2325 the UE 115 may receive, based at least in part on the first feedback indication, a retransmission of the first downlink transmission in a second downlink TTI, wherein the first downlink TTI and the second downlink TTI are located within a same subframe. The operations of block 2325 may be performed according to the methods described with reference to FIGS. 1 through 14. In certain examples, aspects of the operations of block 2325 may be performed by a demodulation and decoding component as described with reference to FIGS. 15 through 18.

Figure 24:
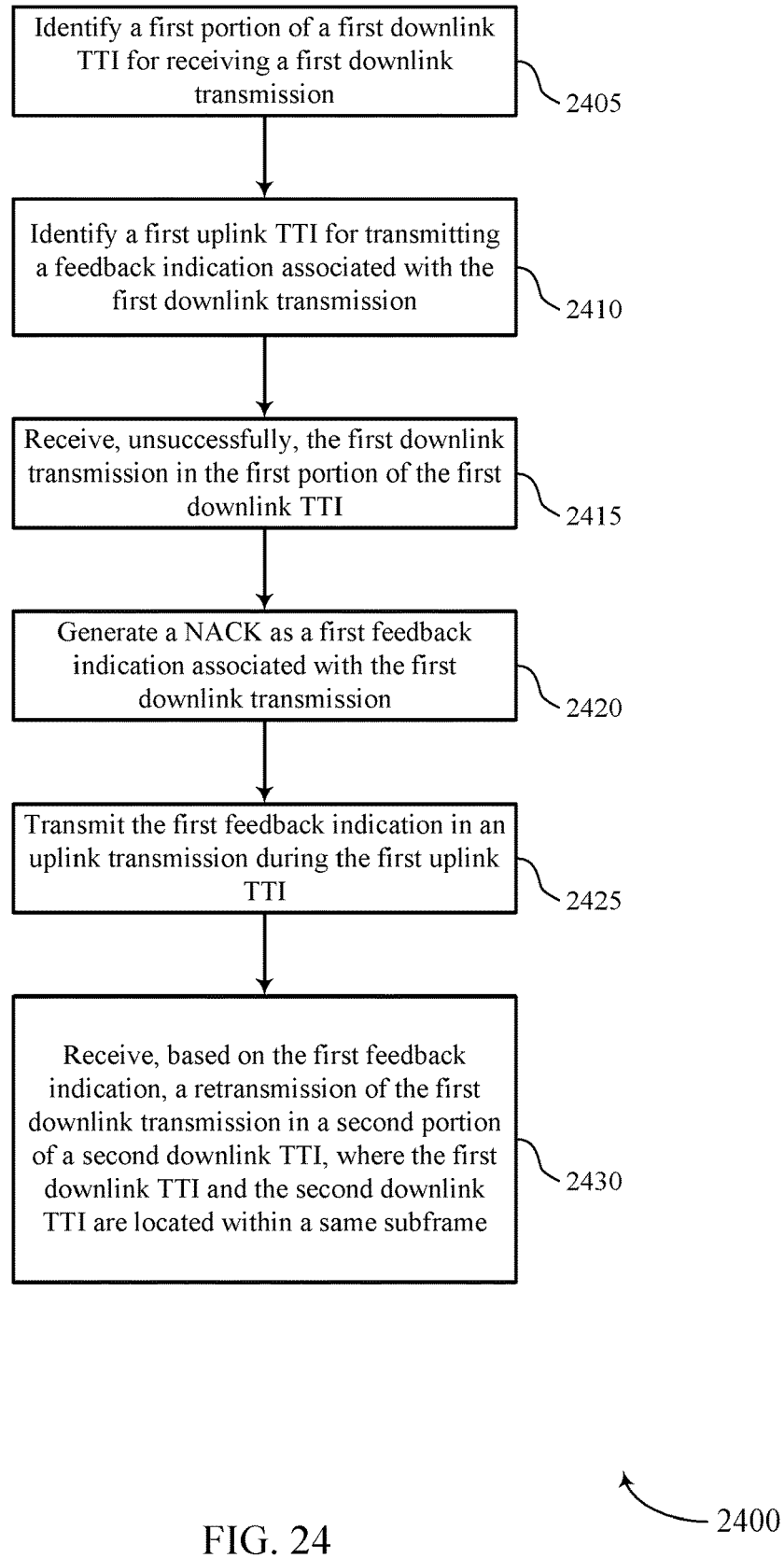

FIG. 24 shows a flowchart illustrating a method 2400 for feedback timing management for low latency communications in accordance with various aspects of the present disclosure. The operations of method 2400 may be implemented by a UE 115 or its components as described herein. For example, the operations of method 2400 may be performed by a UE feedback manager as described with reference to FIGS. 15 through 18. In some examples, a UE 115 may execute a set of codes to control the functional elements of the device to perform the functions described below. Additionally or alternatively, the UE 115 may perform aspects of the functions described below using special-purpose hardware.

At block 2405 the UE 115 may identify a first portion of a first downlink TTI for receiving a first downlink transmission. The operations of block 2405 may be performed according to the methods described with reference to FIGS. 1 through 14. In certain examples, aspects of the operations of block 2405 may be performed by a configuration identification component as described with reference to FIGS. 15 through 18.

At block 2410 the UE 115 may identify a first uplink TTI for transmitting a feedback indication associated with the first downlink transmission. The operations of block 2410 may be performed according to the methods described with reference to FIGS. 1 through 14. In certain examples, aspects of the operations of block 2410 may be performed by a configuration identification component as described with reference to FIGS. 15 through 18.

At block 2415 the UE 115 may receive, unsuccessfully, the first downlink transmission in the first portion of the first downlink TTI. The operations of block 2415 may be performed according to the methods described with reference to FIGS. 1 through 14. In certain examples, aspects of the operations of block 2415 may be performed by a demodulation and decoding component as described with reference to FIGS. 15 through 18.

At block 2420 the UE 115 may generate a NACK as a first feedback indication associated with the first downlink transmission. The operations of block 2420 may be performed according to the methods described with reference to FIGS. 1 through 14. In certain examples, aspects of the operations of block 2420 may be performed by a feedback generator as described with reference to FIGS. 15 through 18.

At block 2425 the UE 115 may transmit the first feedback indication in an uplink transmission during the first uplink TTI. The operations of block 2425 may be performed according to the methods described with reference to FIGS. 1 through 14. In certain examples, aspects of the operations of block 2425 may be performed by a feedback transmission component as described with reference to FIGS. 15 through 18.

At block 2430 the UE 115 may receive, based at least in part on the first feedback indication, a retransmission of the first downlink transmission in a second portion of a second downlink TTI, wherein the first downlink TTI and the second downlink TTI are located within a same subframe. The operations of block 2430 may be performed according to the methods described with reference to FIGS. 1 through 14. In certain examples, aspects of the operations of block 2430 may be performed by a demodulation and decoding component as described with reference to FIGS. 15 through 18.

Figure 25:
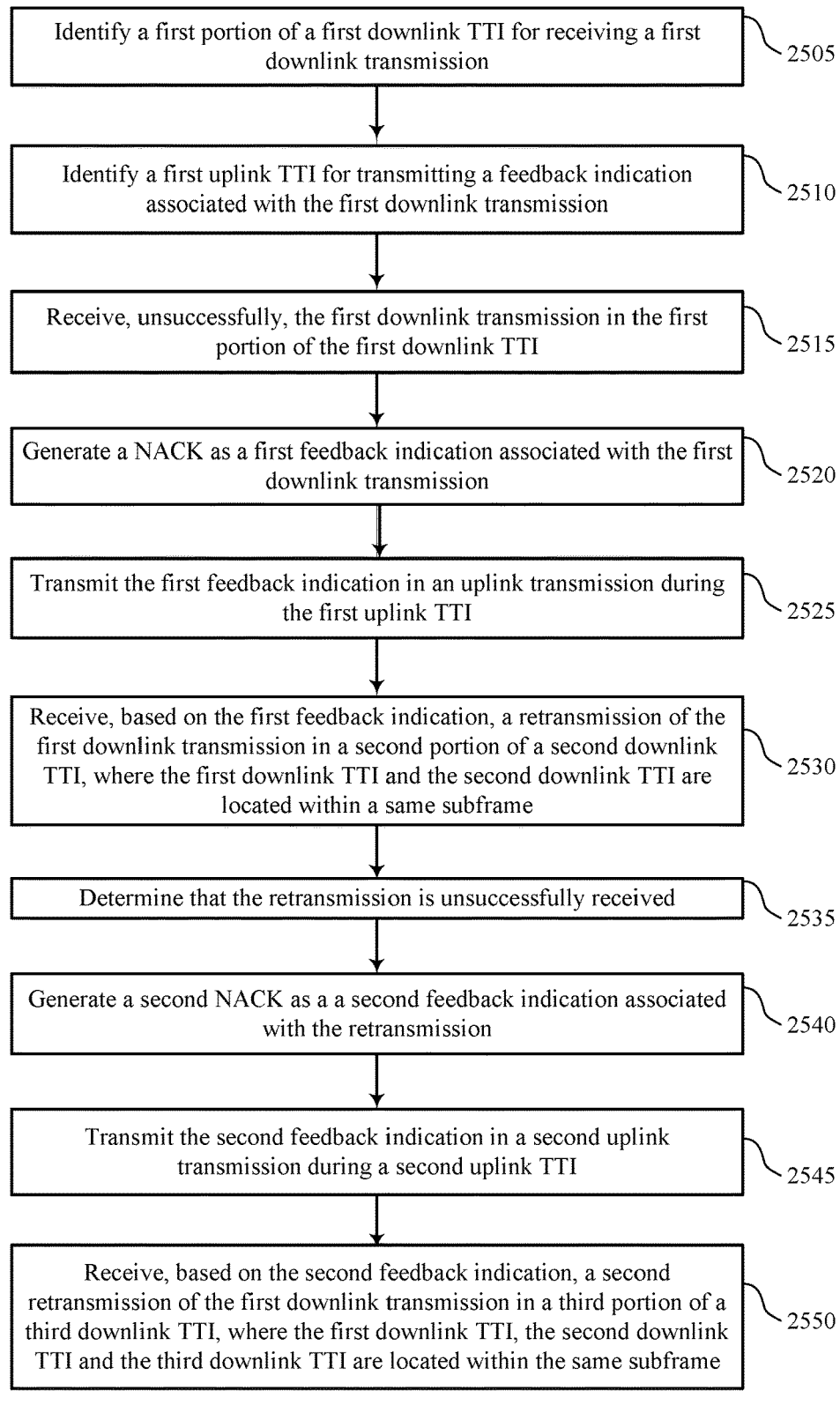

FIG. 25 shows a flowchart illustrating a method 2500 for feedback timing management for low latency communications in accordance with various aspects of the present disclosure. The operations of method 2500 may be implemented by a UE 115 or its components as described herein. For example, the operations of method 2500 may be performed by a UE feedback manager as described with reference to FIGS. 15 through 18. In some examples, a UE 115 may execute a set of codes to control the functional elements of the device to perform the functions described below. Additionally or alternatively, the UE 115 may perform aspects of the functions described below using special-purpose hardware.

At block 2505 the UE 115 may identify a first portion of a first downlink TTI for receiving a first downlink transmission. The operations of block 2505 may be performed according to the methods described with reference to FIGS. 1 through 14. In certain examples, aspects of the operations of block 2505 may be performed by a configuration identification component as described with reference to FIGS. 15 through 18.

At block 2510 the UE 115 may identify a first uplink TTI for transmitting a feedback indication associated with the first downlink transmission. The operations of block 2510 may be performed according to the methods described with reference to FIGS. 1 through 14. In certain examples, aspects of the operations of block 2510 may be performed by a configuration identification component as described with reference to FIGS. 15 through 18.

At block 2515 the UE 115 may receive, unsuccessfully, the first downlink transmission in the first portion of the first downlink TTI. The operations of block 2515 may be performed according to the methods described with reference to FIGS. 1 through 14. In certain examples, aspects of the operations of block 2515 may be performed by a demodulation and decoding component as described with reference to FIGS. 15 through 18.

At block 2520 the UE 115 may generate a NACK as a first feedback indication associated with the first downlink transmission. The operations of block 2520 may be performed according to the methods described with reference to FIGS. 1 through 14. In certain examples, aspects of the operations of block 2520 may be performed by a feedback generator as described with reference to FIGS. 15 through 18.

At block 2525 the UE 115 may transmit the first feedback indication in an uplink transmission during the first uplink TTI. The operations of block 2525 may be performed according to the methods described with reference to FIGS. 1 through 14. In certain examples, aspects of the operations of block 2525 may be performed by a feedback transmission component as described with reference to FIGS. 15 through 18.

At block 2530 the UE 115 may receive, based at least in part on the first feedback indication, a retransmission of the first downlink transmission in a second portion of a second downlink TTI, wherein the first downlink TTI and the second downlink TTI are located within a same subframe. The operations of block 2530 may be performed according to the methods described with reference to FIGS. 1 through 14. In certain examples, aspects of the operations of block 2530 may be performed by a demodulation and decoding component as described with reference to FIGS. 15 through 18.

At block 2535 the UE 115 may determine that the retransmission is unsuccessfully received. The operations of block 2535 may be performed according to the methods described with reference to FIGS. 1 through 14. In certain examples, aspects of the operations of block 2535 may be performed by a feedback generator as described with reference to FIGS. 15 through 18.

At block 2540 the UE 115 may generate a second NACK as a second feedback indication associated with the retransmission. The operations of block 2540 may be performed according to the methods described with reference to FIGS. 1 through 14. In certain examples, aspects of the operations of block 2540 may be performed by a feedback generator as described with reference to FIGS. 15 through 18.

At block 2545 the UE 115 may transmit the second feedback indication in a second uplink transmission during a second uplink TTI. The operations of block 2545 may be performed according to the methods described with reference to FIGS. 1 through 14. In certain examples, aspects of the operations of block 2545 may be performed by a feedback transmission component as described with reference to FIGS. 15 through 18.

At block 2550 the UE 115 may receive, based at least in part on the second feedback indication, a second retransmission of the first downlink transmission in a third portion of a third downlink TTI, wherein the first downlink TTI, the second downlink TTI and the third downlink TTI are located within the same subframe. The operations of block 2550 may be performed according to the methods described with reference to FIGS. 1 through 14. In certain examples, aspects of the operations of block 2550 may be performed by a demodulation and decoding component as described with reference to FIGS. 15 through 18.

Figure 26:
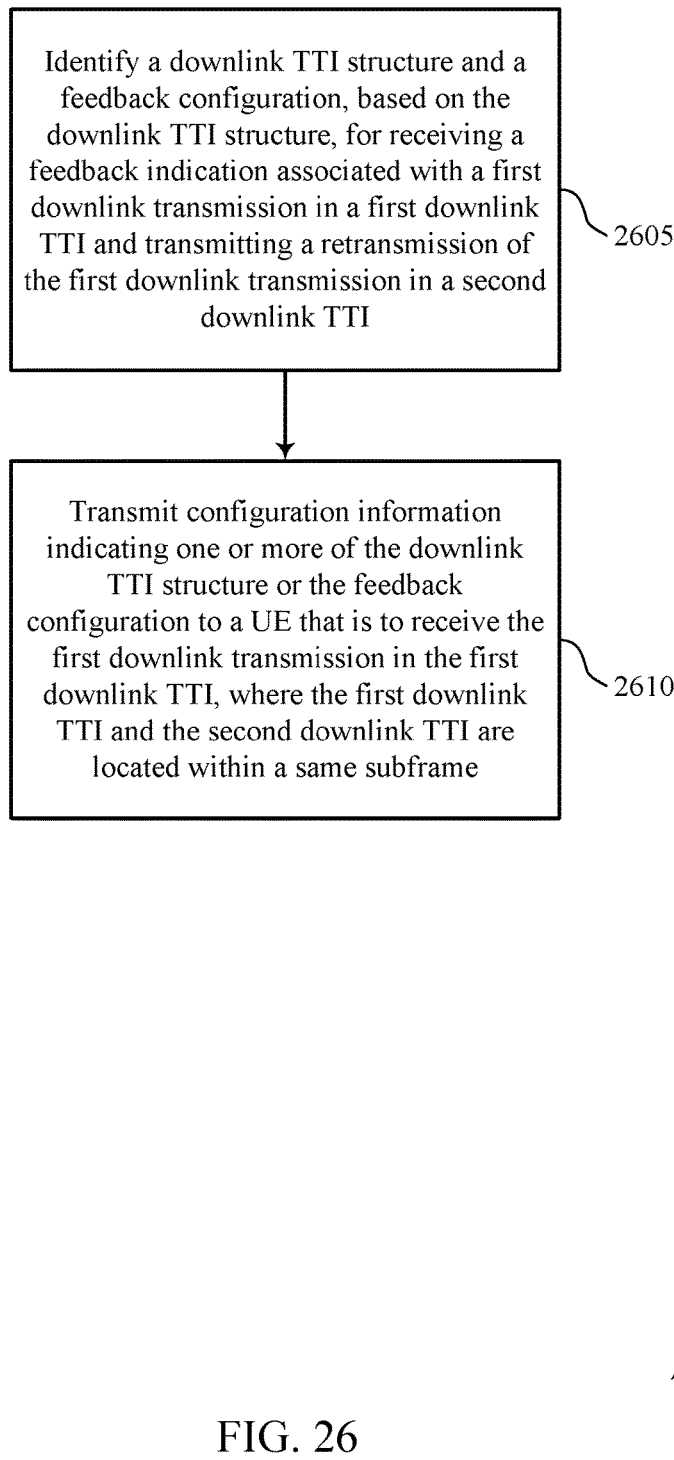

FIG. 26 shows a flowchart illustrating a method 2600 for feedback timing management for low latency communications in accordance with various aspects of the present disclosure. The operations of method 2600 may be implemented by a base station 105 or its components as described herein. For example, the operations of method 2600 may be performed by a base station feedback manager as described with reference to FIGS. 19 through 22. In some examples, a base station 105 may execute a set of codes to control the functional elements of the device to perform the functions described below. Additionally or alternatively, the base station 105 may perform aspects of the functions described below using special-purpose hardware.

At block 2605 the base station 105 may identify a downlink TTI structure and a feedback configuration, based on the downlink TTI structure, for receiving a feedback indication associated with a first downlink transmission in a first downlink TTI and transmitting a retransmission of the first downlink transmission in a second downlink TTI. The operations of block 2605 may be performed according to the methods described with reference to FIGS. 1 through 14. In certain examples, aspects of the operations of block 2605 may be performed by a configuration identification component as described with reference to FIGS. 19 through 22.

At block 2610 the base station 105 may transmit configuration information indicating one or more of the downlink TTI structure or the feedback configuration to a UE that is to receive the first downlink transmission in the first downlink TTI, wherein the first downlink TTI and the second downlink TTI are located within a same subframe. The operations of block 2610 may be performed according to the methods described with reference to FIGS. 1 through 14. In certain examples, aspects of the operations of block 2610 may be performed by a configuration transmission component as described with reference to FIGS. 19 through 22.

Figure 27:
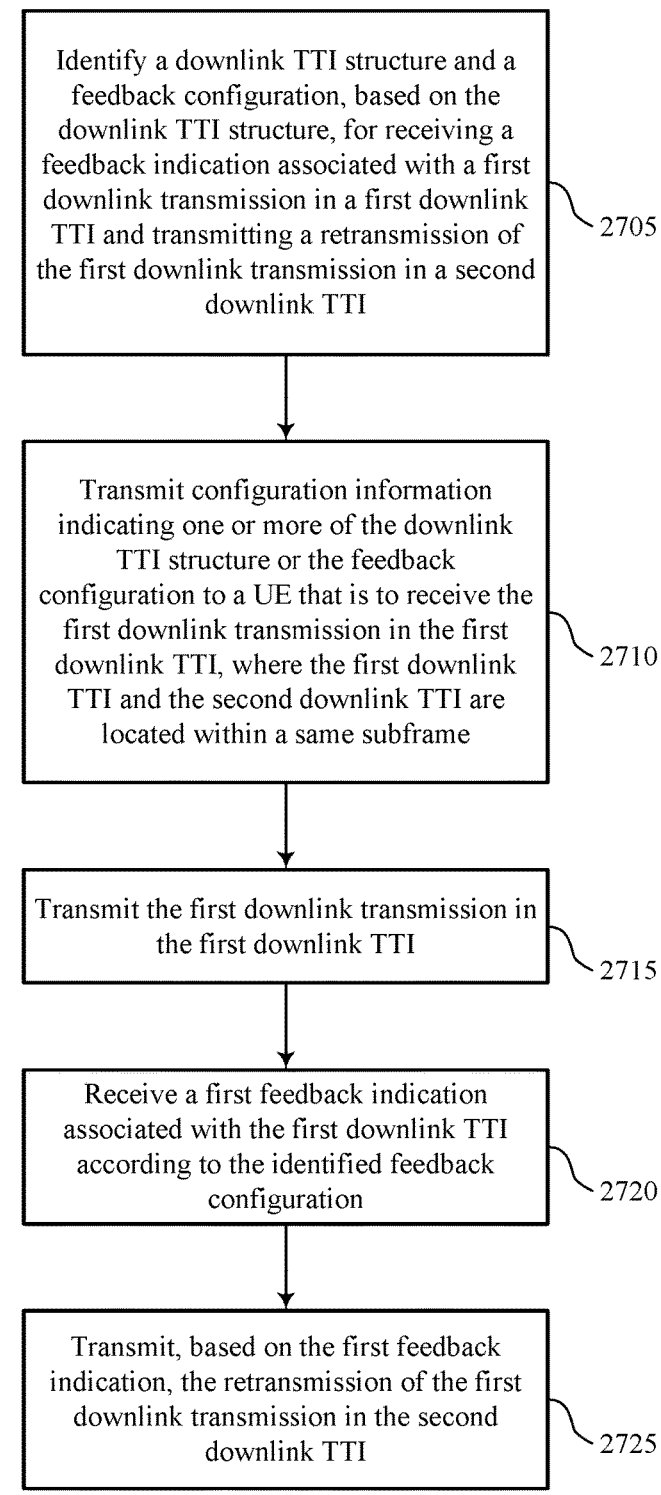

FIG. 27 shows a flowchart illustrating a method 2700 for feedback timing management for low latency communications in accordance with various aspects of the present disclosure. The operations of method 2700 may be implemented by a base station 105 or its components as described herein. For example, the operations of method 2700 may be performed by a base station feedback manager as described with reference to FIGS. 19 through 22. In some examples, a base station 105 may execute a set of codes to control the functional elements of the device to perform the functions described below. Additionally or alternatively, the base station 105 may perform aspects of the functions described below using special-purpose hardware.

At block 2705 the base station 105 may identify a downlink TTI structure and a feedback configuration, based on the downlink TTI structure, for receiving a feedback indication associated with a first downlink transmission in a first downlink TTI and transmitting a retransmission of the first downlink transmission in a second downlink TTI. The operations of block 2705 may be performed according to the methods described with reference to FIGS. 1 through 14. In certain examples, aspects of the operations of block 2705 may be performed by a configuration identification component as described with reference to FIGS. 19 through 22.

At block 2710 the base station 105 may transmit configuration information indicating one or more of the downlink TTI structure or the feedback configuration to a UE that is to receive the first downlink transmission in the first downlink TTI, wherein the first downlink TTI and the second downlink TTI are located within a same subframe. The operations of block 2710 may be performed according to the methods described with reference to FIGS. 1 through 14. In certain examples, aspects of the operations of block 2710 may be performed by a configuration transmission component as described with reference to FIGS. 19 through 22.

At block 2715 the base station 105 may transmit the first downlink transmission in the first downlink TTI. The operations of block 2715 may be performed according to the methods described with reference to FIGS. 1 through 14. In certain examples, aspects of the operations of block 2715 may be performed by a transmitter as described with reference to FIGS. 19 through 22.

At block 2720 the base station 105 may receive a first feedback indication associated with the first downlink TTI according to the identified feedback configuration. The operations of block 2720 may be performed according to the methods described with reference to FIGS. 1 through 14. In certain examples, aspects of the operations of block 2720 may be performed by a feedback component as described with reference to FIGS. 19 through 22.

At block 2725 the base station 105 may transmit, based at least in part on the first feedback indication, the retransmission of the first downlink transmission in the second downlink TTI. The operations of block 2725 may be performed according to the methods described with reference to FIGS. 1 through 14. In certain examples, aspects of the operations of block 2725 may be performed by a retransmission component as described with reference to FIGS. 19 through 22.

Figure 28:
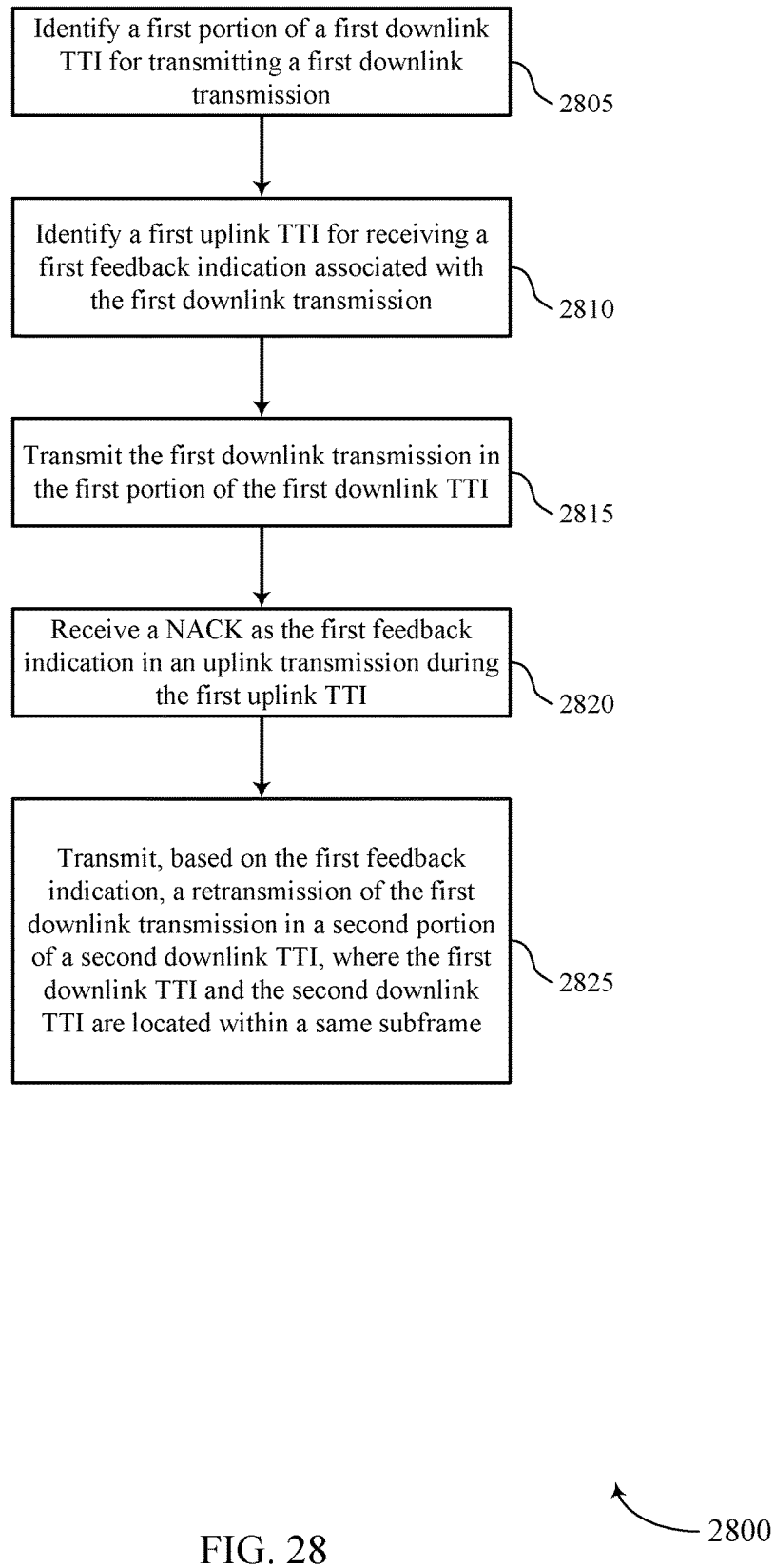

FIG. 28 shows a flowchart illustrating a method 2800 for feedback timing management for low latency communications in accordance with various aspects of the present disclosure. The operations of method 2800 may be implemented by a base station 105 or its components as described herein. For example, the operations of method 2800 may be performed by a base station feedback manager as described with reference to FIGS. 19 through 22. In some examples, a base station 105 may execute a set of codes to control the functional elements of the device to perform the functions described below. Additionally or alternatively, the base station 105 may perform aspects of the functions described below using special-purpose hardware.

At block 2805 the base station 105 may identify a first portion of a first downlink TTI for transmitting a first downlink transmission. The operations of block 2805 may be performed according to the methods described with reference to FIGS. 1 through 14. In certain examples, aspects of the operations of block 2805 may be performed by a configuration identification component as described with reference to FIGS. 19 through 22.

At block 2810 the base station 105 may identify a first uplink TTI for receiving a first feedback indication associated with the first downlink transmission. The operations of block 2810 may be performed according to the methods described with reference to FIGS. 1 through 14. In certain examples, aspects of the operations of block 2810 may be performed by a configuration identification component as described with reference to FIGS. 19 through 22.

At block 2815 the base station 105 may transmit the first downlink transmission in the first portion of the first downlink TTI. The operations of block 2815 may be performed according to the methods described with reference to FIGS. 1 through 14. In certain examples, aspects of the operations of block 2815 may be performed by a transmitter as described with reference to FIGS. 19 through 22.

At block 2820 the base station 105 may receive a NACK as the first feedback indication in an uplink transmission during the first uplink TTI. The operations of block 2820 may be performed according to the methods described with reference to FIGS. 1 through 14. In certain examples, aspects of the operations of block 2820 may be performed by a feedback component as described with reference to FIGS. 19 through 22.

At block 2825 the base station 105 may transmit, based at least in part on the first feedback indication, a retransmission of the first downlink transmission in a second portion of a second downlink TTI, wherein the first downlink TTI and the second downlink TTI are located within a same subframe. The operations of block 2825 may be performed according to the methods described with reference to FIGS. 1 through 14. In certain examples, aspects of the operations of block 2825 may be performed by a retransmission component as described with reference to FIGS. 19 through 22.

Figure 29:
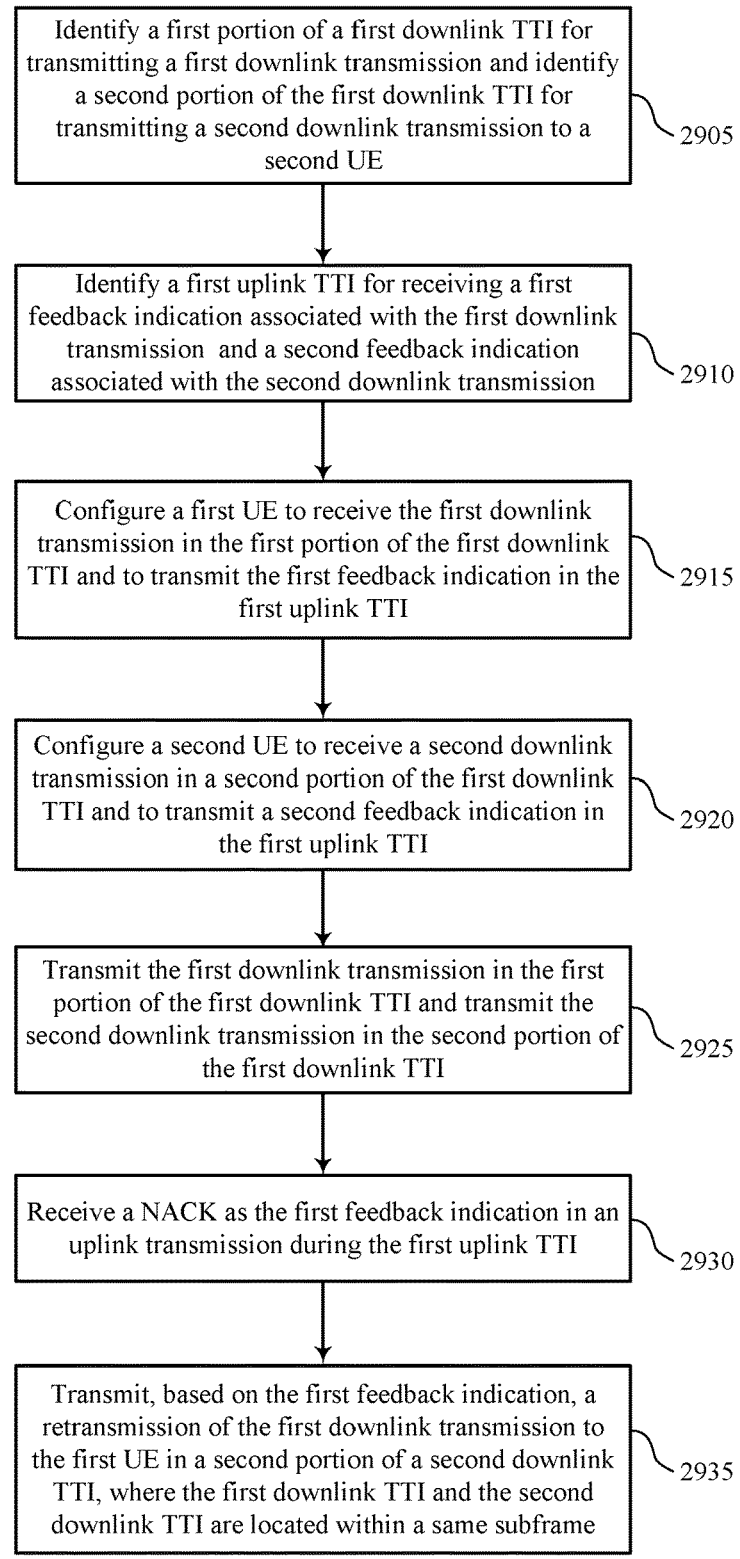

FIG. 29 shows a flowchart illustrating a method 2900 for feedback timing management for low latency communications in accordance with various aspects of the present disclosure. The operations of method 2900 may be implemented by a base station 105 or its components as described herein. For example, the operations of method 2900 may be performed by a base station feedback manager as described with reference to FIGS. 19 through 22. In some examples, a base station 105 may execute a set of codes to control the functional elements of the device to perform the functions described below. Additionally or alternatively, the base station 105 may perform aspects of the functions described below using special-purpose hardware.

At block 2905 the base station 105 may identify a first portion of a first downlink TTI for transmitting a first downlink transmission to a first UE and identify a second portion of the first downlink TTI for transmitting a second downlink transmission to a second UE. The operations of block 2905 may be performed according to the methods described with reference to FIGS. 1 through 14. In certain examples, aspects of the operations of block 2905 may be performed by a configuration identification component as described with reference to FIGS. 19 through 22.

At block 2910 the base station 105 may identify a first uplink TTI for receiving a first feedback indication associated with the first downlink transmission and a second feedback indication associated with the second downlink transmission. The operations of block 2910 may be performed according to the methods described with reference to FIGS. 1 through 14. In certain examples, aspects of the operations of block 2910 may be performed by a configuration identification component as described with reference to FIGS. 19 through 22.

At block 2915 the base station 105 may configure a first UE to receive the first downlink transmission in the first portion of the first downlink TTI and transmit the first feedback indication in the first uplink TTI. The operations of block 2915 may be performed according to the methods described with reference to FIGS. 1 through 14. In certain examples, aspects of the operations of block 2915 may be performed by a configuration transmission component as described with reference to FIGS. 19 through 22.

At block 2920 the base station 105 may configure a second UE to receive a second downlink transmission in a second portion of the first downlink TTI and transmit a second feedback indication in the first uplink TTI. The operations of block 2920 may be performed according to the methods described with reference to FIGS. 1 through 14. In certain examples, aspects of the operations of block 2920 may be performed by a configuration transmission component as described with reference to FIGS. 19 through 22.

At block 2925 the base station 105 may transmit the first downlink transmission in the first portion of the first downlink TTI and transmit the second downlink transmission in the second portion of the first downlink TTI. The operations of block 2925 may be performed according to the methods described with reference to FIGS. 1 through 14. In certain examples, aspects of the operations of block 2925 may be performed by a transmitter as described with reference to FIGS. 19 through 22.

At block 2930 the base station 105 may receive a NACK as the first feedback indication in an uplink transmission during the first uplink TTI. The operations of block 2930 may be performed according to the methods described with reference to FIGS. 1 through 14. In certain examples, aspects of the operations of block 2930 may be performed by a feedback component as described with reference to FIGS. 19 through 22.

At block 2935 the base station 105 may transmit, based at least in part on the first feedback indication, a retransmission of the first downlink transmission to the first UE in a second portion of a second downlink TTI, wherein the first downlink TTI and the second downlink TTI are located within a same subframe. The operations of block 2935 may be performed according to the methods described with reference to FIGS. 1 through 14. In certain examples, aspects of the operations of block 2935 may be performed by a retransmission component as described with reference to FIGS. 19 through 22.

It should be noted that the methods described above describe possible implementations, and that the operations and the steps may be rearranged or otherwise modified and that other implementations are possible. Furthermore, aspects from two or more of the methods may be combined.

Techniques described herein may be used for various wireless communications systems such as code division multiple access (CDMA), time division multiple access (TDMA), frequency division multiple access (FDMA), orthogonal frequency division multiple access (OFDMA), single carrier frequency division multiple access (SC- FDMA), and other systems. The terms "system" and "network" are often used interchangeably. A code division multiple access (CDMA) system may implement a radio technology such as CDMA2000, Universal Terrestrial Radio Access (UTRA), etc. CDMA2000 covers IS-2000, IS-95, and IS-856 standards. IS-2000 Releases may be commonly referred to as CDMA2000 1x, 1x, etc. IS-856 (TIA-856) is commonly referred to as CDMA2000 1xEV-DO, High Rate Packet Data (HRPD), etc. UTRA includes Wideband CDMA (WCDMA) and other variants of CDMA. A time division multiple access (TDMA) system may implement a radio technology such as Global System for Mobile Communications (GSM).

An orthogonal frequency division multiple access (OFDMA) system may implement a radio technology such as Ultra Mobile Broadband (UMB), Evolved UTRA (E-UTRA), Institute of Electrical and Electronics Engineers (IEEE) 802.11 (Wi-Fi), IEEE 802.16 (WiMAX), IEEE 802.20, Flash-OFDM, etc. UTRA and E-UTRA are part of Universal Mobile Telecommunications system (UMTS). 3GPP Long Term Evolution (LTE) and LTE-Advanced (LTE-A) are releases of Universal Mobile Telecommunications System (UMTS) that use E-UTRA. UTRA, E-UTRA, UMTS, LTE, LTE-A, NR, and Global System for Mobile communications (GSM) are described in documents from the organization named "3rd Generation Partnership Project" (3GPP). CDMA2000 and UMB are described in documents from an organization named "3rd Generation Partnership Project 2" (3GPP2). The techniques described herein may be used for the systems and radio technologies mentioned above as well as other systems and radio technologies. While aspects an LTE or an NR system may be described for purposes of example, and LTE or NR terminology may be used in much of the description, the techniques described herein are applicable beyond LTE or NR applications.

In LTE/LTE-A networks, including such networks described herein, the term evolved node B (eNB) may be generally used to describe the base stations. The wireless communications system or systems described herein may include a heterogeneous LTE/LTE-A or NR network in which different types of evolved node B (eNBs) provide coverage for various geographical regions. For example, each eNB, gNB or base station may provide communication coverage for a macro cell, a small cell, or other types of cell. The term "cell" may be used to describe a base station, a carrier or component carrier associated with a base station, or a coverage area (e.g., sector, etc.) of a carrier or base station, depending on context.

Base stations may include or may be referred to by those skilled in the art as a base transceiver station, a radio base station, an access point, a radio transceiver, a NodeB, eNodeB (eNB), next generation NodeB (gNB), Home NodeB, a Home eNodeB, or some other suitable terminology. The geographic coverage area for a base station may be divided into sectors making up only a portion of the coverage area. The wireless communications system or systems described herein may include base stations of different types (e.g., macro or small cell base stations). The UEs described herein may be able to communicate with various types of base stations and network equipment including macro eNBs, small cell eNBs, gNBs, relay base stations, and the like. There may be overlapping geographic coverage areas for different technologies.

A macro cell generally covers a relatively large geographic area (e.g., several kilometers in radius) and may allow unrestricted access by UEs with service subscriptions with the network provider. A small cell is a lower-powered base station, as compared with a macro cell, that may operate in the same or different (e.g., licensed, unlicensed, etc.) frequency bands as macro cells. Small cells may include pico cells, femto cells, and micro cells according to various examples. A pico cell, for example, may cover a small geographic area and may allow unrestricted access by UEs with service subscriptions with the network provider. A femto cell may also cover a small geographic area (e.g., a home) and may provide restricted access by UEs having an association with the femto cell (e.g., UEs in a closed subscriber group (CSG), UEs for users in the home, and the like). An eNB for a macro cell may be referred to as a macro eNB. An eNB for a small cell may be referred to as a small cell eNB, a pico eNB, a femto eNB, or a home eNB. An eNB may support one or multiple (e.g., two, three, four, and the like) cells (e.g., component carriers).

The wireless communications system or systems described herein may support synchronous or asynchronous operation. For synchronous operation, the base stations may have similar frame timing, and transmissions from different base stations may be approximately aligned in time. For asynchronous operation, the base stations may have different frame timing, and transmissions from different base stations may not be aligned in time. The techniques described herein may be used for either synchronous or asynchronous operations.

The downlink transmissions described herein may also be called forward link transmissions while the uplink transmissions may also be called reverse link transmissions. Each communication link described herein—including, for example, wireless communications system 100 and 200 of FIGS. 1 and 2—may include one or more carriers, where each carrier may be a signal made up of multiple sub-carriers (e.g., waveform signals of different frequencies).

The description set forth herein, in connection with the appended drawings, describes example configurations and does not represent all the examples that may be implemented or that are within the scope of the claims. The term "exemplary" used herein means "serving as an example, instance, or illustration," and not "preferred" or "advantageous over other examples." The detailed description includes specific details for the purpose of providing an understanding of the described techniques. These techniques, however, may be practiced without these specific details. In some instances, well-known structures and devices are shown in block diagram form in order to avoid obscuring the concepts of the described examples.

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label.

Information and signals described herein may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

The various illustrative blocks and modules described in connection with the disclosure herein may be implemented or performed with a general-purpose processor, a DSP, an ASIC, an FPGA or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration).

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope of the disclosure and appended claims. For example, due to the nature of software, functions described above can be implemented using software executed by a processor, hardware, firmware, hardwiring, or combinations of any of these. Features implementing functions may also be physically located at various positions, including being distributed such that portions of functions are implemented at different physical locations. Also, as used herein, including in the claims, "or" as used in a list of items (for example, a list of items prefaced by a phrase such as "at least one of" or "one or more of") indicates an inclusive list such that, for example, a list of at least one of A, B, or C means A or B or C or AB or AC or BC or ABC (i.e., A and B and C). Also, as used herein, the phrase "based on" shall not be construed as a reference to a closed set of conditions. For example, an exemplary step that is described as "based on condition A" may be based on both a condition A and a condition B without departing from the scope of the present disclosure. In other words, as used herein, the phrase "based on" shall be construed in the same manner as the phrase "based at least in part on."

Computer-readable media includes both non-transitory computer storage media and communication media including any medium that facilitates transfer of a computer program from one place to another. A non-transitory storage medium may be any available medium that can be accessed by a general purpose or special purpose computer. By way of example, and not limitation, non-transitory computer-readable media may comprise RAM, ROM, electrically erasable programmable read only memory (EEPROM), compact disk (CD) ROM or other optical disk storage, magnetic disk storage or other magnetic storage devices, or any other non-transitory medium that can be used to carry or store desired program code means in the form of instructions or data structures and that can be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, digital subscriber line (DSL), or wireless technologies such as infrared, radio, and microwave are included in the definition of medium. Disk and disc, as used herein, include CD, laser disc, optical disc, digital versatile disc (DVD), floppy disk and Blu-ray disc where disks usually reproduce data magnetically, while discs reproduce data optically with lasers. Combinations of the above are also included within the scope of computer-readable media.

The description herein is provided to enable a person skilled in the art to make or use the disclosure. Various modifications to the disclosure will be readily apparent to those skilled in the art, and the generic principles defined herein may be applied to other variations without departing from the scope of the disclosure. Thus, the disclosure is not limited to the examples and designs described herein, but is to be accorded the broadest scope consistent with the principles and novel features disclosed herein.

What is claimed is:

1. A method for wireless communication, comprising:
   identifying a first downlink transmission time interval (TTI) and a feedback configuration, based at least in part on a structure of the first downlink TTI, wherein the feedback configuration comprises a feedback timing spanning a first set of orthogonal frequency division multiplexing (OFDM) symbols and a rescheduling timing spanning a second set of OFDM symbols;
   receiving, unsuccessfully, a first downlink transmission in the first downlink TTI;
   generating, following the feedback timing, a negative acknowledgement (NACK) as a first feedback indication associated with the first downlink TTI according to the identified feedback configuration;
   transmitting the first feedback indication in an uplink transmission during a first uplink TTI; and
   receiving, based at least in part on the first feedback indication and following the rescheduling timing, a retransmission of the first downlink transmission in a second downlink TTI, wherein the first downlink TTI and the second downlink TTI are located within a same subframe or within one millisecond.

2. The method of claim 1, further comprising:
   identifying an uplink TTI structure for a plurality of uplink TTIs based at least in part on the structure of the first downlink TTI.

3. The method of claim 1, wherein the identifying the structure of the first downlink TTI comprises:
   dynamically identifying the structure of the first downlink TTI based at least in part on a number of OFDM symbols of the first downlink TTI.

4. The method of claim 3, wherein the structure of the first downlink TTI is identified based at least in part on a number of control symbols in a control region associated with the subframe.

5. The method of claim 4, wherein the number of control symbols in the control region is indicated in a physical control format indicator channel (PCFICH) transmission.

6. The method of claim 1, wherein the identifying the structure of the first downlink TTI comprises:
   semi-statically identifying the structure of the first downlink TTI based at least in part on radio resource control (RRC) signaling received from a base station.

7. The method of claim 1, wherein the identifying the feedback configuration comprises:
   identifying the feedback timing for transmitting the first feedback indication based at least in part on the structure of the first downlink TTI; and
   identifying the rescheduling timing for receiving a subsequent retransmission of the first downlink transmission following the first feedback indication.

8. The method of claim 7, wherein the feedback timing is different than the rescheduling timing.

9. The method of claim 7, wherein the structure of the first downlink TTI comprises a plurality of TTIs that each span two or three OFDM symbols.

10. The method of claim 9, wherein:
the feedback timing corresponds to a duration of three OFDM symbols, and
the rescheduling timing corresponds to a duration of two OFDM symbols.

11. The method of claim 9, wherein:
the feedback timing corresponds to a duration of one OFDM symbol, and
the rescheduling timing corresponds to the duration of one OFDM symbol.

12. The method of claim 1, further comprising:
identifying one or more of a maximum transport block size (TBS) or a maximum timing advance (TA) for the uplink transmission based at least in part on the feedback configuration.

13. A method for wireless communication, comprising:
identifying a first portion of a first downlink transmission time interval (TTI) and a feedback configuration, based at least in part on a structure of the first portion, wherein the feedback configuration comprises a feedback timing spanning a first set of orthogonal frequency division multiplexing (OFDM) symbols and a rescheduling timing spanning a second set of OFDM symbols;
identifying a first uplink TTI for transmitting a feedback indication associated with the first downlink transmission based at least in part on the feedback configuration;
receiving, unsuccessfully, the first downlink transmission in the first portion of the first downlink TTI;
generating, following the feedback timing, a negative acknowledgement (NACK) as a first feedback indication associated with the first downlink transmission;
transmitting the first feedback indication in an uplink transmission during the first uplink TTI; and
receiving, based at least in part on the first feedback indication and following the rescheduling timing, a retransmission of the first downlink transmission in a second portion of a second downlink TTI, wherein the first downlink TTI and the second downlink TTI are located within a same subframe or within one millisecond.

14. The method of claim 13, wherein the identifying the first portion of the first downlink TTI comprises:
identifying a first OFDM symbol of two or more OFDM symbols of the first downlink TTI for receiving the first downlink transmission.

15. The method of claim 14, wherein the first downlink TTI comprises two or three OFDM symbols.

16. The method of claim 13, wherein the retransmission is unsuccessfully received, and wherein the method further comprises:
generating a second NACK as a second feedback indication associated with the retransmission;
transmitting the second feedback indication in a second uplink transmission during a second uplink TTI; and
receiving, based at least in part on the second feedback indication, a second retransmission of the first downlink transmission in a third portion of a third downlink TTI, wherein the first downlink TTI, the second downlink TTI and the third downlink TTI are located within the same subframe or within one millisecond.

17. The method of claim 13, wherein the identifying the first portion of the first downlink TTI comprises:

receiving user equipment (UE) specific signaling or cell-specific signaling indicating the first portion of the first downlink TTI.

18. The method of claim 13, wherein the identifying the first portion of the first downlink TTI comprises:
dynamically identifying the first portion of the first downlink TTI based at least in part on a number of OFDM symbols of the first downlink TTI.

19. The method of claim 18, wherein the first portion of the first downlink TTI is identified based at least in part on a number of control symbols in a control region associated with the subframe.

20. The method of claim 19, wherein the number of control symbols in the control region is indicated in a physical control format indicator channel (PCFICH) transmission.

21. The method of claim 13, wherein the identifying the first portion of the first downlink TTI comprises:
semi-statically identifying the first portion of the first downlink TTI based at least in part on radio resource control (RRC) signaling received from a base station.

22. The method of claim 13, wherein the first portion of the first downlink TTI is pre-specified.

23. The method of claim 13, wherein the identifying the first uplink TTI comprises:
identifying the feedback timing for transmitting the first feedback indication based at least in part on a location of the first portion within the first downlink TTI.

24. The method of claim 13, wherein the identifying the first uplink TTI comprises:
identifying the feedback timing for transmitting the first feedback indication based at least in part on a user equipment (UE) capability.

25. The method of claim 13, further comprising:
identifying one or more of a maximum transport block size (TBS) or a timing advance (TA) for the uplink transmission based at least in part on a timing between the first portion of the first downlink TTI and the first uplink TTI.

26. An apparatus for wireless communication, in a system comprising:
a processor;
memory in electronic communication with the processor; and
instructions stored in the memory and operable, when executed by the processor, to cause the apparatus to:
identify a first downlink transmission time interval (TTI) and a feedback configuration, based at least in part on a structure of the first downlink TTI, wherein the feedback configuration comprises a feedback timing spanning a first set of orthogonal frequency division multiplexing (OFDM) symbols and a rescheduling timing spanning a second set of OFDM symbols;
receive, unsuccessfully, a first downlink transmission in the first downlink TTI;
generate, following the feedback timing, a NACK as a first feedback indication associated with the first downlink TTI according to the identified feedback configuration;
transmit the first feedback indication in an uplink transmission during a first uplink TTI; and
receive, based at least in part on the first feedback indication and following the rescheduling timing, a retransmission of the first downlink transmission in a second downlink TTI, wherein the first downlink TTI and the second downlink TTI are located within a same subframe.

27. The apparatus of claim 26, wherein the instructions are further operable, when executed by the processor, to cause the apparatus to:
identify an uplink TTI structure for a plurality of uplink TTIs based at least in part on the structure of the first downlink TTI.

28. The apparatus of claim 26, wherein the instructions are further operable, when executed by the processor, to cause the apparatus to:
dynamically identify the structure of the first downlink TTI based at least in part on a number of OFDM symbols of the first downlink TTI.

29. An apparatus for wireless communication, in a system comprising:
a processor;
memory in electronic communication with the processor; and
instructions stored in the memory and operable, when executed by the processor, to cause the apparatus to:
identify a first portion of a first downlink transmission time interval (TTI) and a feedback configuration, based at least in part on a structure of the first portion, wherein the feedback configuration comprises a feedback timing spanning a first set of orthogonal frequency division multiplexing (OFDM) symbols and a rescheduling timing spanning a second set of OFDM symbols;
identify a first uplink TTI for transmitting a feedback indication associated with the first downlink transmission based at least in part on the feedback configuration;
receive, unsuccessfully, the first downlink transmission in the first portion of the first downlink TTI;
generate, following the feedback timing, a NACK as a first feedback indication associated with the first downlink transmission;
transmit the first feedback indication in an uplink transmission during the first uplink TTI; and
receive, based at least in part on the first feedback indication and following the rescheduling timing, a retransmission of the first downlink transmission in a second portion of a second downlink TTI, wherein the first downlink TTI and the second downlink TTI are located within a same subframe.

30. The apparatus of claim 29, wherein the instructions are further operable, when executed by the processor, to cause the apparatus to:
identify a first OFDM symbol of two or more OFDM symbols of the first downlink TTI for receiving the first downlink transmission.

* * * * *